(12) United States Patent
Hattori et al.

(10) Patent No.: US 10,595,034 B2
(45) Date of Patent: Mar. 17, 2020

(54) DECODING DEVICE AND DECODING METHOD, AND CODING DEVICE AND CODING METHOD

(71) Applicant: SONY CORPORATION, Tokyo (JP)

(72) Inventors: Shinobu Hattori, Tokyo (JP); Kenichi Kanai, Tokyo (JP); Toshiya Hamada, Saitama (JP); Takumi Tsuru, Chiba (JP); Hiroaki Eto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/216,131

(22) Filed: Dec. 11, 2018

(65) Prior Publication Data

US 2019/0110059 A1 Apr. 11, 2019

Related U.S. Application Data

(63) Continuation of application No. 15/152,027, filed on May 11, 2016, now Pat. No. 10,187,651, which is a (Continued)

(30) Foreign Application Priority Data

| Oct. 15, 2013 | (JP) | ................................. 2013-215060 |
| Dec. 27, 2013 | (JP) | ................................. 2013-272945 |
| Mar. 4, 2014 | (JP) | ................................. 2014-042174 |

(51) Int. Cl.
*H04N 19/48* (2014.01)
*H04N 19/70* (2014.01)
(Continued)

(52) U.S. Cl.
CPC ............... *H04N 19/48* (2014.11); *G09G 5/10* (2013.01); *H04N 19/124* (2014.11);
(Continued)

(58) Field of Classification Search
None
See application file for complete search history.

(56) References Cited

U.S. PATENT DOCUMENTS

| 6,407,746 B1 | 6/2002 | Tanizawa |
| 8,098,931 B2 | 1/2012 | Chen et al. |

(Continued)

FOREIGN PATENT DOCUMENTS

| JP | 2007-257641 A | 10/2007 |
| WO | WO 2009/003499 A1 | 1/2009 |
| WO | WO 2013/046095 A1 | 4/2013 |

OTHER PUBLICATIONS

Dec. 12, 2014, International Search Report issued for international application No. PCT/JP2014/005108.
(Continued)

*Primary Examiner* — Reza Aghevli
(74) *Attorney, Agent, or Firm* — Paratus Law Group, PLLC

(57) ABSTRACT

There is provided a decoding device including circuitry configured to receive coded data and conversion information, the coded data pertaining to an image having luminance in a first dynamic range and the conversion information pertaining to a conversion of dynamic range of the luminance of the image from the first dynamic range into a second dynamic range; and decode the received coded data so as to generate the image, wherein the conversion uses a knee function.

12 Claims, 86 Drawing Sheets

Related U.S. Application Data continuation of application No. 14/980,780, filed on Dec. 28, 2015, now Pat. No. 9,826,248, which is a continuation of application No. 14/491,539, filed on Sep. 19, 2014, now Pat. No. 9,253,497.

(51) Int. Cl.

| | | |
|---|---|---|
| *H04N 19/30* | (2014.01) | |
| *H04N 19/124* | (2014.01) | |
| *H04N 19/184* | (2014.01) | |
| *G09G 5/10* | (2006.01) | |

(52) U.S. Cl.
CPC .......... *H04N 19/184* (2014.11); *H04N 19/30* (2014.11); *H04N 19/70* (2014.11)

(56) References Cited

U.S. PATENT DOCUMENTS

| | | | | |
|---|---|---|---|---|
| 8,194,997 | B2* | 6/2012 | Segall | H04N 1/6027 345/418 |
| 8,743,291 | B2 | 6/2014 | Li et al. | |
| 9,036,042 | B2 | 5/2015 | Jia et al. | |
| 9,253,497 | B2* | 2/2016 | Hattori | H04N 19/124 |
| 9,350,899 | B2 | 5/2016 | Li et al. | |
| 9,826,248 | B2* | 11/2017 | Hattori | H04N 19/124 |
| 10,187,651 | B2* | 1/2019 | Hattori | H04N 19/124 |
| 2006/0125963 | A1 | 6/2006 | Baek | |
| 2006/0192878 | A1* | 8/2006 | Miyahara | H04N 5/2355 348/333.01 |
| 2007/0223813 | A1* | 9/2007 | Segall | H04N 1/6027 382/166 |
| 2008/0259181 | A1* | 10/2008 | Yamashita | H04N 5/2351 348/229.1 |
| 2009/0027558 | A1 | 1/2009 | Mantiuk et al. | |
| 2011/0194618 | A1 | 8/2011 | Gish et al. | |
| 2013/0148029 | A1* | 6/2013 | Gish | G09G 5/02 348/708 |
| 2014/0210847 | A1* | 7/2014 | Knibbeler | G09G 5/006 345/589 |
| 2014/0225941 | A1 | 8/2014 | Van der Vleuten et al. | |
| 2015/0103919 | A1 | 4/2015 | Hattori et al. | |
| 2015/0358646 | A1 | 12/2015 | Mertens | |
| 2016/0112715 | A1 | 4/2016 | Hattori et al. | |
| 2016/0189409 | A1 | 6/2016 | Aiba et al. | |
| 2016/0210730 | A1 | 7/2016 | Eto et al. | |
| 2016/0292834 | A1 | 10/2016 | Tsuru et al. | |

OTHER PUBLICATIONS

Andrew Segall et al., New Results with the Tone Mapping SEI Message, Joint Video Team (JVT) of ISO/IEC MPEG & ITU-T VCEG (ISO/IEC JTC1/SC29/WG11 and ITU-T SG16 Q.6), Oct. 20-27, 2006, pp. 1-8, 21st Meeting: Hangzhou, CN.

Sally Hattori et al., HLS: SEI message for transfer function information, Joint Collaborative Team on Video Coding (JCT-VC) of ITU-T SG 16 WP 3 and ISO/IEC JTC 1/SC 29/WG 11, Oct. 21-Nov. 1, 2013, pp. 1-4, 15th Meeting, Geneva, CH.

Sally Hattori et al., HLS: SEI message for Knee Function Information, Joint Collaborative Team on Video Coding (JCT-VC) of ITU-T SG 16 WP 3 and ISO/IEC JTC 1/SC 29/WG 11, Jan. 9-17, 2014, pp. 1-21, 16th Meeting: San Jose, US.

Sascha D. Cvetkovic et al., Adaptive Tone-Mapping Transfer Functions for High Dynamic Range Video Cameras, IEEE, 2008, pp. 1-6.

Martin Winken et al., Bit-Depth Scalable Video Coding, IEEE, 2007, pp. 1-4.

Bross et al., Editors' proposed corrections to HEVC version 1, Joint Collaborative Team on Video Coding (JCT-VC) of ITU-T SG WP 3 and ISO/IEC JTC 1/SC 29/WG 11, Apr. 18-26, 2013, p. i-298, 13th Meeting, Incheon, Korea.

Nov. 22, 2016, JP communication issued for related JP application No. 2014-042174.

Hattori, Signalling of Luminance Dynamic Range in Tone mapping information SEI, Joint Collaborative Team on Video Coding (JCT-VC) of ITU-T SG 16 WP 3 and ISO/IEC JTC 1/SC 29/WG 11, 10$^{th}$ Meeting, Stockholm, SE, Jul. 11-20, 2012, pp. 1-7.

Oct. 4, 2017, SG communication issued for related SG application No. 11201503910S.

Jul. 17, 2018, Chinese Office Action issued for related CN Application No. 201480003162.9.

\* cited by examiner

FIG. 7

| | Descriptor |
|---|---|
| knee_function_info(payloadSize) { | |
| knee_point_of_input | u(16) |
| knee_point_of_output | u(16) |
| output_white_level_range | u(32) |
| output_white_level_range_luminance | u(32) |
| kfi_extension_flag | u(1) |
| if(kfi_extension_flag) | |
| while(more_rbsp_data()) | |
| kfi_extension_data_flag | u(1) |
| } | |

FIG. 8 knee_point_of_input indicates the knee point on input-axis. This value increment is in units of one-thousandth of the value that normalized linear input code value to 1.0. Therefore, This value shall be less than or equal to 1000.

knee_point_of_output indicates the knee point on output-axis. This value increment is in units of one-thousandth of the value that normalized linear output code value to 1.0. Therefore, This value shall be less than or equal to 1000.

*when knee_point_of_input > knee_point_of_output, knee decompression is performed, when knee_point_of_input < knee_point_of_output, knee compression is performed, and when knee_point_of_input = knee_point_of_output, no knee coversion is performed. (any process is performed as post process. knee compression is performed when HDR image is converted into SDR image, and knee decompression is performed when SDR image is converted into HDR image)

output_white_level_range indicates the luminance dynamic range for output of the associated pictures, after conversion to the linear light domain for display, expressed as an integer percentage relative to the nominal white level.

output_white_level_range_luminance indicates the display luminance for the output white level range in units of candela per square metre.

kfi_extension_flag equal to 0 specifies that no kfi_extension_data_flag syntax elements are present in the KFI RBSP syntax structure. kfi_extension_flag shall be equal to 0 in bitstreams conforming to this version of this Specification. The value of 1 for kfi_extension_flag is reserved for future use by ITU-T | ISO/IEC. Decoders shall ignore all kfi_extension_data_flag syntax elements that follow the value 1 for kfi_extension_flag in an KFI NAL unit.

kfi_extension_data_flag may have any value. Its presence and value do not affect decoder conformance to profiles specified in this version of this Specification. Decoders conforming to this version of this Specification shall ignore all kfi_extension_data_flag syntax elements.

FIG. 14

| knee_function_info(payloadSize) { | Descriptor |
|---|---|
| knee_point_of_input | u(16) |
| knee_point_of_output | u(16) |
| white_level_range | u(32) |
| white_level_range_luminance | u(32) |
| kfi_extension_flag | u(1) |
| if(kfi_extension_flag) | |
| while(more_rbsp_data()) | |
| kfi_extension_data_flag | u(1) |
| } | |

FIG. 15 knee_point_of_input indicates the knee point on input-axis. This value increment is in units of one-thousandth of the value that normalized linear input code value to 1.0. Therefore, This value shall be less than or equal to 1000.

knee_point_of_output indicates the knee point on output-axis. This value increment is in units of one-thousandth of the value that normalized linear output code value to 1.0. Therefore, This value shall be less than or equal to 1000.

*when knee_point_of_input > knee_point_of_output, knee decompression is performed, when knee_point_of_input < knee_point_of_output, knee compression is performed, and when knee_point_of_input = knee_point_of_output, no knee coversion is performed. (any process is performed as post process. knee compression is performed when HDR image is converted into SDR image, and knee decompression is performed when SDR image is converted into HDR image)

white_level_range indicates the luminance dynamic range for output of the associated pictures, after conversion to the linear light domain for display, expressed as an integer percentage relative to the nominal white level.

white_level_range_luminance indicates the display luminance for the output white level range in units of candela per square metre.

*when knee_point_of_input >= knee_point_of_output, white_level_range == output_white_level_range, when knee_point_of_input < knee_point_of_output, white_level_range == input_white_level_range kfi_extension_flag equal to 0 specifies that no kfi_extension_data_flag syntax elements are present in the KFI RBSP syntax structure. kfi_extension_flag shall be equal to 0 in bitstreams conforming to this version of this Specification. The value of 1 for kfi_extension_flag is reserved for future use by ITU-T | ISO/IEC. Decoders shall ignore all kfi_extension_data_flag syntax elements that follow the value 1 for kfi_extension_flag in an KFI NAL unit.

kfi_extension_data_flag may have any value. Its presence and value do not affect decoder conformance to profiles specified in this version of this Specification. Decoders conforming to this version of this Specification shall ignore all kfi_extension_data_flag syntax elements.

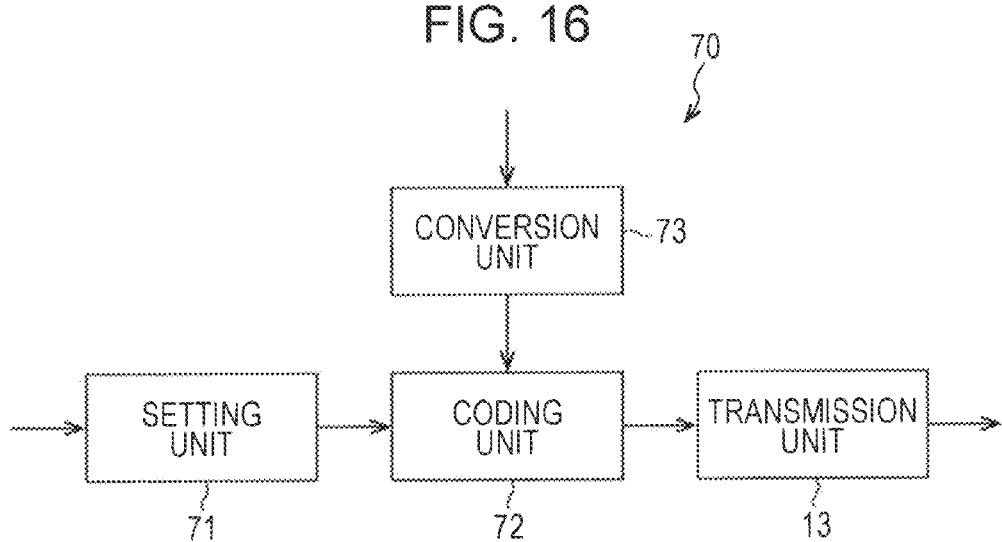

FIG. 18 knee_function_id contains an identifying number that may be used to identify the purpose of the knee functions. The value of knee_function_id shall be in the range of 0 to 232 − 2, inclusive.
- Values of knee_function_id from 0 to 255 and from 512 to 231 − 1 may be used as determined by the application. Values of knee_function_id from 256 to 511, inclusive, and from 231 to 232 − 2, inclusive are reserved for future use by ITU-T | ISO/IEC. Decoders shall ignore all knee function information SEI messages containing a value of knee_function_id in the range of 256 to 511, inclusive, or in the range of 231 to 232 − 2, inclusive, and bitstreams shall not contain such values.
- NOTE 1 – The knee_function_id can be used to support knee function process that are suitable for different display scenarios. For example, different values of knee_function_id may correspond to different display bit depths.

knee_function_cancel_flag equal to 1 indicates that the knee function information SEI message cancels the persistence of any previous knee function information SEI message in output order. knee_function_cancel_flag equal to 0 indicates that knee function information follows.

input_knee_point specifies the luminance level of a point at which the decompression or compression starts to flatten the contrast curve for the input picture. The luminance level of the knee point for input picture is normalized in range of 0 to 1.0 in units of 0.1%. The value of input_knee_point is expressed in range of 0 to 1000.

output_knee_point specifies the luminance level of a point at which the decompression or compression starts to flatten the contrast curve for the output picture. The luminance level of the knee point for output picture is normalized in range of 0 to 1.0 in units of 0.1%. The value of output_knee_point is expressed in range of 0 to 1000.
- NOTE 2 – The coordinate of the knee point is defined as (input_knee_point, output_knee_point).

d_range specifies the peak luminance level of either the decompressed picture or uncompressed picture in relative to the nominal luminance level in units of 0.1%.
- The value of d_range specifies the peak luminance level of the decompressed picture(output picture of the knee process)when the value of input knee point is greater than or equal to the value of output knee point. The value of d_range specifies the peak luminance level of the uncompressed picture(input picture of the knee process)when the value of input_knee_point is less than the value of output_knee_point.

d_range_disp_luminance specifies the expected display brightness of peak luminance level specified as d_range. The value of d_range_disp_luminance is in units of candela per square metre.

FIG. 26

| tone_mapping_info(payloadSize) { | Descriptor |
|---|---|
| tone_map_id | ue(v) |
| tone_map_cancel_flag | u(1) |
| if(!tone_map_cancel_flag) { | |
| --------snip-------- | |
| if(tone_map_model_id == 0) { | |
| --------snip-------- | |
| nominal_white_level_code_value | u(16) |
| extended_white_level_code_value | u(16) |
| }else if(tone_map_model_id == 5) { | |
| input_knee_point | u(16) |
| output_knee_point | u(16) |
| d_range | u(32) |
| d_range_disp_luminance | u(32) |
| } | |
| } | |
| } | |

FIG. 27

| tone_mapping_info(payloadSize) { | Descriptor |
|---|---|
| tone_map_id | ue(v) |
| tone_map_cancel_flag | u(1) |
| if(!tone_map_cancel_flag) { | |
| ---------snip--------- | |
| if(tone_map_model_id == 0) { | |
| ---------snip--------- | |
| nominal_white_level_code_value | u(16) |
| extended_white_level_code_value | u(16) |
| }else if( tone_map_model_id == 5) { | |
| input_knee_point | u(16) |
| output_knee_point | u(16) |
| } | |
| } | |
| } | |

FIG. 28

| knee_function_info(payloadSize) { | Descriptor |
|---|---|
| knee_function_id | ue(v) |
| knee_function_cancel_flag | u(1) |
| if(!knee_function_cancel_flag) { | |
| compression_flag | u(1) |
| d_range | u(32) |
| d_range_disp_luminance | u(32) |
| num_knee_point_minus1 | ue(v) |
| for(i=0; i<=num_knee_point_minus1; i++) { | |
| input_knee_point[i] | u(16) |
| output_knee_point[i] | u(16) |
| } | |
| } | |
| } | |

FIG. 29 compression_flag equals to 0 indicates that the knee function is decompression function. compression_flag equals to 1 indicates that the knee function is compression function.

num_knee_point_minus1 plus 1 specifies the number of knee points without counting the two default end points. (0,0) and (1,1).

input_knee_point[i] specifies the luminance level of i-th knee point for input picture. The luminance level of the knee point for input picture is normalized in range of 0 to 1.0 in units of 0.1%. The value of input_knee_point is expressed in range of 0 to 1000. input_knee_point[i] shall be greater than input_knee_point[i-1].

NOTE 2—The coordinate of the representative knee point is defined as (input_knee_point[i], output_knee_point[i]).

output_knee_point[i] specifies the luminance level of i-th knee point for output picture. The luminance level of the knee point for output picture is normalized in range of 0 to 1.0 in units of 0.1%. The value of output_knee_point is expressed in range of 0 to 1000.

NOTE 3 - The coordinate of the i-th knee point is defined as (input_knee_point[i], output_knee_point[i]).

Knee function is composed of several lines which starts with the point (0,0) ends with the point (1,1) through all knee points in ascending order of i.

FIG. 32

| | Descriptor |
|---|---|
| tone_mapping_info(payloadSize) { | |
|   tone_map_id | ue(v) |
|   tone_map_cancel_flag | u(1) |
|   if(!tone_map_cancel_flag) { | |
| --------snip-------- | |
|     if(tone_map_model_id == 0) { | |
| --------snip-------- | |
|       nominal_white_level_code_value | u(16) |
|       extended_white_level_code_value | u(16) |
|     } else if(tone_map_model_id == 5) { | |
|       compression_flag | u(1) |
|       d_range | u(32) |
|       d_range_disp_luminance | u(32) |
|       num_knee_point_minus1 | ue(v) |
|       for(i=0;i<=num_knee_point_minus1;i++) { | |
|         input_knee_point[i] | u(16) |
|         output_knee_point[i] | u(16) |
|       } | |
|     } | |
|   } | |
| } | |

FIG. 33 num_knee_point_minus1 plus 1 specifies the number of knee points without counting the two default end points, (0,0) and (1,1). The value of num_knee_point_minus1 shall be 0, 1 or 2.

FIG. 34

| knee_function_info(payloadSize) { | Descriptor |
|---|---|
| knee_function_id | ue(v) |
| knee_function_cancel_flag | u(1) |
| if(!knee_function_cancel_flag) { | |
| compression_flag | u(1) |
| d_range | u(32) |
| d_range_disp_luminance | u(32) |
| num_knee_point_minus1 | u(2) |
| for(i=0; i<=num_knee_point_minus1; i++) { | |
| input_knee_point[i] | u(16) |
| output_knee_point[i] | u(16) |
| } | |
| } | |
| } | |

FIG. 35

| tone_mapping_info(payloadSize) { | Descriptor |
|---|---|
|   tone_map_id | ue(v) |
|   tone_map_cancel_flag | u(1) |
|   if(!tone_map_cancel_flag) { | |
| --------snip-------- | |
|     if(tone_map_model_id == 0) { | |
| --------snip-------- | |
|       nominal_white_level_code_value | u(16) |
|       extended_white_level_code_value | u(16) |
|     }else if(tone_map_model_id == 5) { | |
|       compression_flag | u(1) |
|       d_range | u(32) |
|       d_range_disp_luminance | u(32) |
|       num_knee_point_minus1 | u(2) |
|       for(i=0;i<=num_knee_point_minus1;i++) { | |
|         input_knee_point[i] | u(16) |
|         output_knee_point[i] | u(16) |
|       } | |
|     } | |
|   } | |
| } | |

FIG. 36

| knee_function_info(payloadSize) { | Descriptor |
|---|---|
| knee_function_id | ue(v) |
| knee_function_cancel_flag | u(1) |
| if(!knee_function_cancel_flag) { | |
| compression_flag | u(1) |
| representative_input_knee_point | u(16) |
| representative_output_knee_point | u(16) |
| d_range | u(32) |
| d_range_disp_luminance | u(32) |
| num_knee_point_minus1 | u(2) |
| for (i=0; i<=num_knee_point_minus1; i++) { | |
| input_knee_point[i] | u(16) |
| output_knee_point[i] | u(16) |
| } | |
| } | |
| } | |

FIG. 37 representative_input_knee_point specifies the luminance level of a point at which the decompression or compression starts to flatten the contrast curve for the input picture. The luminance level of the knee point for input picture is normalized in range of 0 to 1.0 in units of 0.1%. The value of representative_input_knee_point is expressed in range of 0 to 1000.

representative_output_knee_point specifies the luminance level of a point at which the decompression or compression starts to flatten the contrast curve for the output picture. The luminance level of the knee point for output picture is normalized in range of 0 to 1.0 in units of 0.1%. The value of representative_output_knee_point is expressed in range of 0 to 1000.

NOTE 2 — The coordinate of the representative knee point is defined as (representative_input_knee_point, representative_output_knee_point).

FIG. 39

| tone_mapping_info(payloadSize) { | Descriptor |
|---|---|
|   tone_map_id | ue(v) |
|   tone_map_cancel_flag | u(1) |
|   if(!tone_map_cancel_flag) { | |
| --------snip-------- | |
|     if(tone_map_model_id == 0) { | |
| --------snip-------- | |
|       nominal_white_level_code_value | u(16) |
|       extended_white_level_code_value | u(16) |
|     }else if(tone_map_model_id == 5) { | |
|       compression_flag | u(1) |
|       representative_input_knee_point | u(16) |
|       representative_output_knee_point | u(16) |
|       d_range | u(32) |
|       d_range_disp_luminance | u(32) |
|       num_knee_point_minus1 | u(2) |
|       for(i=0;i<=num_knee_point_minus1;i++) { | |
|         input_knee_point[i] | u(16) |
|         output_knee_point[i] | u(16) |
|       } | |
|     } | |
|   } | |
| } | |

FIG. 40

| knee_function_info(payloadSize) { | Descriptor |
|---|---|
| knee_function_id | ue(v) |
| knee_function_cancel_flag | u(1) |
| if(!knee_function_cancel_flag) { | |
| knee_function_persistence_flag | u(1) |
| compression_flag | u(1) |
| input_d_range | u(32) |
| input_disp_luminance | u(32) |
| output_d_range | u(32) |
| output_disp_luminance | u(32) |
| num_knee_point_minus1 | ue(v) |
| for (i=0; i<=num_knee_point_minus1; i++) { | |
| input_knee_point[i] | u(10) |
| output_knee_point[i] | u(10) |
| } | |
| } | |
| } | |

FIG. 41 knee_function_persistence_flag specifies the persistence of the knee function information SEI message.
knee_function_persistence_flag equal to 0 specifies that the knee function information applies to the current decoded picture only.
knee_function_persistence_flag equal to 1 specifies that the knee function information persists in output order until any of the following conditions are true:
- A new CVS begins
- A picture in an access unit containing a knee function information SEI message with the same value of knee_function_id is output having PicOrderCnt(CurrPic) greater than PicOrderCnt(PrevPic).

compression_flag equals to 0 indicates that the knee function is decompression function, compression_flag equals to 1 indicates that the knee function is compression function.
num_knee_point_minus1 plus 1 specifies the number of knee points without counting the two default end points, (0,0) and (1,1).
input_d_range specifies the peak luminance level of the input picture in relative to the nominal luminance level in units of 0.1%. When the value of input_d_range is 0, the peak luminance level of the input picture is unspecified.
input_disp_luminance specifies the expected display brightness of peak luminance level for the input picture. The value of input_disp_luminance is in units of candela per square metre. When the value of input_disp_luminance is 0, the expected display brightness of peak luminance level for the input picture is unspecified.
output_d_range specifies the peak luminance level of the output picture in relative to the nominal luminance level in units of 0.1%. When the value of output_d_range is 0, the peak luminance level of the output picture is unspecified.
output_disp_luminance specifies the expected display brightness of peak luminance level for the output picture. The value of output_disp_luminance is in units of candela per square metre. When the value of output_disp_luminance is 0, the expected display brightness of peak luminance level for the output picture is unspecified.
input_knee_point[i] specifies the luminance level of i-th knee point for input picture. The luminance level of input_knee_point for input picture is normalized in range of 0 to 1.0 in units of 0.1%. The value of input_knee_point shall be greater than 0 and less than 1000. The value of i-th input knee point shall be greater than the value of (i-1)-th input knee point.
output_knee_point[i] specifies the luminance level of i-th knee for output picture. The luminance level of the knee point for output picture is normalized in range of 0 to 1.0 in units of 0.1%. The value of output_knee_point is expressed in range of 0 to 1000.
NOTE 2 - The coordinate of the i-th knee point is defined as (input_knee_point[i], output_knee_point[i]).
Knee function is composed of several lines which starts with the point (0,0) ends with the point (1,1) through all knee points in ascending order of i.

FIG. 45

| tone_mapping_info(payloadSize) { | Descriptor |
|---|---|
|   tone_map_id | ue(v) |
|   tone_map_cancel_flag | u(1) |
|   if(!tone_map_cancel_flag) { | |
| --------snip---------- | |
|     if(tone_map_model_id == 0) { | |
| --------snip---------- | |
|       nominal_white_level_code_value | u(16) |
|       extended_white_level_code_value | u(16) |
|     }else if( tone_map_model_id == 5) { | |
|       compression_flag | u(1) |
|       input_d_range | u(32) |
|       input_disp_luminance | u(32) |
|       output_d_range | u(32) |
|       output_disp_luminance | u(32) |
|       num_knee_point_minus1 | ue(v) |
|       for(i=0;i<=num_knee_point_minus1;i++) { | |
|         input_knee_point[i] | u(10) |
|         output_knee_point[i] | u(10) |
|       } | |
|     } | |
|   } | |
| } | |

FIG. 46

```
Tone Mapping Information Box('tinf')
Box Type 'tinf'
Container Sample Table Box('stbl')or
          Track Fragment Box('traf')
Mandatory No
Quantity  Zero,or one in every track/track fragment aligned(8)class ToneMappingInformationBox
        extends FullBox('tinf',version=0,flags=0)
 {
        unsigned int(32) number_of_tone_mapping_info
        for(i=0;i<number_of_tone_mapping_info;i++)
        {
               ToneMapInfo tonemap;
        }
 }
```

FIG. 47

```
aligned(8) class ToneMapInfo
{
    unsigned int(32) tone_map_id
    unsigned int(7) padding_value
    unsigned int(1) tone_map_cancel_flag
    if(!tone_map_cancel_flag) {
        unsigned int(7) padding_value
        unsigned int(1) tone_map_persistence_flag
        unsigned int(8) coded_data_bit_depth
        unsigned int(8) target_bit_depth
        unsigned int(8) tone_map_model_id
        if(tone_map_model_id == 0) {
            unsigned int(32) min_value
            unsigned int(32) max_value
        }else if(tone_map_model_id == 1) {
            unsigned int(32) sigmoid_midpoint
            unsigned int(32) sigmoid_width
        }else if(tone_map_model_id == 2)
            for(j=0;j<(1<<target_bit_depth);j++)
                unsigned int(256) start_of_coded_interval[j]
        }else if(tone_map_model_id == 3) {
            unsigned int(16) num_pivots
            for(j=0;j<num_pivots;j++) {
                unsigned int(256) coded_pivot_value[j]
                unsigned int(256) target_pivot_value[j]
            }
        }else if(tone_map_model_id == 4) {
            unsigned int(8) camera_iso_speed_idc
            if(camera_iso_speed_idc == EXTENDED_ISO)
                unsigned int(32) camera_iso_speed_value
            unsigned int(8) exposure_index_idc
            if(exposure_index_idc == EXTENDED_ISO)
                unsigned int(32) exposure_index_value
            unsigned int(7) padding_value
            unsigned int(1) exposure_compensation_value_sign_flag
            unsigned int(16) exposure_compensation_value_numerator
            unsigned int(16) exposure_compensation_value_denom_idc
            unsigned int(32) ref_screen_luminance_white
            unsigned int(32) extended_range_white_level
            unsigned int(16) nominal_black_level_code_value
            unsigned int(16) nominal_white_level_code_value
            unsigned int(16) extended_white_level_code_value
        }else if(tone_map_model_id == 5) {
            unsigned int(1) compression_flag
            unsigned int(32) d_range
            unsigned int(32) d_range_disp_luminance
            unsigned int(2) num_knee_point_minus1
            for(i=0;i<=num_knee_point_minus1;i++) {
                unsigned int(16) input_knee_point[i]
                unsigned int(16) output_knee_point[i]
            }
        }
    }
}
```

FIG. 48 input_knee_point[i] MAY BE EQUAL TO OR LESS
THAN input_knee_point[i-1].
knee_function IS FORMED BY PLURAL STRAIGHT LINES WHICH CONNECT
ALL knee points TO EACH OTHER IN ASCENDING ORDER OF
input_knee_point[i] FROM (0.0, 0.0) TO (1.0, 1.0).
WHEN DECODED IMAGE IS CONVERTED INTO IMAGE THROUGH KNEE
CONVERSION, CONVERSION MAY BE PERFORMED BY USING APPROXIMATE
FUNCTION OF knee_function.
APPROXIMATE FUNCTION OF knee_function CAN BE OBTAINED
BY USING PLURAL STRAIGHT LINES WHICH CONNECT knee_points[0]
TO[N] IN ASCENDING ORDER OF input_knee_point[i] FROM (0.0, 0.0)
TO (1.0, 1.0) FOR ANY N OF $0 \leq N \leq$ num_knee_points_minus1.

num_knee_points_minus1 = 8

| i | 0 | 1 | 2 | 3 | 4 | 5 | 6 | 7 | 8 |
|---|---|---|---|---|---|---|---|---|---|
| input_knee_point | 200 | 600 | 100 | 400 | 800 | 300 | 500 | 700 | 900 |
| output_knee_point | 433 | 774 | 290 | 628 | 894 | 540 | 705 | 836 | 949 |

FIG. 55

| | Descriptor |
|---|---|
| knee_function_info ( payloadSize ) { | |
| knee_function_id | ue(v) |
| knee_function_cancel_flag | u(1) |
| if( !knee_function_cancel_flag ) { | |
| knee_function_persistence_flag | u(1) |
| mapping_flag | u(1) |
| input_d_range | u(32) |
| input_disp_luminance | u(32) |
| output_d_range | u(32) |
| output_disp_luminance | u(32) |
| num_knee_points_minus1 | ue(v) |
| for( i = 0; i <= num_knee_points_minus1; i++) { | |
| input_knee_point[i] | u(10) |
| output_knee_point[i] | u(10) |
| } | |
| for( j = 0; j <= num_knee_points_minus1; j++) { | |
| approximate_knee_point_index[j] | u(10) |
| } | |
| } | |
| } | |

FIG. 56

WHEN DECODED IMAGE IS CONVERTED INTO IMAGE THROUGH KNEE CONVERSION, CONVERSION MAY BE PERFORMED BY USING APPROXIMATE FUNCTION OF knee_function.

APPROXIMATE FUNCTION OF knee_function CAN BE OBTAINED BY USING PLURAL STRAIGHT LINES WHICH CONNECT knee_points [approximate_knee_point_index[0]] TO [approximate_knee_point_index[N]] IN ASCENDING ORDER OF i FROM (0.0, 0.0) TO (1.0, 1.0) FOR ANY N OF $0 \leq N \leq$ num_knee_points_minus1.

num_knee_points_minus1 = 8

| i | 0 | 1 | 2 | 3 | 4 | 5 | 6 | 7 | 8 |
|---|---|---|---|---|---|---|---|---|---|
| input_knee_point | 100 | 200 | 300 | 400 | 500 | 600 | 700 | 800 | 900 |
| output_knee_point | 290 | 433 | 540 | 628 | 705 | 774 | 836 | 894 | 949 |

| j | 0 | 1 | 2 | 3 | 4 | 5 | 6 | 7 | 8 |
|---|---|---|---|---|---|---|---|---|---|
| approximate_knee_point_index | 1 | 5 | 0 | 3 | 7 | 2 | 4 | 6 | 8 |

FIG. 60

| | Descriptor |
|---|---|
| approximate_knee_function_info ( payloadSize ) { | |
|   approximate_knee_function_id | ue(v) |
|   approximate_knee_function_cancel_flag | u(1) |
|   if( ! approximate_knee_function_cancel_flag ) { | |
|     ref_knee_function_id | ue(v) |
|     approximate_knee_function_persistence_flag | u(1) |
|     num_approximate_knee_point_indices_minus1 | ue(v) |
|     for( j = 0; j <= num_approximate_knee_point_indices_minus1; j++ ) { | |
|       approximate_knee_point_index[j] | u(10) |
|     } | |
|   } | |
| } | |

DECODING DEVICE AND DECODING METHOD, AND CODING DEVICE AND CODING METHOD

CROSS REFERENCE TO PRIOR APPLICATION

This application is a continuation of U.S. patent application Ser. No. 15/152,027 (filed on May 11, 2016), which is a continuation of U.S. patent application Ser. No. 14/980,780 (filed on Dec. 28, 2015, and issued as U.S. Pat. No. 9,826,248 on Nov. 21, 2017), which is a continuation of U.S. patent application Ser. No. 14/491,539 (filed on Sep. 19, 2014, and issued as U.S. Pat. No. 9,253,497 on Feb. 2, 2016), which claims priority to Japanese Patent Application Nos. 2013-215060 (filed on Oct. 15, 2013), 2013-272945 (filed on Dec. 27, 2013), and 2014-042174 (filed on Mar. 4, 2014), which are all hereby incorporated by reference in their entirety.

TECHNICAL FIELD

The present disclosure relates to a decoding device and a decoding method, and a coding device and a coding method, and particularly to a decoding device and a decoding method, and a coding device and a coding method capable of converting a decoded image into a desired image with a different dynamic range.

BACKGROUND ART

In recent years, apparatuses which conform to a method such as Moving Picture Experts Group (MPEG) have been widely spread for both of information delivery in broadcasting stations or the like and information reception in ordinary homes. MPEG compresses the image information through orthogonal transform such as discrete cosine trans form and motion compensation by using redundancy unique to the image information.

Particularly, an MPEG2 (ISO/IEC 13818-2) method is defined as a general use image coding method, and is currently widely used in extensive applications for professional use and consumer use as a standard covering both an interlaced scanning image and a progressive scanning image, and a standard resolution image and a high definition image. By the use of the MPEG2 method, it is possible to realize a high compression ratio and good image quality, for example, by assigning a bit rate of 4 Mbps to 8 Mbps to an interlaced scanning image of a standard resolution having 720×480 pixels and assigning a bit rate of 18 Mbps to 22 Mbps to an interlaced scanning image of a high resolution having 1920×1088 pixels.

MPEG2 has mainly targeted high image quality coding suitable for broadcasting, but has not handled a coding method at a bit rate lower than that in MPEG1, that is, at a higher compression ratio. With the wide use of portable terminals, the desire for such a coding method has been considered to increase, and thus an MPEG4 coding method has been standardized so as to correspond thereto. In relation to an image coding method of MPEG4, a standard thereof was approved as an international standard entitled ISO/IEC 14496-2 in December 1998.

In addition, in recent years, standardization of a standard called H.26L (ITU-T Q6/16 VCEG) has progressed for the original purpose of image coding for video conference use. H.26L uses a larger calculation amount due to coding and decoding than the coding method of the related art such as MPEG2 or MPEG4, but is known for realizing higher coding efficiency.

Further, as part of activities of MPEG4, Joint Model of Enhanced-Compression Video Coding is currently being standardized in order to realize higher coding efficiency by also incorporating functions which are not supported by H.26L, on the basis of H.26L. As for the standardization schedule thereof, the coding method has become an international standard under the name of H.26L and MPEG-4 Part 10 ((Advanced Video Coding (AVC)) in March 2003.

In addition, as an extension of the AVC method, Fidelity Range Extension (FRExt) which includes coding tools for use in business such as RGB or YUS422 and YUV444 and also includes 8×8 DCT or quantization matrix defined in MPEG2 was standardized in February 2005. This realizes a coding method in which even film noise included in a movie can be favorably expressed by using the AVC method, and thus leads to use for various applications such as a Blu-Ray (registered trademark) disc (BD).

However, recently, there have been increasing demands for higher compression ratio coding, such as a demand for compression of an image with about 4000×2000 pixels which is four times the size of a high-vision image or a demand for delivery of a high-vision image in limited transmission capacity circumstances such as the Internet. For this reason, study of improvement of coding efficiency is being currently performed in Video Coding Expert Group (VCEG) affiliated to the above ITU-T.

In addition, currently, for the purpose of improvement in higher coding efficiency than that of AVC, standardization of a coding method called High Efficiency Video Coding (HEVC) is in progress by Joint Collaboration Team-Video Coding (JCTVC) which is a joint standardization organization of ITU-T and ISO/IEC. NPL 1 has been currently published, as a draft in August 2013.

Meanwhile, recently, with the progress of techniques, a high dynamic range (HDR) display with the maximum luminance of 500 nit or 1000 nit has been started to be sold on the market.

In a case where a standard dynamic range (SDR) display and an HDR display are mixed, it is necessary to encode each of an SDR image and an HDR image in the AVC met nod or the HEVC method, and thus a data amount increases. Therefore, a method is considered in which one of the SDR image and the HDR image is coded, and then a dynamic range, is converted after decoding is performed as necessary, thereby generating the other.

CITATION LIST

Non Patent Literature

[NPL 1]
Benjamin Bross, Gary J. Sullivan, Ye-Kui Wang, "Editors' proposed corrections to HEVC version 1", JCTVC-M0432_v3, 2013. 4, 18-4. 26

SUMMARY

Technical Problem

However, conversion into an image which is intended by a producer is not considered when conversion of a dynamic range is converted, It is desirable to convert a decoded image into a desired image with a different dynamic range.

Solution to Problem

According to an embodiment of the present disclosure, there is provided a decoding device including: circuitry configured to receive coded data and conversion information, the coded data pertaining to an image having luminance in a first dynamic range and the conversion information pertaining to a conversion, of dynamic range of the luminance of the image from the first dynamic range into a second dynamic range; and decode the received coded data so as to generate the image, wherein the conversion uses a knee function.

A decoding method of causing a decoding device to perform: receiving coded data and conversion information, the coded data pertaining to an image having luminance in a first dynamic range and the conversion information pertaining to a conversion of dynamic range of the luminance of the image from the first dynamic range into a second dynamic range; and decoding the received coded data so as to generate the image, wherein the conversion uses a knee function.

A coding device including: circuitry configured to set conversion information pertaining to a conversion of dynamic range of a luminance of an image from a first dynamic range into a second dynamic range; and code the image having luminance in the first dynamic range so as to generate coded data, wherein the conversion uses a knee function.

A non-transitory computer-readable medium having stored thereon coded data and conversion information, the coded data pertaining to an image having luminance in a first dynamic range and the conversion information pertaining to a conversion of dynamic range of the luminance of the image from the first dynamic range into a second dynamic range, wherein a decoding device decodes coded data, generates the image based on the decoded data, and converts the dynamic range based on the conversion information including a knee point.

According to an embodiment of the present disclosure, there is provided a decoding device including an extraction unit that extracts coded data and conversion information, from a coded stream including the coded data of a first image which is an image having luminance in a first dynamic range and the conversion information regarding conversion of a dynamic range of the luminance of the image from the first dynamic range into a second dynamic range; and a decoding unit that decodes the coded data extracted by the extraction unit so as to generate the first image.

A decoding method according to an embodiment of the present disclosure corresponds to the decoding device according to the embodiment of the present disclosure.

According to an embodiment of the present disclosure, coded data and conversion information are extracted from at coded stream including the coded data of a first image which is an image having luminance in a first dynamic range and the conversion information which is information regarding conversion of a dynamic range of the luminance of the image from the first dynamic range into a second dynamic range, and the extracted coded data is decoded so that the first image is generated.

According to another embodiment of the present disclosure, there is provided a coding device including a setting unit that sets conversion information which is information regarding conversion of a dynamic range, of luminance of an image from a first dynamic range into a second dynamic range; a coding unit that codes a first image which is the image having luminance in the first dynamic range so as to generate coded data; and a transmission unit that transmits a coded stream including the conversion information, set by the setting unit and the coded data of the first image generated by the coding unit.

A coding method of another embodiment of the present disclosure corresponds to the coding device according to another embodiment of the present disclosure.

According to an embodiment of the present disclosure, conversion information is set which is information regarding conversion of a dynamic range of luminance of an image from a first dynamic range into a second dynamic range, a first image which is the image having luminance in the first dynamic range is coded so that coded data is generated, and a coded stream including the conversion information and the coded data of the first image is transmitted.

In addition, the decoding device and the coding device according to the embodiments may be implemented by executing a program in a computer.

Further, the program executed in the computer in order to implement the decoding device and the coding device according to an embodiment may be provided by transmitting the program via a transmission medium or by recording the program on a recording medium.

The decoding device and the coding device according to embodiments may be standalone devices, and may be an internal block forming a single apparatus.

Advantageous Effects of Invention

According to an embodiment of the present disclosure, it is possible to decode coded data of an image. In addition, according to the embodiment of the present disclosure, it is possible to convert a decoded image into a desired image with a different dynamic range.

According to another embodiment of the present disclosure, it is possible to code an image. In addition, according to another embodiment of the present disclosure, it is possible, to code an image so that a decoded image can be converted, into a desired image with a different dynamic range during decoding.

In addition, the effects described here are not necessarily limited, and there may be any one of effects described in the present disclosure.

BRIEF DESCRIPTION OF DRAWINGS

FIG. 7 is a diagram illustrating an example of syntax of knee_function_info SEI.
FIG. 8 is a diagram illustrating each piece of information, set in the knee_function_info SEI of FIG. 7.

FIG. 14 is a diagram, illustrating another example of syntax of the knee_function_info SEI.

FIG. 15 is a diagram, illustrating each piece of information set in the knee_function_info SEI of FIG. 14.

FIG. 16 is a block diagram illustrating a configuration example of a first embodiment of a coding device to which an embodiment of the present disclosure is applied.

FIG. 17 is a diagram illustrating a first example of syntax of knee_function_info SEI set by a setting unit of FIG. 16.

FIG. 18 is a diagram illustrating each piece of information set in the knee_function_info SEI of FIG. 17.

FIG. 26 is a diagram illustrating an example of syntax of tone_mapping_info_SEI including the DR conversion information of FIG. 17.

FIG. 27 is a diagram illustrating another example of syntax of tone_mapping_info_SEI including the DR conversion information of FIG. 17.

FIG. 28 is a diagram illustrating a second example of syntax of knee_function_info SEI set by the setting unit of FIG. 16.

FIG. 29 is a diagram illustrating each piece of information set in the knee_function_info SEI of FIG. 28.

FIG. 32 is a diagram illustrating an example of syntax of tone_mapping_info_SEI including the DR conversion information of FIG. 28.

FIG. 33 is a diagram illustrating each piece of information set in the knee_function_info SEI of FIG. 28 in a case where the number of knee points is restricted.

FIG. 34 is a diagram illustrating an example of the knee_function_info SEI of FIG. 28 in a case where the number of knee points is restricted.

FIG. 35 is a diagram illustrating an example of the tone_mapping_info_SEI of FIG. 32 in a case where the number of knee points is restricted.

FIG. 36 is a diagram illustrating a third example of syntax of knee_function_info SEI set by the setting unit of FIG. 16.

FIG. 37 is a diagram illustrating each piece of information set in the knee_function_info SEI of FIG. 36.

FIG. 39 is a diagram illustrating an example of syntax of tone_mapping_info_SEI including the DR conversion information of FIG. 36.

FIG. 40 is a diagram illustrating a fourth example of syntax of knee_function_info SEI set by the setting unit of FIG. 16.

FIG. 41 is a diagram illustrating each, piece of information set in the knee_function_info SEI of FIG. 40.

FIG. 45 is a diagram illustrating an example of syntax of tone_mapping_info_SEI including the DR conversion information of FIG. 40.

FIG. 46 is a diagram illustrating a box of MP4 in which DR conversion information is disposed.

FIG. 47 is a diagram illustrating an example of syntax of ToneMapInfo.

FIG. 48 is a diagram illustrating that semantics in a first configuration of a third embodiment of a coding device to which the present disclosure is applied is different from that in the second embodiment.

FIG. 55 is a diagram illustrating an example of syntax of knee_function_info SEI in a second configuration of the third embodiment of the coding device to which the present disclosure is applied.

FIG. 56 is a diagram, illustrating a difference in semantics of FIG. 55 from the second embodiment.

FIG. 60 is a diagram illustrating an example of syntax of approximate_knee_function_info SEI.

DESCRIPTION OF EMBODIMENTS

[Base of Present Disclosure]
[Description of SDR Image]

Figure 1:
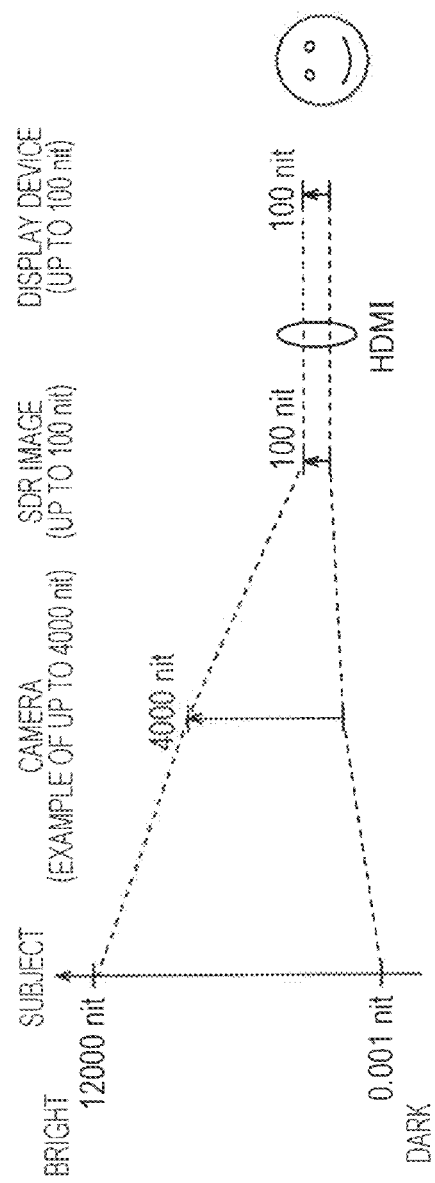
FIG. 1 is a diagram illustrating an SDR image.

FIG. 1 is a diagram illustrating an SDR image.

As illustrated in FIG. 1, an SDR image is, for example, an image whose image quality is adjusted so as to correspond to a display device with the maximum luminance 100 nit (candela per square meter). Since the maximum luminance in the natural system reaches 20000 nit or more in sortie cases, in the SDR image, a brightness dynamic range is greatly compressed.

[Description of HDR Image]

Figure 2:
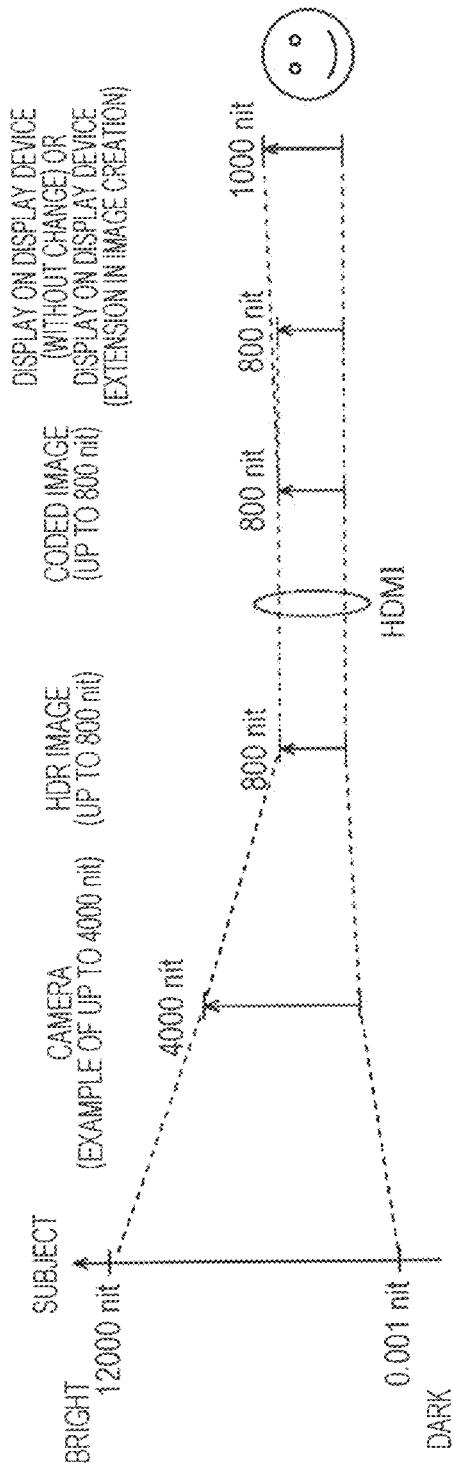
FIG. 2 is a diagram illustrating an HDR image.

FIG. 2 is a diagram illustrating an HDR image.

As illustrated in FIG. 2, an HDR image is an image in which a dynamic range of luminance is greater than 0 to 100%. In the present specification, unless otherwise described, a dynamic range of a luminance of the HDR image is 0 to 400%. For example, as illustrated in FIG. 2, in a case where an HDR image in which a dynamic range of luminance is 0 to 800% (800 nit) is coded, and is recorded on a Blu-ray (registered trademark) disc (BD) or the like, attribute information indicating the luminance is also recorded along with the HDR image. In addition, the attribute information is input to a display device along with a decoded HDR image, and the HDR image is displayed as an image in which a dynamic range of luminance is 0 to 800%.

Further, in a case where the maximum luminance of the display device is 1000 nit, for example, luminance of an HDR image is scaled to 1000 nit and is displayed. Even in a case where the scaling is performed in this way, an HDR image has a dynamic range of luminance of 0 to 800%, and thus image quality deterioration thereof due to the scaling is smaller than that of an SDR image.

First Embodiment (Overview of Coding in First Embodiment)

Figure 3:
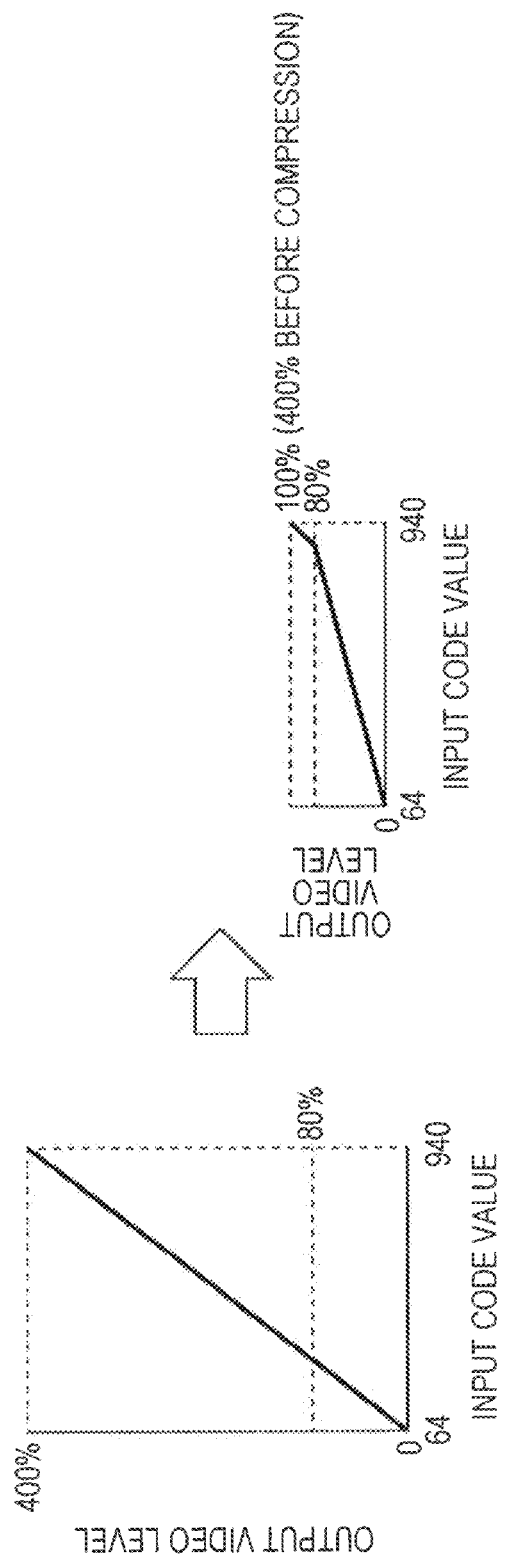
FIG. 3 is a diagram illustrating an overview of coding in an embodiment of the present disclosure.

FIG. 3 is a diagram illustrating an overview of coding in a first embodiment of a coding device to which the present disclosure is applied.

In FIG. 3, the transverse axis expresses a luminance value (input code value), and the longitudinal axis expresses luminance (output video level). In addition, the luminance value of the transverse axis of FIG. 3 is a value obtained by setting the number of bits of the luminance value to 10 bits and setting white luminance having undergone knee conversion to 100%, but a luminance value converted, into luminance in practice is a value which is normalized to 0 or more and 1 or less. This is also the same for FIG. 5 described later.

As illustrated in FIG. 3, in the first embodiment, 80% to 400% of an HDR image in which a dynamic, range of luminance is 0 to 400% is knee-compressed to 80% to 100%, so that an SDR image in which a dynamic range of luminance is 0 to 100% is generated and is then coded.

[Overview of Decoding in First Embodiment]

Figure 4:
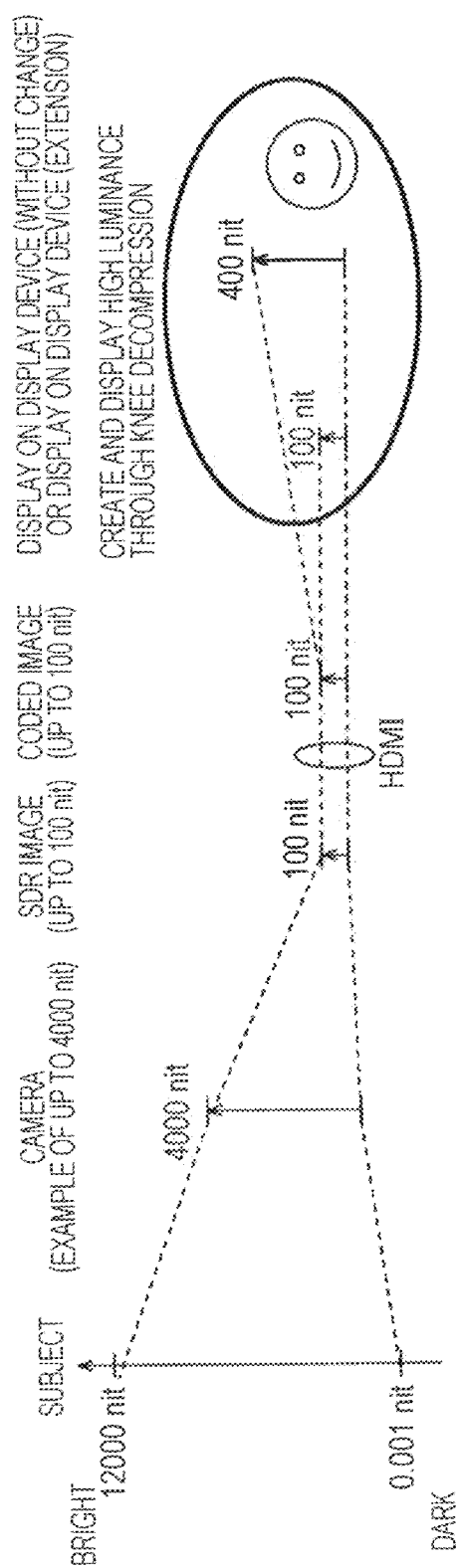
FIG. 4 is a diagram illustrating an overview of decoding in an embodiment of the present disclosure.

FIG. 4 is a diagram illustrating an overview of decoding in the first embodiment of a decoding device to which the present disclosure is applied.

As illustrated in FIG. 4, in the first embodiment, coded data of the SDR image in which a dynamic range of luminance is 0 to 100%, generated as described in FIG. 3, is decoded. In a case where a display unit is an SDR display, the SDR image which is obtained as a result of the decoding is input to and is displayed on the display unit without change. On the other hand, in a case where the display unit is an HDR display, the SDR image obtained as a result of the decoding is scaled to an HDR image, and is input to and is displayed on the display unit.

Figure 5:
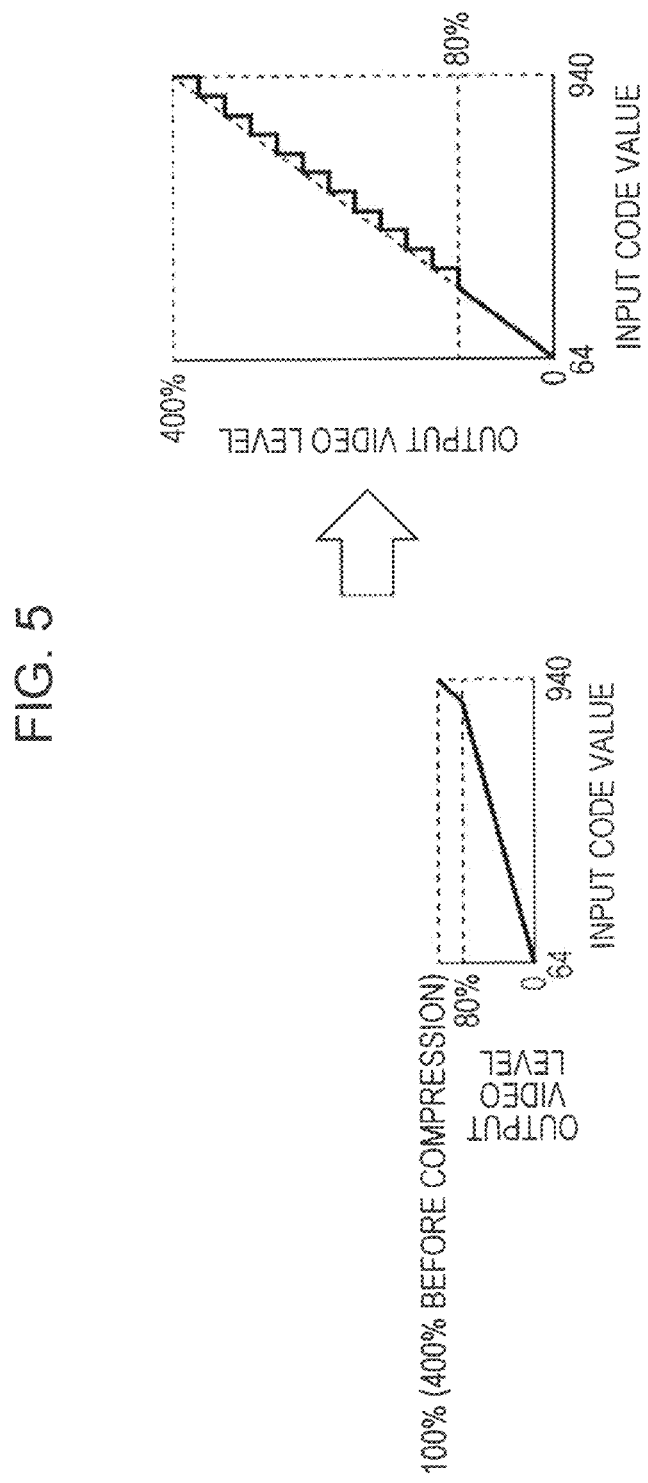
FIG. 5 is a diagram illustrating knee decompression.

Specifically, as illustrated in FIG. 5, 80% to 100% of the SDR image in which a dynamic range of luminance is 0 to 100% is knee-decompressed to 80% to 400%, and thus an HDR image in which a dynamic range of luminance is 0 to 400% is generated. In addition, the generated HDR image is displayed.

In addition, at this time, in order to generate a desired HDR image, information regarding conversion from an SDR image into the desired HDR image, such as a range (80% to 100% in the example of FIG. 5) of luminance of an SDR image which is knee-decompressed, and a range (80% to 400% in the example of FIG. 5) of luminance of an HDR image corresponding to the range, is necessary. Therefore, in the first, embodiment, conversion information regarding conversion from an SDR image into an HDR image is transmitted from the coding device to the decoding device, and thus a desired HDR image can be generated from a decoded SDR image in the decoding device.

(Configuration Example of First Embodiment of Coding Device)

Figure 6:
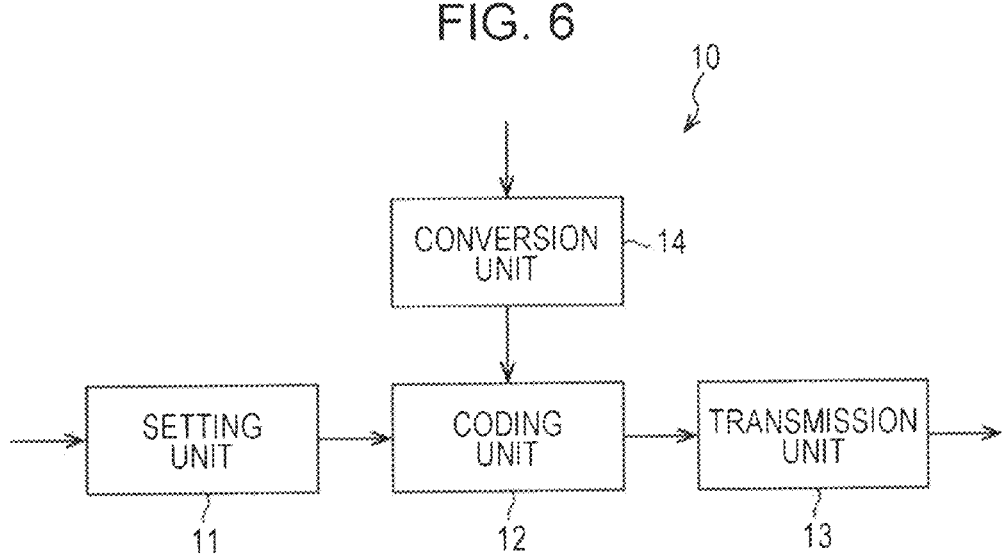
FIG. 6 is a block diagram illustrating a configuration example of an embodiment of a coding device to which the present disclosure is applied.

FIG. 6 is a block diagram illustrating a configuration example of the first embodiment of a coding device to which the present disclosure is applied.

A coding device 10 of FIG. 6 includes a setting unit 11, a coding unit 12, a transmission unit 13, and a conversion unit 14, and codes an SDR image which is converted from an HDR image in a method conforming to the HEVC method.

Specifically, the setting unit 11 of the coding device 10 sets a sequence parameter set (SPS), a picture parameter set (PPS), VUI, and the like. In addition, the setting unit 11 sets knee_function_info Supplemental Enhancement Information (SEI) including conversion information in response to a command from a user (producer). The setting unit 11 supplies the parameter sets including the set SPS, PPS, VUI, knee_function_info SEI, and the like to the coding unit 12.

The coding unit 12 codes the SDR image supplied from the conversion unit 14 in the HEVC method. The coding unit 12 generates a coded stream from coded data, which is obtained as a result of the coding and the parameter sets which are supplied from the setting unit 11, and transmits the generated coded stream to the transmission unit 13.

The transmission unit 13 transmits the coded stream supplied from the coding unit 12, to a decoding device described later. In addition, the transmission unit 13 may transmit the coded stream to a recording device which records the coded stream on a recording medium such as a BD. In this case, the coded stream is transmitted to the decoding device via the recording medium.

The conversion unit 14 converts an HDR image input from an external device into an SDR image through knee compression, and supplies the SDR image to the coding unit 12.

(Example of Syntax of Knee_Function_Info SEI)

FIG. 7 is a diagram illustrating an example of syntax of knee_function_info SEI, and FIG. 8 is a diagram illustrating each piece of information set in the knee_function_info SEI of FIG. 7.

As illustrated in FIG. 7, input knee position information (knee_point_of_input), output knee position information (knee_point_of_input), output luminance range information (output_white_level_range), output luminance information (output_white_level_range_luminance), and the like are set in the knee_function_info SEI as conversion information.

The input knee position information is information indicating the minimum value (knee point) of luminance which is knee decompression of an SDR image which is an unconverted image.

The input knee position information is a permillage of a knee point when the maximum value of luminance of an SDR image is set to 1000 permil.

The output knee position information is information indicating luminance of an HDR image which is a converted image, corresponding to the minimum, value (knee point) of luminance which is a knee decompression target of an SDR image which is an unconverted image. The output knee position information is a permillage of luminance corresponding to a knee point when the maximum value of luminance of an HDR image is set to 1000 permil.

The output luminance range information is information indicating white luminance of an HDR image which is a converted image. In addition, the output luminance information is information indicating brightness (luminance) of the display unit, corresponding to white of the HDR image which is a converted image.

(Example of Conversion Information)

Figure 9:
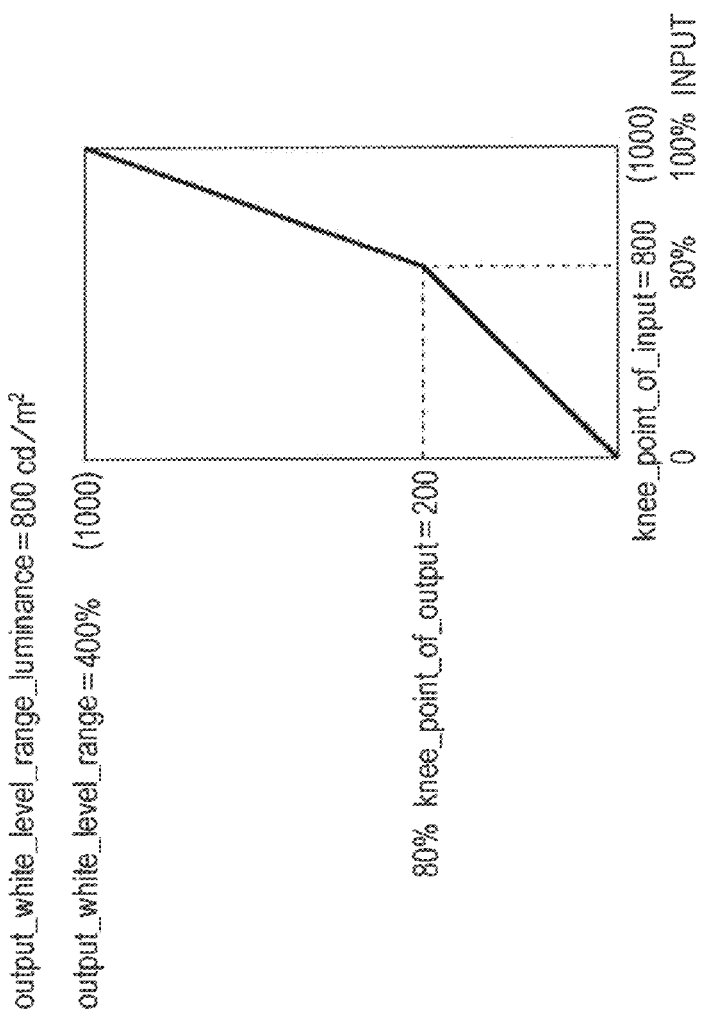
FIG. 9 is a diagram illustrating an example of conversion information set in the knee, function_info SEI.
Figure 10:
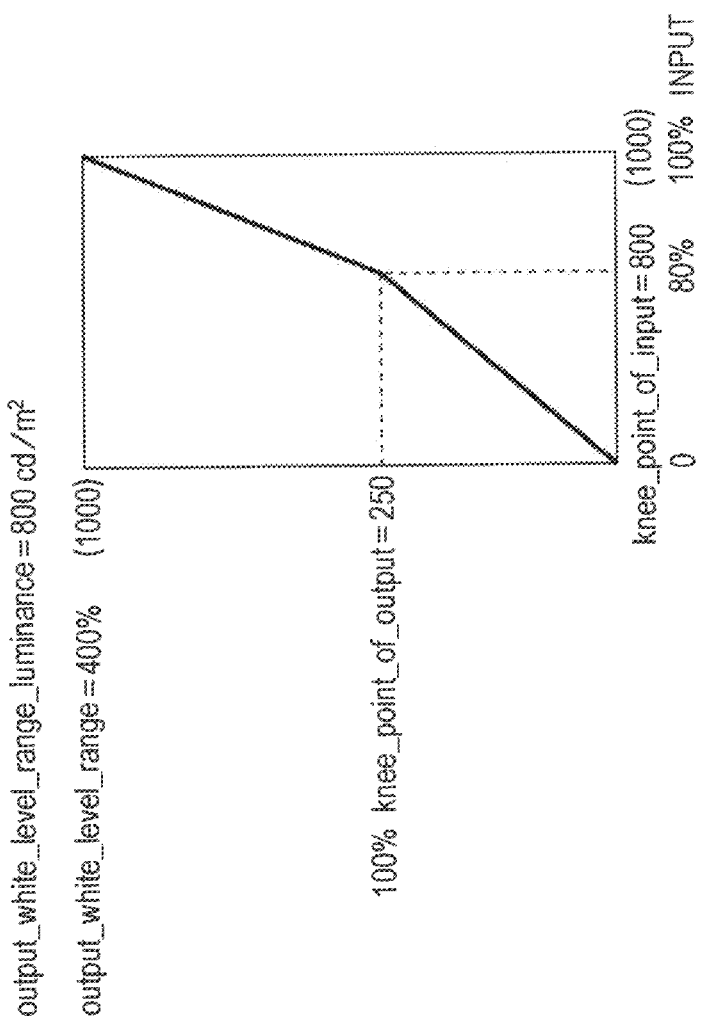
FIG. 10 is a diagram illustrating an example of conversion information set in the knee_function_info SEI.

FIGS. 9 and 10 are diagrams illustrating examples of conversion information set in the knee_function_info SEI.

In the example of FIG. 9, the user sets an HDR image which is obtained as a result of knee-decompressing 80% to 100% of luminance of an SDR image to 80% to 400% is used as a desired HDR image. In this case, in the knee_function_info SEI, 800as the input knee position information (knee_point_of_input), and 200 is set as the output knee position information (knee_point_of_output).

Therefore, a decoding device described later can knee-decompress 80% to 100% of luminance of an SDR image which is obtained, as a result of decoding to 80% to 400% on the basis of the input knee position information and the output knee position information. As a result, the decoding device can convert the SDR image obtained as a result of the decoding into a desired HDR image.

In addition, in the example of FIG. 9, the output luminance range information (output_white_level_range) is 400, and the output luminance information (output_white_level_range_luminace) is 800 (candela per square meter).

In the example of FIG. 10, the user sets an HDR image which is obtained as a result of knee-decompressing 80% to 100% of luminance of an SDR image to 100% to 400% as a desired HDR image. In this case, in the knee_function_info SEI, 800 is set as the input knee position information (knee_point_of_input), and 250is set as the output knee position information (knee_point_of_output).

Therefore, the decoding device described later can knee-decompress 80% to 100% of luminance of an SDR image which is obtained as a result of decoding to 100% to 400% on the basis of the input knee position information and the output knee position information. As a result, the decoding device can convert the SDR image obtained as a result, of the decoding into a desired HDR image.

In addition, in the example of FIG. 10, the output luminance range information (output_white_level_range) is 400, and the output luminance information (output_white_level_range_luminace) is 800 (candela per square meter).

<Description of Process in Coding Device>

Figure 11:
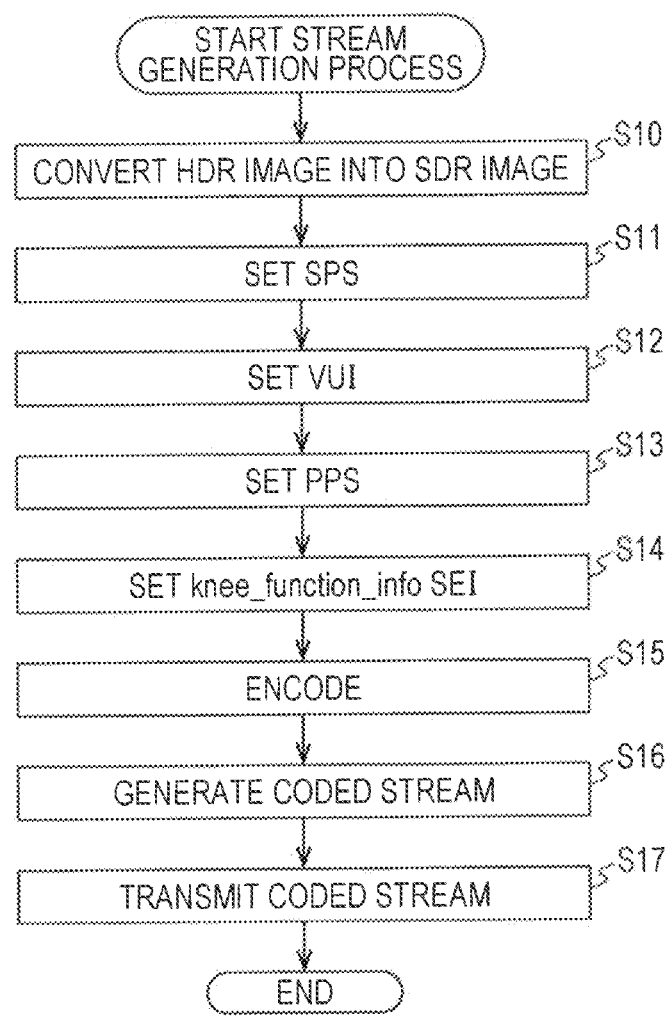
FIG. 11 is a flowchart illustrating a stream generation process performed by the coding device.

FIG. 11 is a flowchart illustrating a stream generation process performed by the coding device 10.

In step S10 of FIG. 11, the conversion unit 14 of the coding device 10 converts an HDR image which is input from an external device, into an SDR image which is then supplied to the coding unit 12.

In step S11, the setting unit 11 sets an SPS. In step S12, the setting unit 11 sets VUI. In step S13, the setting unit 11 sets a PPS.

In step S14, the setting unit 11 sets knee_function_info SEI in response to an instruction or the like from a user. The setting unit 11 supplies the parameter sets including the set SPS, PPS, VUI, knee_function_info SEI, and the like to the coding unit 12.

In step S15, the coding unit 12 codes the SDR image supplied from, the conversion unit 14 in the HEVC method. In step S16, the coding unit 12 generates a coded stream from coded data which is obtained as a result of the coding and the parameter sets which are supplied from the setting unit 11, and transmits the generated coded stream, to the transmission unit 13.

In step S17, the transmission unit 13 transmits the coded stream supplied from the coding unit 12, to the decoding device described, later, and then finishes the process.

As mentioned above, the coding device 10 sets and transmits knee_function_info SEI including conversion information, and thus the decoding device described later can convert an SDR image obtained as a result of decoding into a desired HDR image on the basis of the conversion information. Therefore, it can be said that the coding device 10 can code an SDR image so that a decoded SDR image can be converted into a desired HDR image during decoding.

In addition, since the conversion information is set, the coding device 10 can generate a coded stream of an image corresponding to an HDR display and an SDR display only by coding an SDR image. Therefore, it is possible to further reduce a data amount of a coded stream than in a case of coding both an HDR image and an SDR image.

(Configuration Example of First Embodiment of Decoding Device)

Figure 12:
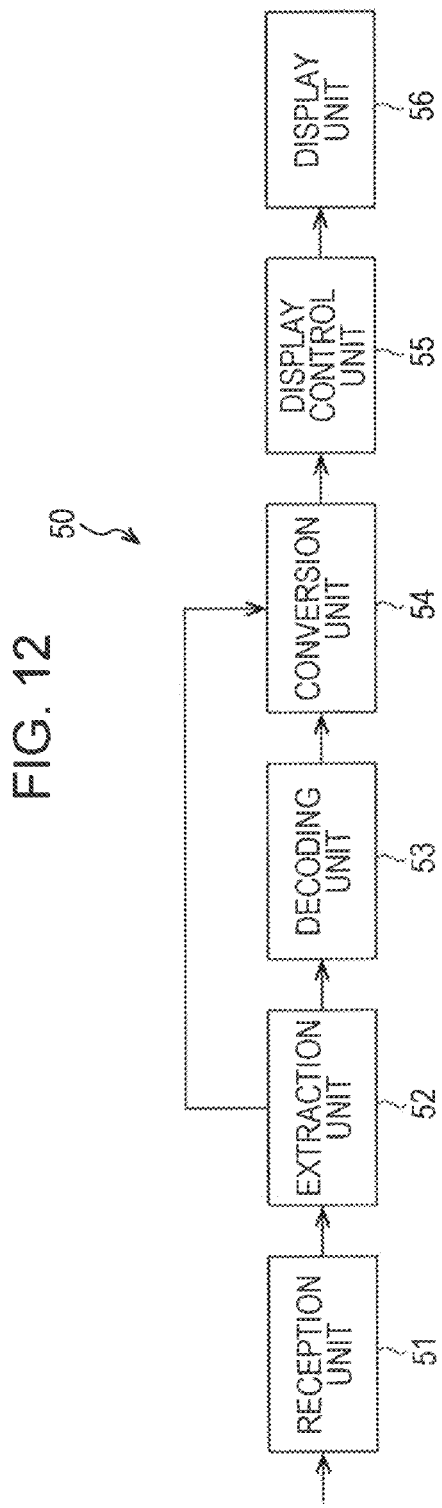
FIG. 12 is a block diagram illustrating a configuration example of an embodiment of a decoding device to which the present disclosure is applied.

FIG. 12 is a block diagram illustrating a configuration example of an embodiment of a decoding device which decodes a coded stream transmitted from the coding device 10 of FIG. 6 and to which the present disclosure is applied.

A decoding device 50 of FIG. 12 includes a reception unit 51, an extraction unit 52, a decoding unit 53, a conversion unit 54, a display control unit 55, and a display unit 56.

The reception unit 51 of the decoding device 50 receives the coded stream transmitted from the coding device 10 of FIG. 6, and supplies the coded stream to the extraction unit 52.

The extraction unit 52 extracts the parameter sets and the coded data of the SDR image from the coded stream, which is supplied from the reception unit 51. The extraction unit 52 supplies the parameter sets and the coded data to the decoding unit 53. In addition, the extraction unit 52 supplies the knee_function_info SEI among the parameter sets, to the conversion unit 54.

The decoding unit 53 decodes the coded data of the SDR image supplied from the extraction unit 52 in the HEVC method. At this time, the decoding unit 53 also refers to the parameter sets supplied from the extraction unit 52 as necessary. The decoding unit 53 supplies the SDR image which is obtained as a result of decoding to the conversion unit 54.

The conversion unit 54 converts the SDR image supplied from the decoding unit 53 into an HDR image through knee decompression on the basis of the conversion information included in the knee_function_info SEI supplied from the extraction unit 52, and supplies the HDR image to the display control unit 55.

The display control unit 55 displays the HDR image supplied from the conversion unit 54 on the display unit 56. The display unit 56 is an HDR display.

<Description of Process in Decoding Device>

Figure 13:
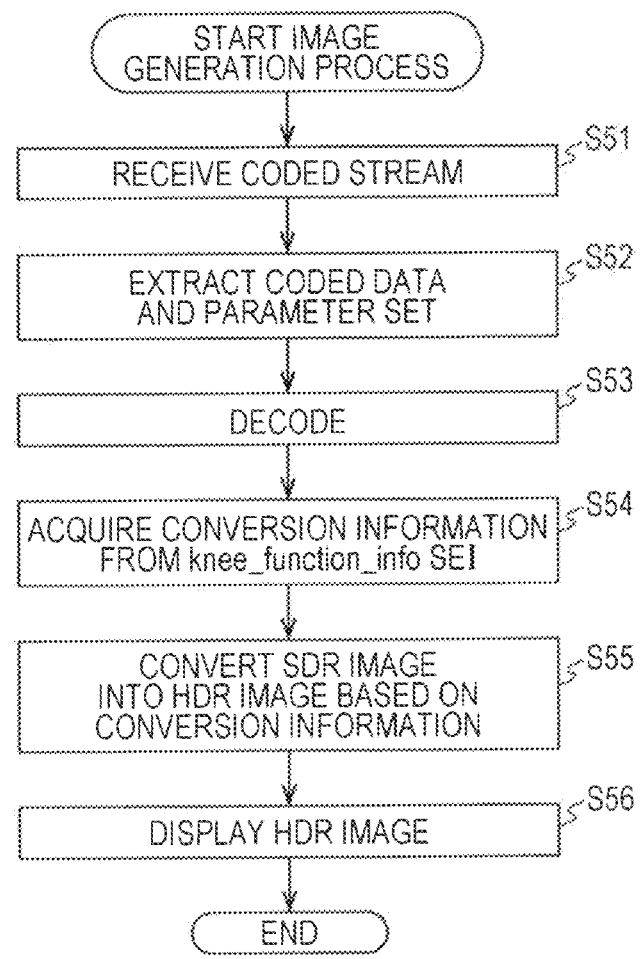
FIG. 13 is a flowchart illustrating an image generation process performed by the decoding device of FIG. 12.

FIG. 13 is a flowchart illustrating an image generation process performed by the decoding device 50 of FIG. 12.

In step S51 of FIG. 13, the reception unit 51 of the decoding device 50 receives the coded stream transmitted from the coding device 10 of FIG. 6, and supplies the coded stream to the extraction unit 52.

In step S52, the extraction unit 52 extracts the parameter sets and the coded data of the SDR image from the coded, stream which is supplied from the reception unit 51. The extraction unit 52 supplies the parameter sets and the coded data of the SDR image to the decoding unit 53. In addition, the extraction unit 52 supplies the knee_function_info SEI among the parameter sets, to the conversion unit 54.

In step S53, the decoding unit 53 decodes the coded data of the SDR image supplied from the extraction unit 52 in the HEVC method. At this time, the decoding unit 53 also refers to the parameter sets supplied from the extraction unit 52 as necessary. The decoding unit 53 supplies the SDR image which is obtained as a result of decoding to the conversion unit 54.

In step S54, the conversion unit 54 acquires the conversion information from the knee_function_info SEI which is supplied from the extraction unit 52.

In step S55, the conversion unit 54 converts the SDR image supplied from the decoding unit 53 into an HDR image on the basis of the conversion information, and supplies the HDR image to the display control unit 55.

In step S56, the display control unit 55 displays the HDR image supplied from the conversion unit 54 on the display unit 56, and finishes the process.

As mentioned above, the decoding device 50 converts the SDR image obtained as a result of decoding into the HDR image on the basis of the conversion information, and thus can convert the SDR image obtained as a result of decoding into a desired HDR image.

(Another Example of Syntax of Knee_Function_Info SEI)

FIG. 14 is a diagram illustrating another example of syntax of knee_function_info SEI, and FIG. 15 is a diagram illustrating each piece of information set in the knee_function_info SEI of FIG. 14.

The knee_function_info SEI of FIG. 14 is the same as the knee_function_info SEI of FIG. 7 except that luminance range information (white_level_range) and luminance information (white_level_range_luminance) are set instead of the output luminance range information (output_white_level_range) and the output luminance information (output_white_level_range_luminance).

The luminance range information is output luminance range information when input knee position information (knee_point_of_input) is equal to or more than output knee position information (knee_point_of_output), that is, when knee decompression is performed on a decoding side in the same manner as in the first, embodiment.

On the other hand, when the input knee position information is less than the output knee position information, that is, when knee compression is performed on the decoding side, the luminance range information is information indicating white luminance of an unconverted image (for example, an HDR image).

Similarly, the luminance information (white_level_ range_ luminance) is output luminance information when input knee position information is equal to or more than output knee position information in the same manner as in the first embodiment, and is information indicating white luminance (value) of an unconverted image (for example, an HDR image) when the input, knee position information is less than the output knee position information.

In addition, in the first embodiment, only an SDR image is coded in the coding device 10, but only an HDR image converted from the SDR image may be coded. In this case, information regarding conversion from the SDR image into the HDR image is set in SEI end is transmitted to the decoding device 50. Specifically, the knee_function_info SEI illustrated in FIG. 7 or FIG. 15 in which an unconverted image is set as an HDR image, and a converted image is set as an SDR image is transmitted to the decoding device 50. In addition, the decoding device 50 converts an HDR image into an original SDR image with high accuracy on the basis of the knee_function_info SEI.

In addition, in the first embodiment, the display unit 56 is an HDR display, but the display unit 56 may be an SDR display. In this case, the conversion unit 54 supplies an SDR image to the display control unit 55 without conversion into an HDR image. Accordingly, the SDR image is displayed on the display unit 56.

In addition, a desired image may be an HDR image which is input, to the coding device 10.

In addition, in the first embodiment, the coding device 10 converts an HDR image which is input from an external device into an SDR image which is then coded, but may code an SDR image which is input from the external device without conversion.

Second Embodiment (Configuration Example of Second Embodiment of Coding Device)

FIG. 16 is a block diagram illustrating a configuration example of a second embodiment of a coding device to which the present disclosure is applied.

Among constituent elements illustrated in FIG. 16, the same constituent elements as the constituent elements of FIG. 6 are given the same reference numeral. Repeated description will be omitted as appropriate.

A configuration of a coding device 70 of FIG. 16 is different from the configuration of the coding device 10 of FIG. 6 in that a setting unit 71, a coding unit 72, and a conversion unit 73 are provided instead of the setting unit 11, the coding unit 12, and the conversion unit 14. The coding device 70 codes an HDR image which is input from an external device, or codes an SDR image which is converted from an HDR image, in a method conforming to the HEVC method.

Specifically, the setting unit 71 of the coding device 70 sets, an SPS, a PPS, VUI, and the like. In addition, the setting unit 71 sets SEI such as knee_function_info SEI including DR conversion information in response to a command from a user (producer). The DR conversion information is information regarding conversion from a dynamic range of luminance of an image which is a coding target into a different dynamic range. The setting unit 71 supplies the parameter sets including the set SPS, PPS, VUI, knee_function_info SEI, and the like to the coding unit 72.

The coding unit 72 sets an HDR image or an SDR image supplied from the conversion unit 73 as a coding target image, and codes the coding target image in the HEVC method. The coding unit 72 generates a coded stream from coded data which is obtained as a result of the coding and the parameter sets which are supplied from the setting unit 71, and transmits the generated coded stream to the transmission unit 13.

The conversion unit 73 knee-compresses luminance of an HDR image which is input from an external device so as to generate an SDR image which is then supplied to the coding unit 72, or supplies an HDR image which is input from the external device to the coding unit 72 without compression.

(First Example of Syntax of Knee_Function_Info SEI)

FIG. 17 is a diagram illustrating a first example of syntax of knee_function_info SEI set by the setting unit 71 of FIG. 16, and FIG. 18 is a diagram illustrating each piece of information set in the knee_function_info SEI of FIG. 17.

As illustrated in FIG. 17, a knee conversion ID (knee_function_id) and a knee conversion cancel flag (knee_function_cancel_flag) are set in the knee_function_info SEI.

The knee conversion ID is an ID unique to the purpose of knee conversion which is knee compression or knee decompression as illustrated in FIG. 18. In addition, the knee conversion cancel flag is a flag illustrating whether or not persistence of previous knee_function_info SEI is canceled. The knee conversion cancel flag is set to 1 when indicating that persistence of previous knee_function_info SEI is canceled, and is set to 0 when the persistence is not canceled.

If the knee conversion cancel flag is 0, as illustrated in FIG. 17, a single piece of pre-conversion position information (input_knee_point), a single piece of post-conversion position information (output_knee_point), HDR luminance range information (d_range), and display luminance information (d_range_disp_luminance) are set in the knee_function_info SEI as DR conversion information.

The pre-conversion position information is information indicating a knee point of a coding target image which is an unconverted image in conversion corresponding to the DR conversion information, and is a permillage of a knee point when the maximum value of luminance of the coding target image is set to 1000 permil. The knee point is luminance (which is a value obtained by normalizing linear RGB values in the range of 0.0 to 1.1) other than 0 which is a start point of a range of luminance which is knee-converted at the same conversion ratio as that of a dynamic range of luminance of the coding target image.

The post-conversion position information is information indicating a start point of a range of luminance corresponding to a range of knee-converted luminance which has a knee point as a start point in an image after being converted (hereinafter, referred to as a converted image) in conversion corresponding to the DR conversion information. Specifically, the post-conversion position information is a permillage of luminance of a converted image corresponding to a knee point when the maximum value of luminance of the converted image is set to 1000 permil.

The HDR luminance range information is information indicating a permillage of the maximum value of luminance of an HDR image which is a coding target image or a converted image. In addition, the display luminance information is information indicating an expected value of brightness (luminance) of the display unit corresponding to the maximum value of luminance of an HDR image.

(First Example of DR Conversion Information)

Figure 19:
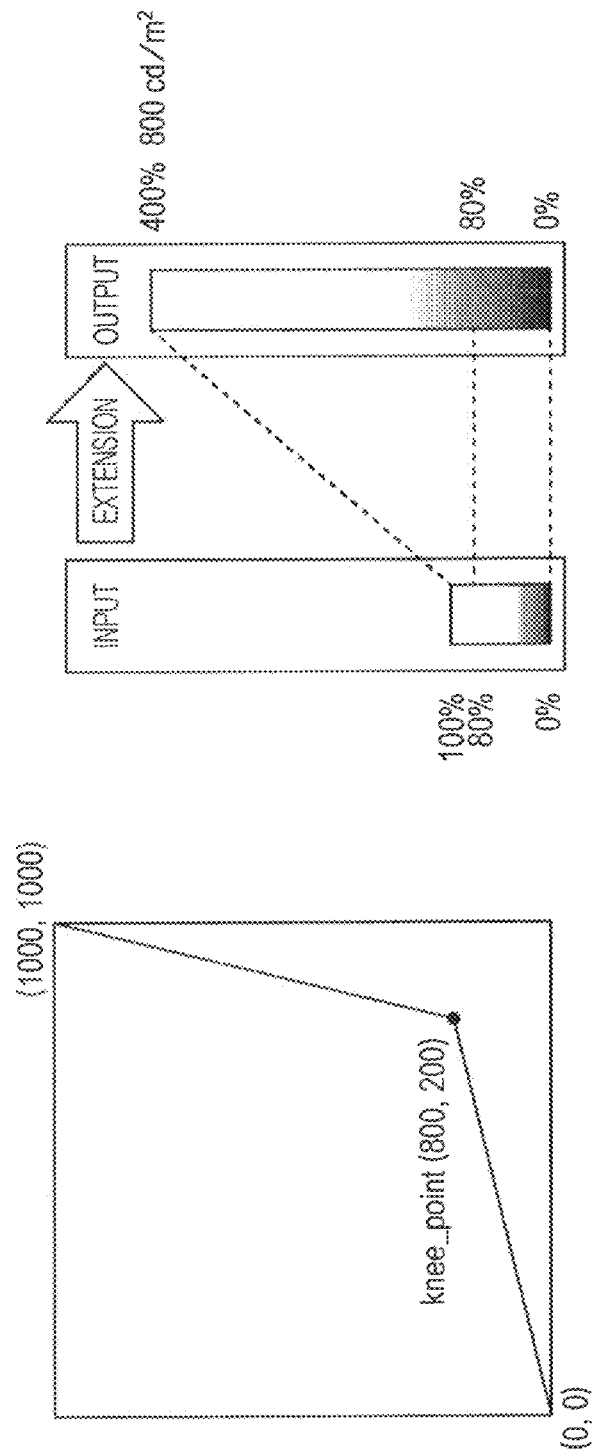
FIG. 19 is a diagram illustrating an example of DR conversion information of FIG. 17.
Figure 20:
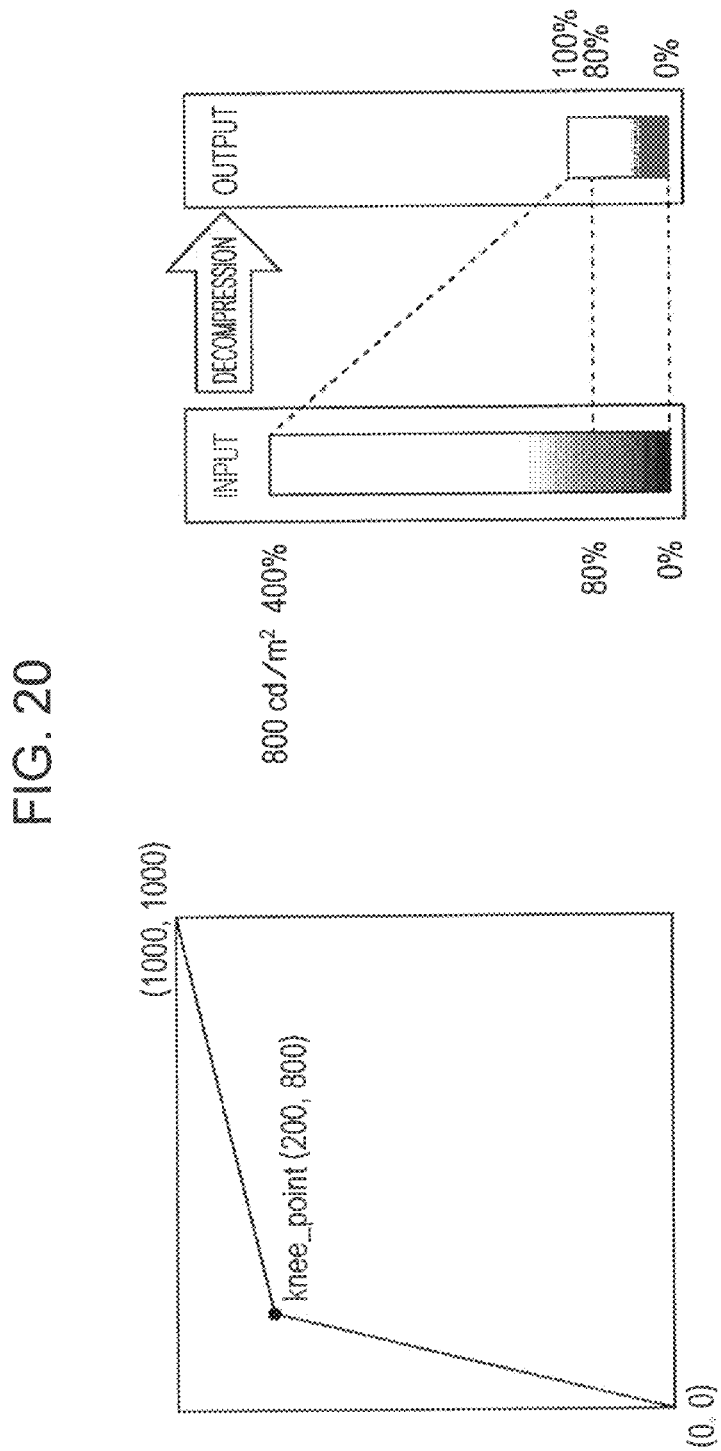
FIG. 20 is a diagram illustrating an example of DR conversion information of FIG. 17.

FIGS. 19 and 20 are diagrams illustrating examples of the DR conversion information set in the knee_function_info SEI of FIG. 17.

In the example of FIG. 19, a coding target image is an SDR image, and a user sets an HDR image which is obtained as a result of knee-decompressing 80% to 100% of luminance of the SDR image to 80% to 400%, as a desired converted image. In this case, in the knee_function_info SEI, 800 is set as the pre-conversion position information (input_knee_point), and 200 is set as the post-conversion position information (output_knee_point).

In addition, in the example of FIG. 19, the HDR luminance range information (d_range) is 4000, and the display luminance range information (d_range_disp_luminance) is 800 (candela per square meter).

As in the case of FIG. 19, in a case where a coding target image is an SDR image, and a converted image is an HDR image, a knee point input_knee_joint PER (%) and luminance output_knee_point_PER (%) of a converted image corresponding to the knee point are defined by the following Equation (1).

[Math. 1]

$$\text{input\_knee\_point\_DR} = 100 \times \frac{\text{input\_knee\_point}}{1000} \quad (1)$$

$$\text{output\_knee\_point\_DR} = \frac{\text{d\_range}}{10} \times \frac{\text{output\_knee\_point}}{1000}$$

Therefore, a decoding device described later recognizes that the knee point input_knee_point_PER and the luminance output_knee_point_PER are 80% according to Equation (1). In addition, the decoding device described later recognizes that knee conversion corresponding to the DR conversion information is knee decompression since the pre-conversion position information is equal to or more than the post-conversion position information. Further, the decoding device described later recognizes that the maximum value of luminance of the converted image is 400% from the HDR luminance range information.

As mentioned above, the decoding device described, later knee-decompresses 80% to 100% of luminance of the SDR image which is obtained, as a result of decoding to, 80% to 400%. Therefore, the decoding device can convert the SDR image obtained as a result, of decoding into a desired HDP image.

In the example of FIG. 20, a coding target image is an HDR image, and the user sets an SDR image which is obtained as a result, of knee-compressing 80% to 400% of luminance of the HDR image to 80% to 100%, as a desired converted image. In this case, in the knee_function_info SEI, 200 is set as the pre-conversion position information (input_knee_point), and 800 is set as the post-conversion position information (output_knee_point).

In addition, in the example of FIG. 20, the HDR luminance range information (d_range) is 4000, and the display luminance range information (d_range_disp_luminance) is 800 (candela per square meter).

As in the case of FIG. 20, in a case where a coding target image is an HDR image, and a converted image is an SDR image, a knee point input_knee_point_PER (%) and luminance output_knee_point_PER (%) of a converted image corresponding to the knee point are defined by the following Equation (2).

[Math. 2]

$$\text{input\_knee\_point\_DR} = \frac{\text{d\_range}}{10} \times \frac{\text{input\_knee\_point}}{1000} \quad (2)$$

$$\text{output\_knee\_point\_DR} = 100 \times \frac{\text{output\_knee\_point}}{1000}$$

Therefore, the decoding device described later recognizes that the knee point input_knee_point_PER and the luminance output_knee_point_PER are 80% according to Equation (2). In addition, the decoding device described later recognizes that knee conversion corresponding to the DR conversion information is knee compression since the pre-conversion position information is less than the post-conversion position information. Further, the decoding device described later recognizes that the maximum value of luminance of the converted image is 400% from the HDR luminance range information.

As mentioned above, the decoding device described later knee-compresses 80% to 400% of luminance of the SDR image which is obtained as a result of decoding, to 80% to 100%. Therefore, the decoding device can convert the HDR image obtained as a result of decoding into a desired SDR image.

<Description of Process in Coding Device>

Figure 21:
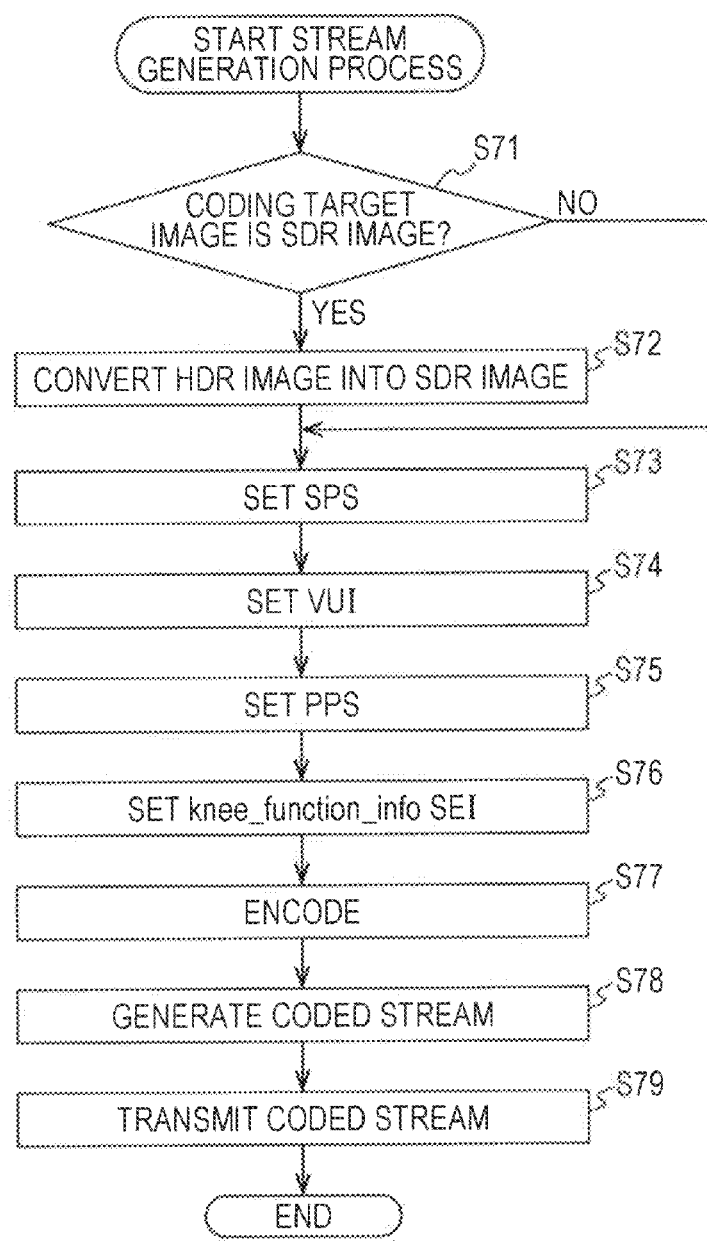
FIG. 21 is a flowchart illustrating a stream generation process performed by the coding device of FIG. 16.

FIG. 21 is a flowchart illustrating a stream generation process performed by the coding device 70 of FIG. 16.

In step S71 of FIG. 21, the conversion unit 73 of the coding device 70 determines whether or not, for example, a coding target image is an SDR image in response to an instruction or the like from the user. If it is determined, that a coding target image is an SDR image in step S71, the process proceeds to step S72.

In step S72, the conversion unit 73 converts an HDR image which is input from an external device into an SDR image through knee compression of luminance of the HDR image, and supplies the SDR image to the coding unit 72.

On the other hand, if it is determined that a coding target image is not an SDR image in step S71, that is, a coding target image is an HDR image, the conversion unit 73 supplies an HDR image which is input from an external device to the coding unit 72 without change, and the process proceeds to step S73.

In step S73, the setting unit 71 sets an SPS. In step S74, the setting unit 71 sets VUI. In step S75, the setting unit 71 sets a PPS.

In step S76, the setting unit 71 sets knee_function_info SEI in response to an instruction or the like from a user. The setting unit 71 supplies the parameter sets including the set SPS, PPS, VUI, knee_function_info SEI, and the like to the coding unit 72.

In step S77, the coding unit 72 codes an SDR image or an HDR image supplied from the conversion unit 73 as a coding target, image in the HEVC method. In step S78, the coding unit 72 generates a coded, stream from coded data which is obtained as a result of the coding and the parameter sets which are supplied from the setting unit 71, and transmits the generated coded stream to the transmission unit 13.

In step S79, the transmission unit 13 transmits the coded stream supplied from the coding unit 72, to the decoding device described later, and then finishes the process.

As mentioned above, the coding device 70 sets and transmits knee_function_info SEI including DR conversion information, and thus the decoding device described later can convert a coding target image obtained as a result of decoding into a desired converted image on the basis of the DR conversion information. Therefore, it can be said that, the coding device 70 can code an image so that a decoded image can be converted into a desired converted image during decoding.

In addition, since the DR conversion information is set, the coding device 70 can generate a coded stream of an image corresponding to an HDR display and an SDR display only by coding either an SDR image or an HDR image. Therefore, it is possible to further reduce a data amount of a coded stream than in a case of coding both an HDR image and an SDR image.

(Configuration Example of Second Embodiment of Decoding Device)

Figure 22:
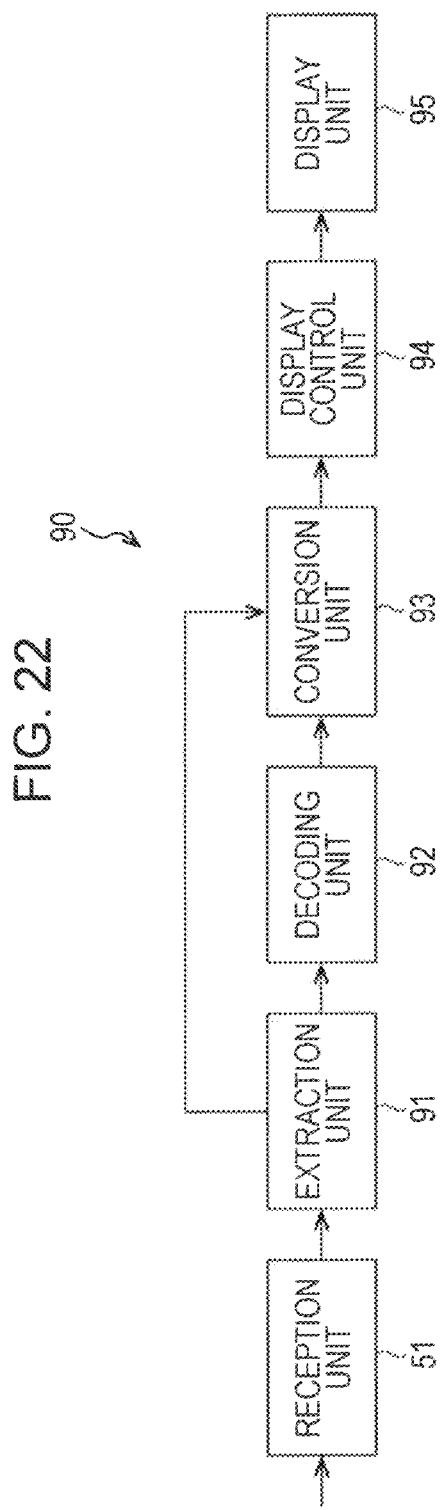
FIG. 22 is a block diagram illustrating a configuration example of a second embodiment of a decoding device to which the present disclosure is applied.

FIG. 22 is a block diagram illustrating a configuration example of a second embodiment of a decoding device which decodes a coded stream transmitted from the coding device 70 of FIG. 16 and to which the present disclosure is applied.

Among constituent elements illustrated in FIG. 22, the same constituent elements as the constituent elements of FIG. 12 are given the same reference numerals. Repeated description will be omitted as appropriate.

A configuration of a decoding device 90 of FIG. 22 is different from, the configuration of the decoding device 50 of FIG. 12 in that an extraction unit 91, a decoding unit 92, a conversion unit 93, a display control unit 94, and a display unit 95 are provided instead of the extraction unit 52, the decoding unit 53, the conversion unit 54, the display control unit 55, and the display unit 56. The decoding device 90 converts a decoded image into a converted image according to the type of display unit 95, and displays the converted image on the display unit 95.

Specifically, the extraction unit 91 of the decoding device 90 extracts parameter sets and coded data from a coded stream which is supplied from the reception unit 51. The extraction unit 91 supplies the parameter sets and the coded data to the decoding unit 92. In addition, the extraction, unit 91 supplies knee_function_info SEI among the parameter sets, to the conversion unit 93.

The decoding unit 92 decodes the coded data supplied from the extraction unit 91 in the HEVC method. At this time, the decoding unit 92 also refers to the parameter sets supplied from the extraction unit 91 as necessary. The decoding unit 92 supplies a decoded image to the conversion unit 93.

In a case where a dynamic range of luminance corresponding to the display unit 95 is a dynamic range of luminance of the decoded image, the conversion unit 93 supplies the decoded image which is supplied from the decoding unit 92, to the display control unit 94 without change. On the other hand, in a case where a dynamic range of luminance corresponding to the display unit 95 is not a dynamic range of luminance of the decoded image, the conversion unit 93 converts the decoded image into an converted image through knee conversion on the basis of DR conversion information included in the knee_function_info SEI supplied from the extraction unit 91. In addition, the conversion unit 93 supplies the converted image to the display control unit 94 as a display image.

Specifically, in a case where the display unit 95 is an HDR display, and the decoded image is an HDR image, or in a case where the display unit 95 is an SDR display, and the decoded image is an SDR image, the conversion unit 93 supplies the decoded, image to the display control unit 94 without change. On the other hand, in a case where the display unit 95 is an SDR display, and the decoded image is an HDR image, or in a case where the display unit 95 is an HDR display, and the decoded image is an SDR image, the conversion unit 93 performs knee conversion on the decoded image on the basis of the DR conversion information so as to generate a converted image. In addition, the conversion unit 93 supplies the converted image to the display control unit 94 as a display image.

The display control unit 94 displays the display image supplied from the conversion unit 93 on the display unit 95. Accordingly, in a case where the display unit 95 is an HDR display, an HDR image is displayed on the display unit 95 and in a case where the display unit 95 is an SDR display, an SDR image is displayed on the display unit 95. The display unit 95 is an HDR display or an SDR display, and displays a display image supplied from the display control unit 94.

<Description of Process in Decoding Device>

Figure 23:
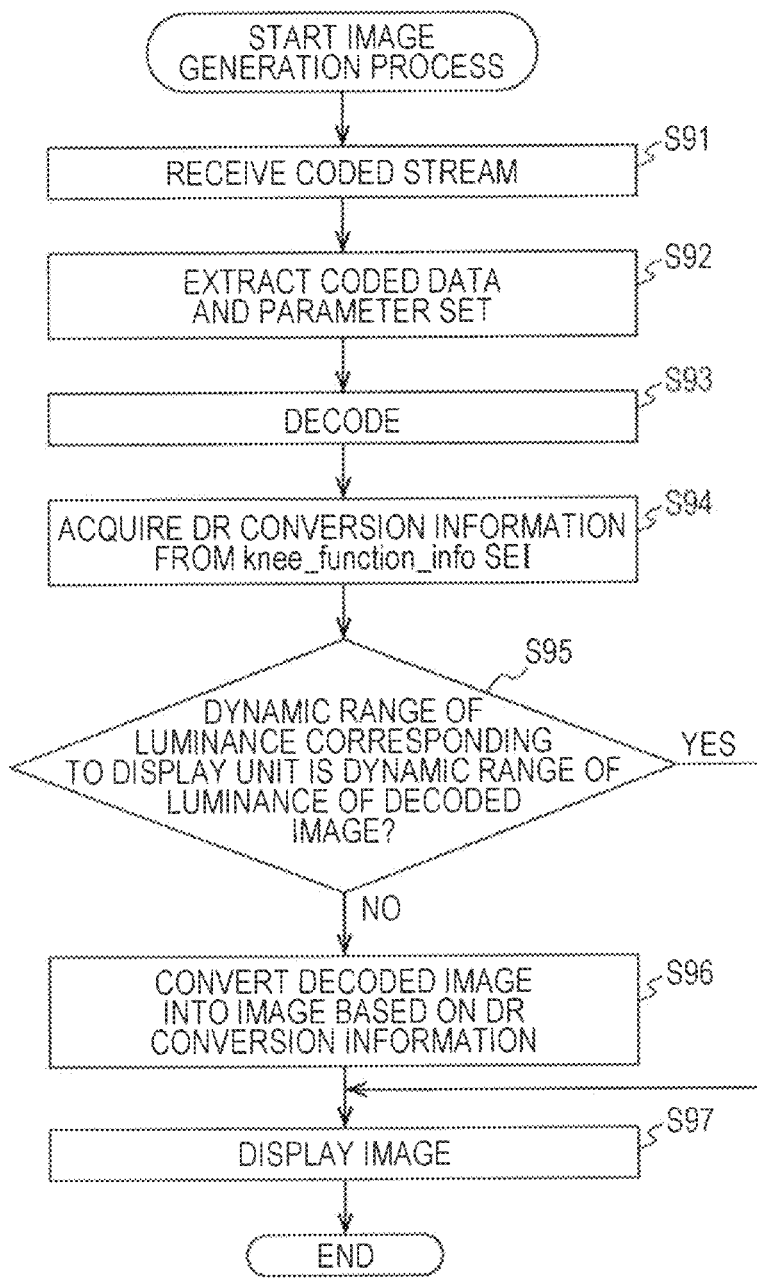
FIG. 23 is a flowchart illustrating an image generation process performed by the decoding device of FIG. 22.

FIG. 23 is a flowchart illustrating an image generation process performed by the decoding device 90 of FIG. 22.

In step S91 of FIG. 23, the reception unit 51 of the decoding device 90 receives a coded stream transmitted from the coding device 70 of FIG. 16, and supplies the coded stream to the extraction unit 91.

In step S92, the extraction unit 91 extracts parameter sets and coded data from the coded stream which is supplied from the reception unit 51. The extraction unit 91 supplies the parameter sets and the coded data to the decoding unit 92. In addition, the extraction unit 91 supplies knee_function_info SEI among the parameter sets, to the conversion unit 93.

In step S93, the decoding unit 92 decodes the coded data supplied from the extraction unit 91 in the HEVC method. At this time, the decoding unit 92 also refers to the parameter sets supplied from the extraction unit 91 as necessary. The decoding unit 92 supplies a decoded image to the conversion unit 93.

In step S94, the conversion unit 93 acquires DR conversion information from the knee_function_info SEI which is supplied from the extraction unit 91.

In step S95, the conversion unit 93 determines whether or not a dynamic range of luminance corresponding to the display unit 95 is a dynamic range of luminance of the decoded image. If it is determined that a dynamic range of luminance corresponding to the display unit 95 is not a dynamic range of luminance of the decoded image, the process proceeds to step S96.

In step S96, the conversion unit 93 converts the decoded image supplied from the decoding unit 92 into a converted image on the basis of the DR conversion information, arid supplies the converted, image to the display control unit 94 as a display image. In addition, the process proceeds to step S97.

On the other hand, it is determined in step S95 that a dynamic range of luminance corresponding to the display unit 95 is a dynamic range of luminance of the decoded image, the conversion unit 93 supplies the decoded image which is supplied from the decoding unit 92, to the display control unit 94 as a display image without change. In addition, the process proceeds to step S97.

In step S97, the display control unit 94 displays the display image supplied from the conversion unit 93 on the display unit 95, and finishes the process.

As mentioned above, the decoding device 90 converts the decoded image into the converted image on the basis of the DR conversion information, and thus can convert a decoded image to a desired converted image.

In addition, in the second, embodiment, one of an SDR image and an HDR image is a coding target image, and the other is a converted image, but an SDR image may be replaced with a desensitized development image of an HDR image in which an expected value of brightness of the display unit corresponding to the maximum value of luminance is greater than that of the SDR image.

(Second Example of DR Conversion Information)

Figure 24:
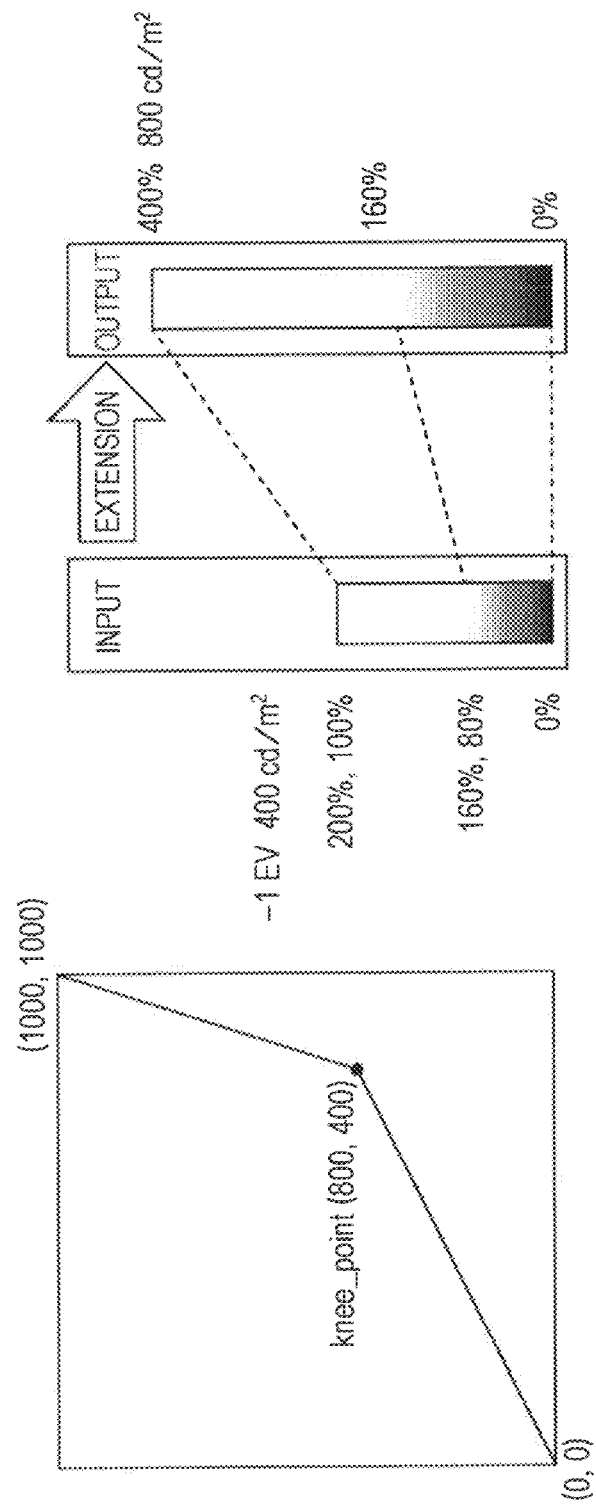
FIG. 24 is a diagram illustrating another example of DR conversion information of FIG. 17.
Figure 25:
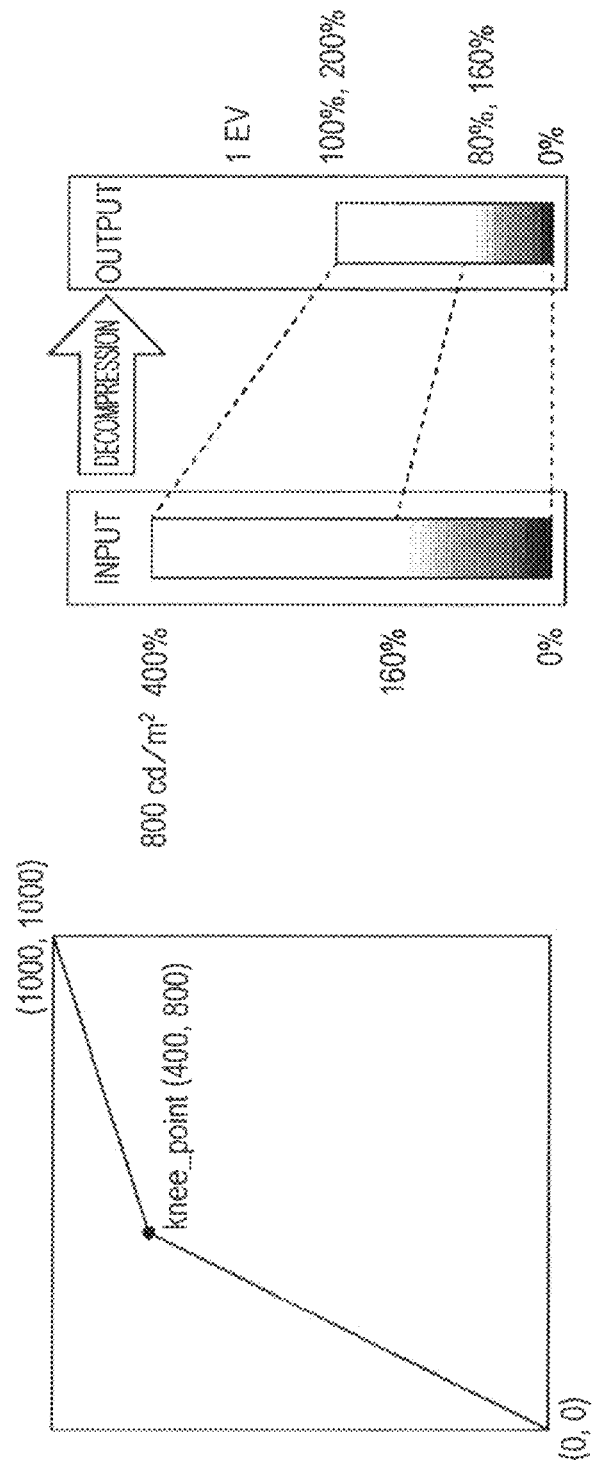
FIG. 25 is at diagram illustrating still another example of DR conversion information of FIG. 17.

FIGS. 24 and 25 are diagrams illustrating examples of DR conversion information set in knee_function_info SEI in a case where one of a desensitized development image and an HDR image is a coding target image and the other is a converted image.

In addition, in the examples of FIGS. 24 and 25, the desensitized development image is an image in which a dynamic range of luminance is 0 to 200%, obtained by performing desensitised development of 1 EV (exposure value) on an HDR image. Further, an expected value of brightness of the display unit corresponding to the maximum value of luminance of the desensitized development image is 400 (candela per square meter) higher than 200 (candela per square meter) which is an expected value of brightness corresponding to the maximum value of luminance in an SDR image.

Information indicating that a coding target image or a converted image is an image obtained by performing desensitized development on an HDR image, and a dynamic range of luminance of the desensitized development image are set in tone_mapping_info_SEI by the setting unit 71.

In the example of FIG. 24, a coding target image is a desensitized development image, and the user sets an HDR image which is obtained as a result of knee-decompressing 160% to 200% of luminance of the desensitized development image to 160% to 400%, as a desired, converted image. In this case, in the knee_function_info SEI, 800 is set as the pre-conversion position information (input_knee_point), and 400 is set as the post-conversion, position information (output_knee_point).

In addition, in the example of FIG. 24, the HDR luminance range information (d_range) is 4000, and the display luminance range (d_range_disp_luminance) is 800 (candela per square meter).

As in the case of FIG. 24, in a case where a coding target image is a desensitized development image, and a converted image is an HDR image, a knee point input_knee_point PER (%) and luminance output_knee_point_PER (%) of a converted image corresponding to the knee point are defined by the above Equation (1).

Therefore, the decoding device 90 recognizes that the knee point input_knee_joint_PER and the luminance output_knee_point_PER are 160% according to Equation (1). In addition, the decoding device 90 recognizes that the maximum value of luminance of the converted image is 400% from the HDR luminance range information. Further, the decoding device 90 recognizes that, a dynamic range of luminance of the coding target image is 0 to 200% from the tone_mapping_info_SSI. Furthermore, in a case where the display unit 95 is an HDR display, 160% to 200% of luminance of a desensitized development image which is obtained as a result of decoding is knee-decompressed to 160% to 400% so as to be displayed as a display image.

On the other hand, in a case where the display unit 95 is an SDR display, the decoding device 90 displays a desensitized development image as a display image without change. At this time, an expected value of brightness of the display unit corresponding to the maximum value of luminance of the desensitized development image is greater than that of an SDR image, and thus brightness of the display image is insufficient.

However, recently, an SDR display (hereinafter, referred to as a high luminance SDR display) of which brightness corresponding to the maximum value of luminance is relatively high 300 (candela per square meter) or the like has been developed. In a case where the display unit 95 is a high luminance SDR display, brightness of a display image can be sufficiently maintained even if a desensitized development image is displayed as the display image without change. In addition, since a compression ratio of knee compression during generation of a coding target image is lower than in a case where a coding target image is an SDR image, quality of a display image can be improved.

In the example of FIG. 25, a coding target image is an HDR image, and the user sets a desensitized development image which is obtained as a result of knee-compressing 160% to 400% of luminance of the HDR image to 160% to 200%, as a desired converted image. In this case, in the knee_function_info SEI, 400 is set as the pre-convers ion position information (input_knee_point), and 800 is set as the post-conversion position information (output_knee_point).

In addition, in the example of FIG. 25, the HDR luminance range information (d_range) is 4000, and the display luminance range (d_range disp luminance) is 800 (candela per square meter).

As in the case of FIG. 25, in a case where a coding target image is an HDR image, and a converted image is a desensitized development image, a knee point input_knee_point_PER (%) and luminance output knee_point_PER (%) of a converted image corresponding to the knee point are defined by the above Equation (2).

Therefore, the decoding device 90 recognizes that the knee point input_knee_point_PER and the luminance output_knee_point_PER are 160% according to Equation (2). In addition, the decoding device 90 recognizes that the maximum value of luminance of the coding target, image is 400% from the HDR luminance range information. Further, the decoding device 90 recognizes that a dynamic range of luminance of the converted image is 0 to 200% from the tone_mapping_info_SEI.

Furthermore, in a case where the display unit 95 is an SDR display, the decoding device 90 knee-compresses 160% to 400% of luminance of an HDR image which is obtained as a result of decoding to 160% to 200% so as to display a compressed result as a display image. In this case, as described above, brightness of the display image is insufficient. However, in a case where the display unit 95 is a high luminance SDR display, brightness of a display image can be sufficiently maintained as described above. In addition, quality of a display image can be improved.

On the other hand, in a case where the display unit 95 is an HDR display, the decoding device 90 displays an HDR image which is obtained as a result of decoding as a display image without change.

In addition, the DR conversion information of FIG. 17 may be included in SEI such as tone_mapping_info_SEI other than knee_function_info_SEI.

(First Example of Syntax of Tone_Mapping_Info_SEI)

FIG. 26 is a diagram illustrating an example of syntax of tone_mapping_info_SEI in a case where the DR conversion information of FIG. 17 is included in the tone_mapping_info_SEI.

The tone_mapping_info_SEI is SEI regarding conversion of luminance. As illustrated in FIG. 26, in a case where the DR conversion information of FIG. 17 is included in the tone_mapping_info_SEI, tone_map_model_id indicating a conversion model of luminance is set to, for example, 5. In addition, in the tone_mapping_info_SEI, pre-conversion position information (input_knee_point), post-conversion position information (output_knee_point), HDR luminance range information (d_range), and display luminance information (d_range_disp_luminance) are set in the tone_mapping_info_SEI as DR conversion information.

In addition, the HDR luminance range information (d_range) and the display luminance information (d_range_disp_luminance) are included in tone_mapping_info_SEI when, tone_map_model_id is 4. Therefore, as illustrated, in FIG. 27, the HDR luminance range information (d_range) and the display luminance information (d_range_disp_luminance) may not be included in the tone_mapping_info_SEI. Further, only one of the HDR luminance range information (d_range) and the display luminance information (d_range_disp_luminance) may be included.

(Second Example of Syntax of Knee_Function_Info SEI)

FIG. 28 is a diagram illustrating a second, example of syntax of knee_function_info SEI set by the setting unit 71 of FIG. 16, and FIG. 29 is a diagram, illustrating each, piece of information set in the knee_function_info SEI of FIG. 28.

A plurality of knee points are set in the knee_function_info SEI of FIG. 28. Specifically, in the same manner as in the case of FIG. 17, a knee conversion ID (knee_function_id) and a knee conversion cancel flag (knee_function_cancel_flag) are set in the knee_function_info SEI of FIG. 28.

In addition, if the knee conversion cancel flag is 0, as illustrated in FIG. 28, DR conversion information is set in the knee_function_info SEI. The DR conversion information is the same as in the case of FIG. 17 except that a compression flag (compression_flag) and a knee point number (num_knee_point_minus1) are included, and pre-conversion position information (input_knee_point) and post-conversion position information (output_knee_point) are set for each knee point. Description of the same part, as in the case of FIG. 17 is repeated and thus will be omitted as appropriate.

As illustrated in FIG. 29, the compression flag is a flag indicating whether or not knee conversion is knee compression. In other words, in a case where the number of knee points is one, when the pre-conversion position information (input_knee_point) is equal to or more than that the post-conversion position information (output_knee_point), it can be determined that knee conversion is knee decompression, and when the pre-conversion position information (input_knee_point) is less than the post-conversion position information (output_knee_point), it can be determined that knee conversion is knee compression.

However, in a case where there are a number of knee points, it is unable to be accurately determined whether knee conversion is knee decompression or knee compression by using the magnitude correlation between the pre-conversion position information and the post-conversion position information, and thus the compression flag is set. In addition, even in a case where the number of knee points is one, the compression flag may be set. The compression flag is set to 1 when knee conversion is knee compression, and is set to 0 when knee conversion is knee decompression.

The knee point number is a value obtained by subtracting 1 from the number of knee points. In addition, an order i (where is an integer of 0 or more) in which pre-conversion position information and post-conversion position information of knee points are set is an order in which the pre-conversion position information is reduced.

(Third Example of DR Conversion Information)

Figure 30:
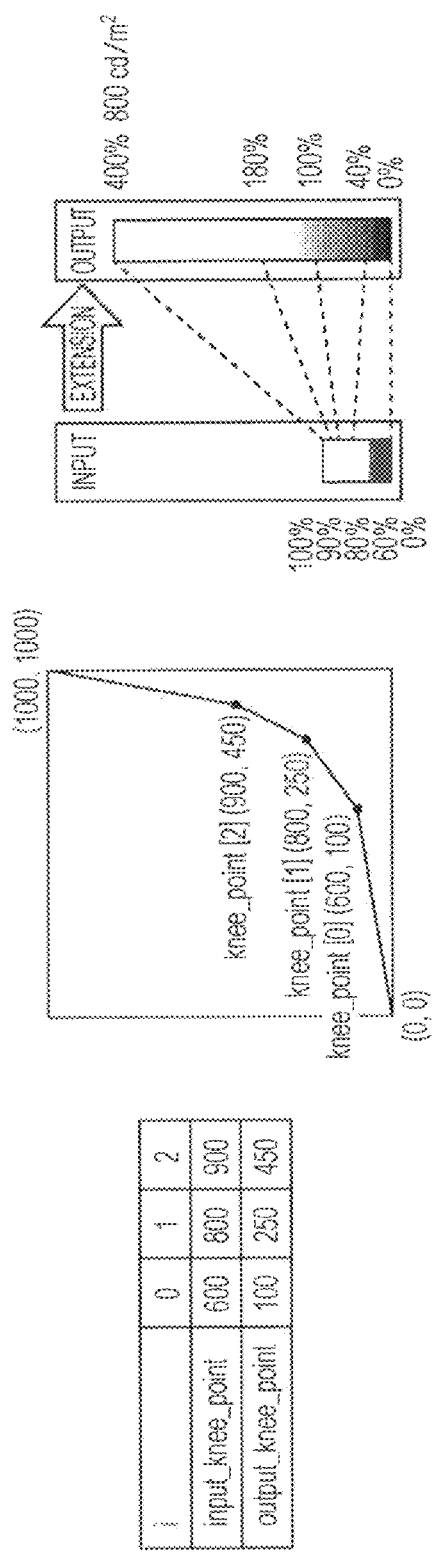
FIG. 30 is a diagram, illustrating an example of DR conversion information of FIG. 28.
Figure 31:
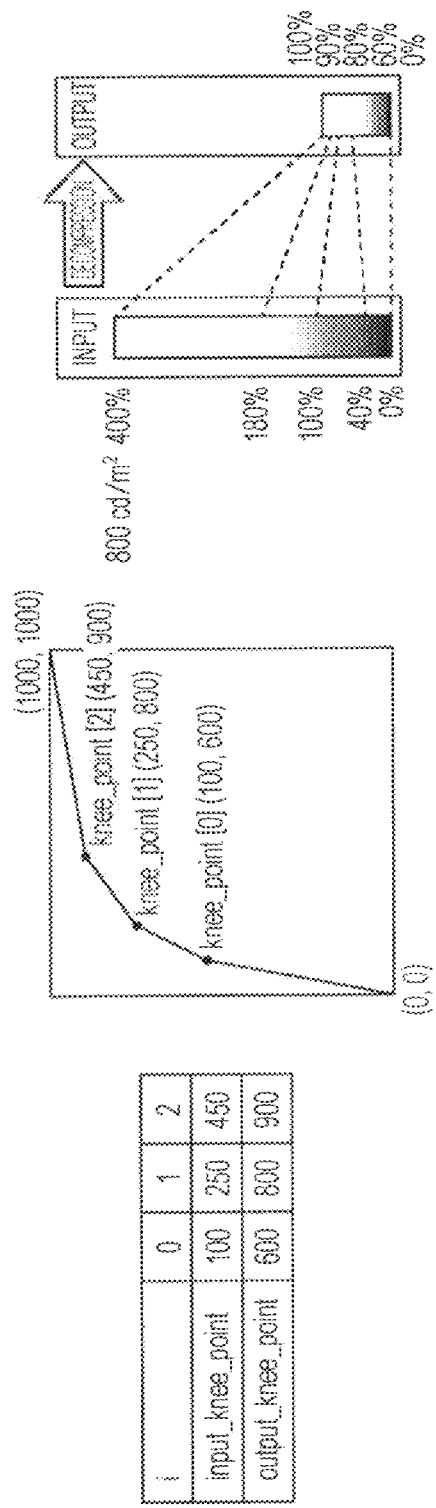
FIG. 31 is a diagram illustrating an example of DR conversion information of FIG. 28.

FIGS. 30 and 31 are diagrams illustrating examples of DR conversion information set in the knee_function_info SEI of FIG. 28.

In the example of FIG. 30, a coding target image is an SDR image. In addition, the user sets an HDR image which is obtained as a result of respectively converting 0 to 60%, 60% to 80%, 80% to 90%, and 90% to 100% of an SDR image into 0 to 40%, 40% to 100%, 100% to 180%, and 180% to 400%, as a desired converted image.

In this case, in the knee_function_info SEI, 600 is set as pre-conversion position information (input_knee_point[0]) of the 0-th knee point, and 100 is set as post-conversion position information (output_knee_point[0]) thereof. 800 is set as pre-conversion position information (input_knee_point[1]) of the first knee point, and 250 is set as post-conversion position information (output_knee_point[1]) thereof. 900 is set as pre-conversion position information (input_knee_point[2]) of the second knee point, and 450 is set as post-conversion position information (output_knee_point [2]) thereof.

In addition, in the example of FIG. 30, the HDR luminance range information (d_range) is 4000, the display luminance range (d_range_disp_luminance) is 800 (candela per square meter), and the compression flag (compression_flag) is 0.

As described above, in a case where a coding target image is an SDR image, and a converted image is an HDR image, a knee point input_knee_point PER (%) and luminance output_knee_point_PER (%) of a converted image corresponding to the knee point are defined by the above Equation (1).

Therefore, the decoding device 90 recognizes that the 0-th to second knee points input_knee_point PER are respectively 60%, 80%, and 90% according to Equation (1). In addition, the decoding device 90 recognizes that the 0-th to second, luminances output_knee_point_PER are respectively 40%, 100%, and 180%. Further, the decoding device 90 recognizes that the maximum value of luminance, of the converted image is 400% from the HDR luminance range information.

Furthermore, the decoding device 90 respectively knee-converts 0 to 60%, 60% to 80%, 80% to 90%, and 90% to 100% of an SDR image which is obtained as a result of decoding into 0 to 40%, 40% to 100%, 100% to 180%, and 180% to 400%, according to a conversion straight line in which the knee points are connected to each other in a set order. Therefore, the decoding device 90 can convert the SDR image which is obtained as a result of decoding, into a desired HDR image.

In the example of FIG. 31, a coding target image is an HDR image. In addition, the user sets an SDR image which is obtained as a result of respectively converting 0 to 40%, 40% to 100%, 100% to 180%, and 180% to 400% of luminance of an HDR image into 0 to 60%, 60% to 80%, 80% to 90%, and 90% to 100%, as a desired converted image.

In this case, in the knee_function_info SEI, 100 is set as pre-conversion position information (input_knee_point[0]) of the 0-th knee point, and 600 is set as post-conversion position information (output_knee_point [0]). 250 is set as pre-conversion position information (input_knee_point[1]) of the first knee point, and 800 is set as post-conversion position information (output_knee_point[1]). 450 is set as pre-conversion position information (input_knee_point[2]) of the second knee point, and 900 is set as post-conversion position information (output_knee_point[2]).

In addition, in the example of FIG. 31, the HDR luminance range information (d_range) is 4000, the display luminance range (d_range_disp_luminance) is 800 (candela per square meter), and the compression flag (compression flag) is 1.

As described above, in a case where a coding target image is an HDR image, and a converted image is an SDR image, a knee point input knee_point_PER (%) and luminance output knee_point_PER (%) of a converted image corresponding to the knee point are defined by the above Equation (2).

Therefore, the decoding device 90 recognizes that the 0-th to second knee points input_knee_point PER are respectively 40%, 100%, and 180% according to Equation (2). In addition, the 0-th to second luminances output_knee_point PER (%) are respectively 60%, 80%, and 90%. In addition, the decoding device 90 recognizes that the maximum value of luminance of the converted image is 400% from the HDR luminance range information.

Further, the decoding device 90 knee-converts 0 to 40%, 40% to 100%, 100% to 130%, and 180% to 400% of an HDR image which is obtained as a result, of decoding into 0 to 60%, 60% to 80%, 80% to 90%, and 90% to 100% by connecting the knee points to each other in a set order. Therefore, the decoding device 90 can convert the HDR image which is obtained as a result of decoding, into a desired SDR image.

As mentioned above, in a case where a plurality of knee points are set, a compression ratio can be more finely set than in a case where a single knee point, is set. Therefore, it is possible to perform knee conversion with higher accuracy.

In addition, the DR conversion information of FIG. 28 may be included in SEI such as tone_mapping_info_SEI other than knee_function_info SEI.

(Second Example of Syntax of Tone_Mapping_Info_SEI)

FIG. 32 is a diagram illustrating an example of syntax of tone_mapping_info_SEI in a case where the DR conversion information of FIG. 28 is included in the tone_mapping_info_SEI.

As illustrated in FIG. 32, in a case where the DR conversion information of FIG. 28 is included in the tone_mapping_info_SEI, tone_map_model_id is set to, for example, 5. In addition, in the tone_mapping_info_SEI, compression flag (compression_flag (mapping_flag)), HDR luminance range information (d_range), display luminance information (d_range_disp_luminance), a knee point number (num_knee_point_minus), and pre-conversion position information (input_knee_point) and post-conversion position information (output_knee_point) of each knee point are set in the tone_mapping_info_SEI as DR conversion information.

In addition, in the same manner as in the tone_mapping_info_SEI of FIG. 27, the HDR luminance range information (d_range) and the display luminance information (d_range_disp_luminance) may not be included in the tone_mapping_info_SEI of FIG. 32. Further, only one of the HDR luminance range information (d_range) and the display luminance information (d_range_disp_luminance) may be included.

Furthermore, the knee point number (num_knee_point_minus1) may be any one of 0, 1, and 2 as illustrated in FIGS. 33 to 35. In other words, the knee point number (num_knee_point_minus1) may be limited to 2 or less. In this case, as illustrated in FIGS. 33 to 35, the number of bits of the knee point number (num_knee_point_minus1) included in the knee_function_info SEI or the tone_mapping_info_SEI is fixed to 2 bits (u(2)).

As mentioned above, the maximum value of the knee point number (num_knee_point_minus1) is determined, and thus an amount of DR conversion information can be reduced. Accordingly, the DR conversion information can be transmitted with a small packet as in AVI InfoFrame of High-Definition Multimedia Interface (HDMI™).

(Third Example of Syntax of Knee_Function_Info SEI)

FIG. 36 is a diagram illustrating a third example of syntax of knee_function_info SEI set by the setting unit 71 of FIG. 16, and FIG. 37 is a diagram illustrating each piece of information set in the knee_function_info SEI of FIG. 36.

A plurality of knee points and a knee point (hereinafter, referred to as a representative knee point) which is representatively used are set in the knee_function_info SEI of FIG. 36.

Specifically, in the same manner as in the case of FIG. 17, a knee conversion ID (knee_functioned_id) and a knee conversion cancel flag (knee_function_cancel_flag) are set in the knee_function_info SEI of FIG. 36.

In addition, if the knee conversion cancel flag is 0, as illustrated in FIG. 36, DR conversion information is set in the knee_function_info SEI. The DR conversion information is the same as in the case of FIG. 28 except that representative pre-conversion position information (representative input_knee_point) and representative post-conversion position information (representative_output_knee_point) are included. Description of the same part as in the case of FIG. 28 is repeated and thus will be omitted as appropriate.

As illustrated in FIG. 37, the representative pre-conversion position information is information indicating a representative knee point of a coding target image which is an unconverted image in conversion corresponding to the DR conversion information, and is a permillage of the representative knee point when the maximum value of luminance of the coding target image is set to 1000 permil.

The representative pre-conversion position information is information indicating luminance corresponding to a representative knee point of a converted image in conversion corresponding to the DR conversion information, and is a permillage of luminance corresponding to a knee point when the maximum value of luminance of the converted image is set to 1000 permil.

In addition, the representative knee point may be one of knee points corresponding to a plurality of pre-conversion position information pieces included in the DR conversion information, and may be a knee point which is completely different from the knee point.

(Fourth Example of DR Conversion Information)

Figure 38:
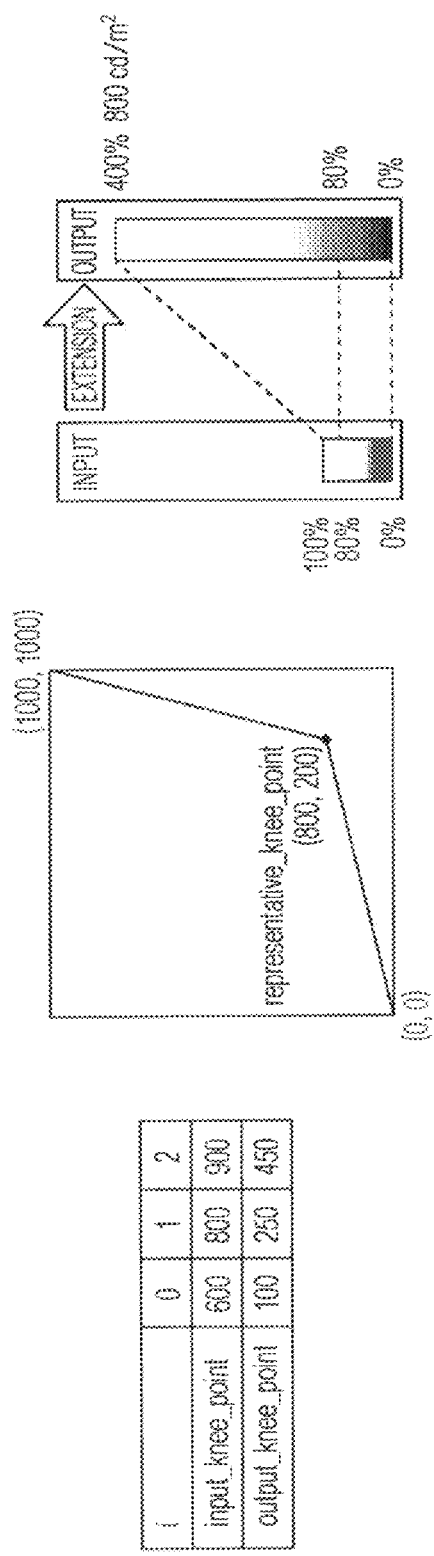
FIG. 38 is a diagram, illustrating an example of DR conversion information of FIG. 36.

FIG. 38 is a diagram illustrating an example of DR conversion information set in the knee_function_info SEI of FIG. 36.

In the example of FIG. 38, a coding target image is an SDR image. In addition, the user sets an HDR image which is obtained as a result of respectively converting 0 to 60%, 60% to 80%, 80% to 30%, and 90% to 100% of an SDR image into 0 to 40%, 40% to 100%, 100% to 180%, and 180% to 400%, as a desired converted image when the decoding device 90 performs the knee conversion with high accuracy. Further, the user sets an HDR image which is obtained by knee-decompressing 80% to 100% of luminance of an SDR image to 80% to 400%, as a desired converted image when the decoding device 90 performs simple knee conversion, with low accuracy.

In this case, in the knee_function_info SEI, the same values as in FIG. 30 are set as pre-conversion position information (input_knee_point) and post-conversion position, information (output_knee_point) of the 0-th to second knee points. In addition, the representative pre-conversion position information (representative_input_knee_point) is 800, and the representative post-conversion position, information (representative_output_knee_point) is 200.

In addition, in the example of FIG. 38, the HDR luminance range information (d_range) is 4000, the display luminance range (d_range_disp_luminance) is 800 (candela per square meter), and the compression flag (compression_flag) is 0.

As illustrated in FIG. 38, in a case where the decoding device 90 performs simple knee conversion with low accuracy, the decoding device 90 recognises that the representative knee point representative_input_knee_point_PER (%) and luminance representative_output_knee_point PER (%) of a converted image corresponding to the representative knee point are 80% according to the above Equation (1). In addition, the decoding device 90 recognizes that the maximum value of luminance of the converted image is 400% from the HDR luminance range information. Further, the decoding device 90 knee-decompresses 80% to 100% of luminance of an SDR image which is obtained as a result of decoding, to 80% to 400%. Therefore, the decoding device 90 can convert the SDR image which is obtained as a result, of decoding into a desired HDR image.

On the other hand, in a case where the decoding device 90 performs knee conversion with high accuracy, the decoding device 90 performs the same process as in FIG. 30, and converts an SDR image which is obtained as a result of decoding into a desired HDR image.

As mentioned above, the representative pre-conversion position information (representative_input_knee_point) and the representative post-conversion position information (representative_output_knee_point) are included in the DR conversion information of FIG. 36. Therefore, even in a case where a processing rate or a resource such as a memory capacity is unable to be sufficiently secured in the decoding device 90, knee conversion can be performed on the basis of a representative knee point. In addition, since the representative pre-conversion position information and the representative post-conversion position information are transmitted to the decoding device 90, the decoding device 90 does not have to generate representative pre-conversion position information and representative post-conversion position information on the basis of pre-conversion position information and post-conversion position information of a plurality of knee points.

In addition, the DR conversion information of FIG. 36 may be included in SEI such as tone_mapping_info_SEI other than knee_function_info SEI.

(Third Example of Syntax of Tone_mapping_info_SEI)

FIG. 39 is a diagram illustrating an example of syntax of tone_mapping_info_SEI in a case where the DR conversion information of FIG. 36 is included in the tone_mapping_info_SEI.

As illustrated in FIG. 39, in a case where the DR conversion information of FIG. 36 is included in the tone_mapping_info_SEI, tone_map_model_id is set to, for example, 5. In addition, in the tone_mapping_info_SEI, a compression flag (compression_flag), representative pre-conversion position information (representative_input_knee_point), representative post-conversion position information (representative_output_knee_point), HDR luminance range information (d_range), display luminance information (d_range_disp_luminance), a knee point number (num_knee_point_minus1), and pre-conversion position information (input_knee_point) and post-conversion position information (output_knee_point) of each knee point are set in the tone_mapping_info_SEI as DR conversion information.

In addition, in the same manner as in the tone_mapping_info_SEI of FIG. 27, the HDR luminance range information (d_range) and the display luminance information (d_range_disp_luminance) may not be included in the tone mapping info SEI of FIG. 39. Further, only one of the HDR luminance range information (d_range) and the display luminance information (d_range_disp_luminance) may be included.

(Fourth Example of Syntax of Knee_Function_Info SEI)

FIG. 40 is a diagram illustrating a fourth example of syntax of knee_function_info SEI set by the setting unit 71 of FIG. 16, and FIG. 41 is a diagram illustrating (semantics of) each piece of information set in the knee_function_info SEI of FIG. 40.

In the knee_function_info SEI of FIG. 40, images other than an SDR image can be employed as one of a coding target, image and a converted image.

Specifically, in the same manner as in the case of FIG. 17, a knee conversion ID (knee_function_id) and a knee conversion cancel flag (knee_function_cancel_flag) are set in the knee_function_info SEI of FIG. 40.

In addition, if the knee conversion cancel flag is 0, as illustrated in FIG. 40, DR conversion information is set in the knee_function_info SEI. The DR conversion information is the same as in the case of FIG. 28 except that knee conversion persistence flag (knee_function_persistence_flag) is newly included, and unconverted display range information (input_d_range), unconverted display luminance information (input_disp_luminance), converted display range information (output_d_range), and converted display luminance information (output_disp_luminance) are included instead of the HDR luminance range information (d_range) and the display luminance information (d_range_disp_luminance). Description of the same part as in the case of FIG. 28 is repeated and thus will be omitted as appropriate.

As illustrated in FIG. 41, the knee conversion persistence flag is a flag indicating whether or not the DR conversion information is applied to a plurality of pictures which are continuously located. The knee conversion persistence flag is set to 1 when the DR conversion information is applied to a plurality of pictures which are continuously located, and is set to 0 when the DR conversion information is applied to only one picture. The knee conversion persistence flag may also be set in the knee_function_info SEI of FIGS. 17, 28, 34 and 36.

In addition, the unconverted luminance range information is information indicating a permillage of the maximum value of luminance of a coding target image which is an unconverted image in conversion corresponding to the DR conversion information, and the converted luminance range information is information indicating a permillage of the maximum value of luminance of a converted image.

In addition, the unconverted display luminance information is information indicating an expected value of brightness of the display unit corresponding to the maximum value of luminance of a coding target image, and the converted display luminance information is information indicating an expected value of brightness of the display unit corresponding to the maximum value of luminance of a converted image.

(Fifth Example of DR Conversion Information)

Figure 42:
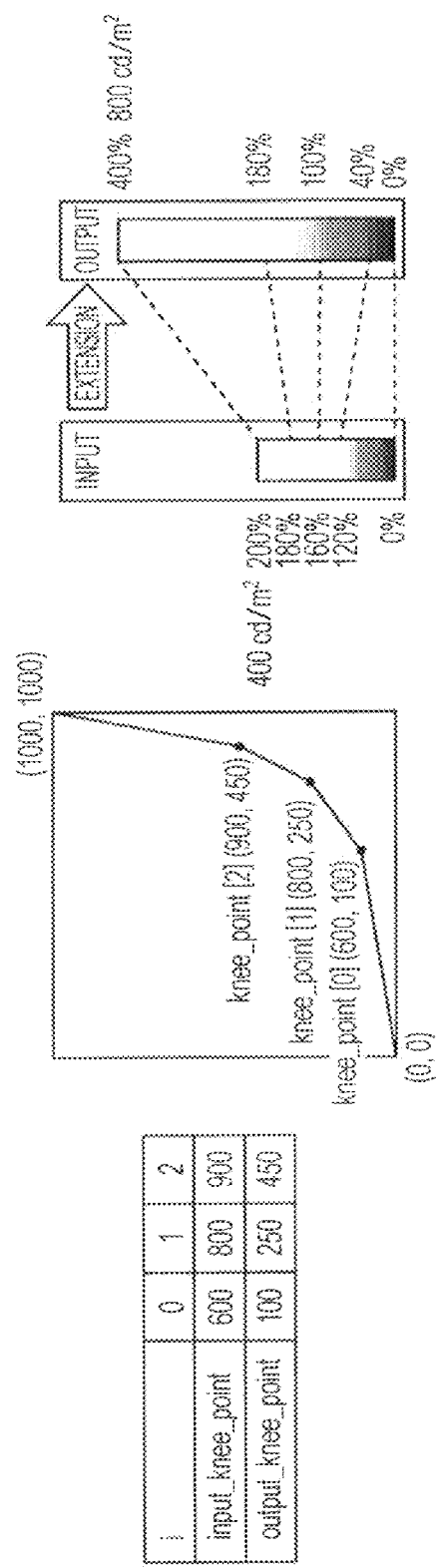
FIG. 42 is a diagram illustrating an example of DR conversion information of FIG. 40.
Figure 43:
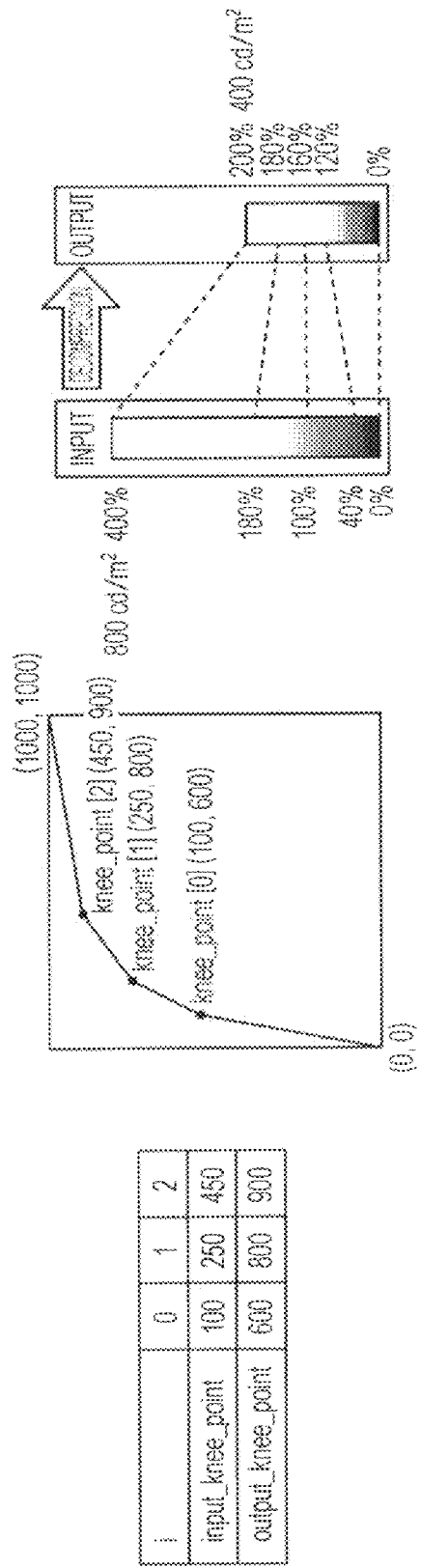
FIG. 43 is a diagram illustrating an example of DR conversion information of FIG. 40.

FIGS. 42 and 43 are diagrams illustrating examples of DR conversion information set in the knee_function_info SEI of FIG. 40.

In the example of FIG. 42, a coding target image is an HDR image (hereinafter, referred to as a 200% HDR image) whose dynamic range is 0 to 200%, In addition, the user sets a 400% HDR image which is obtained as a result of respectively knee-converting 0 to 120%, 120% no 160%, 160% to 180%, and 180% to 200% of luminance of a 200% HDR image into 0 to 40%, 40% to 100%, 100% to 180%, and 180% to 400%, as a desired converted image. The 400% HDR image is an HDR image whose dynamic range is 0 to 400%.

In this case, in the knee_function_info SEI, the same values as in FIG. 30 are set as pre-conversion position information (input_knee_point) and post-conversion position information (output_knee_point) of the 0-th to second knee points. In addition, 2000 is set as the unconverted luminance range information (input_d_range), and 4000 is set as the converted luminance range information (output_d_range).

Further, in the example of FIG. 42, the unconverted display luminance information (input_disp_luminance) is 400 (candela per square meter), and the converted display luminance information (output_disp_luminance) is 800 (candela per square meter). The compression flag (compression_flag) is 0.

As illustrated in FIG. 42, in a case where a coding target image is an image with a dynamic range corresponding to the unconverted luminance range information, and a converted image is an image with a dynamic range corresponding to the converted luminance range information, a knee point input_knee_point_PER (%) and luminance output_knee_point PER (%) of a converted image corresponding to the knee point are defined by the following Equation (3).

[Math. 3]

$$\text{input\_knee\_point\_DR} = \frac{\text{input\_d\_range}}{10} \times \frac{\text{input\_knee\_point}}{1000} \quad (3)$$
$$\text{output\_knee\_point\_DR} = \frac{\text{output\_d\_range}}{10} \times \frac{\text{output\_knee\_point}}{1000}$$

Therefore, the decoding device 90 recognizes that the 0-th to second knee points input_knee_point_PER are respectively 120%, 160%, and 180% according to Equation (3). In addition, the decoding device 90 recognizes that the 0-th to second luminances output_knee_point_PER are respectively 40%, 100%, and 180%. Further, the decoding device 90 recognizes that the maximum value of luminance of the coding target image is 200% from the input luminance range information, and the maximum value of luminance of the converted image is 400% from the output luminance range information.

Furthermore, the decoding device 90 respectively knee-converts 0 to 120%, 120% to 160%, 160% to 180%, and 180% to 200% of a 200% HDR image which is obtained as a result of decoding into 0 to 40%, 40% to 100%, 100% to 180%, and 180% to 400%, according to a conversion straight line in which the knee points are connected to each other in a set order. Therefore, the decoding device 90 can convert the 200% HDR image which is obtained as a result of decoding, into a desired 400% HDR image.

In the example of FIG. 43, a coding target image is a 400% HDR image. In addition, the user sets a 200% HDR image which is obtained as a result of respectively knee-converting0 to 40%, 40% to 100%, 100% to 180%, and 180% to 400% of luminance of a 400% HDR image, into 0 to 120%, 120% to 160%, 160% to 180%, and 180% to 200% as a desired converted image.

In this case, in the knee_function_info SEI, the same values as in FIG. 31 are set as pre-conversion position information (input_knee_point) and post-conversion position information (output_knee_point) of the 0-th to second knee_points. In addition, 4000 is set as the unconverted luminance range information (input_d_range), and 2000 is set as the converted luminance range information (output_d_range).

Further, in the example of FIG. 43, the unconverted display luminance information (input_disp_luminance) is 800 (candela per square meter), and the converted display luminance information (output_disp_luminance) is 400 (candela per square meter). The compression flag (compression_flag) is 1.

As described above, in a case where a coding target image is an image with a dynamic range corresponding to the unconverted luminance range information, and a converted image is an image with a dynamic range corresponding to the converted luminance range information, a knee point input_knee_point_PER (%) and luminance output_knee_point_PER (%) of a converted image corresponding to the knee point are defined by the above Equation (3).

Therefore, the decoding device 90 recognizes that the 0-th to second knee points input_knee_point_PER are respectively 40%, 100%, and 180% according to Equation (3). In addition, the decoding device 90 recognizes that the 0-th to second luminances output_knee_point_PER (%) are respectively 120%, 160%, and 180%. Further, the decoding device 90 recognizes that the maximum value of luminance of the coding target image is 400% from the input luminance range information, and the maximum value of luminance of the converted image is 200% from the output luminance range information.

Furthermore, the decoding device 90 respectively knee-converts 0 to 40%, 40% to 100%, 100% to 180%, and 180% to 400% of a 400% HDR image which is obtained, as a result of decoding into 0 to 120%, 120% to 160%, 160% to 130%, and 180% to 200%, by connecting the knee points to each other in a set order. Therefore, the decoding device 90 can convert the 400% HDR image which is obtained as a result of decoding, into a desired 200% HDR image.

As mentioned above, according to the DR conversion information of FIG. 40, not only conversion between an SDR image and an HDR image but also conversion between HDR images with different dynamic, ranges can be performed as desired by a user in the decoding device 90. A dynamic range of an HDP. image may be greater than 0 to 100%, and may be 0 to 400%, 0 to 800%, 0 to 1300%, and the like. In addition, an expected value of brightness of the display corresponding to the maximum value of luminance of an HDR image may be greater than 100 (candela per square meter), and may be 800 (candela per square meter), 4000 (candela per square meter), 1500 (candela per square meter), and the like.

[Description of Operation of Decoding Device]

Figure 44:
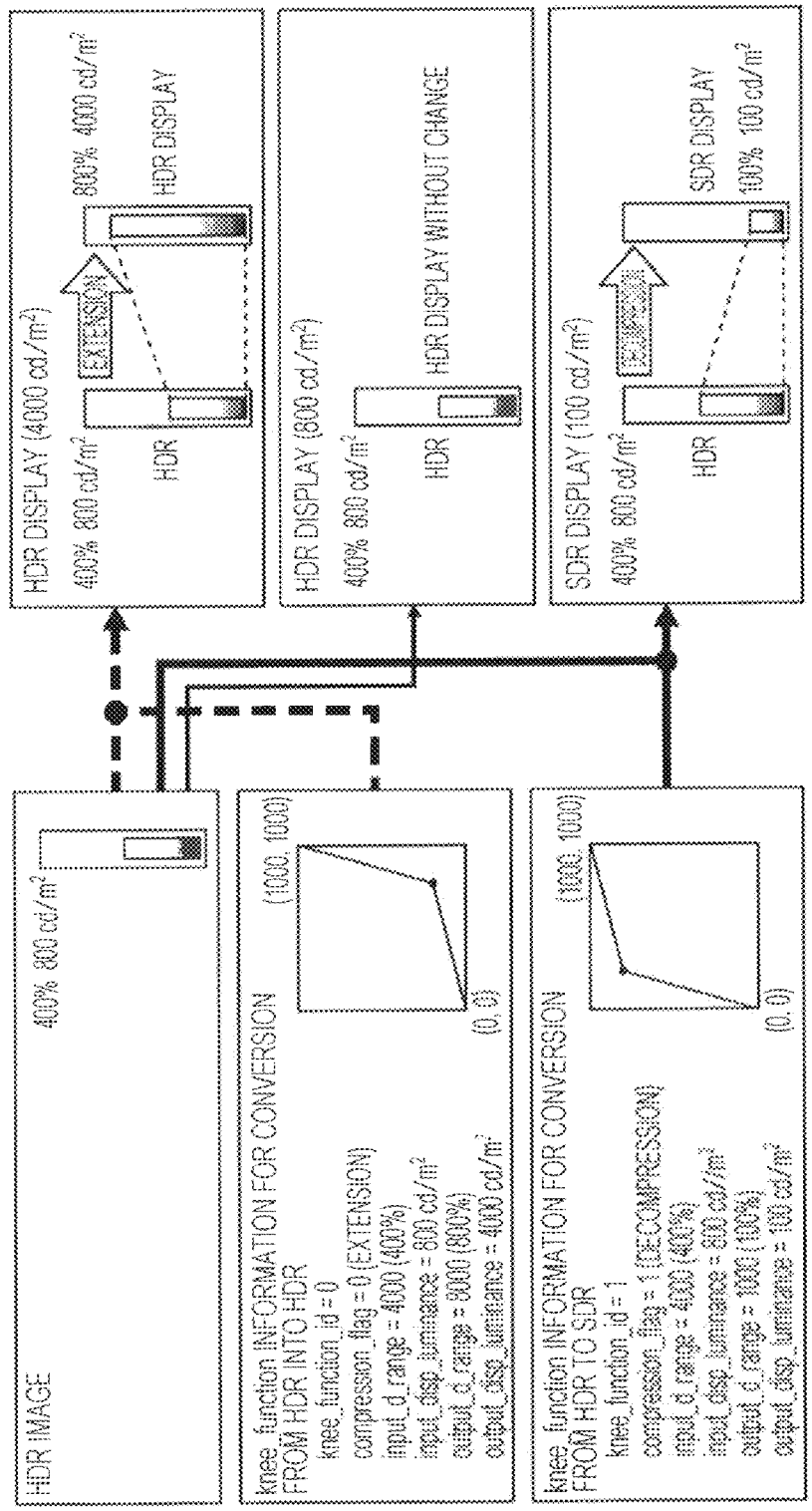
FIG. 44 is a diagram illustrating an operation of the decoding device in a case where the knee_function_info SEI of FIG. 40 is set in a plurality.

FIG. 44 is a diagram illustrating an operation of the decoding device 90 in a case where the knee_function_info SEI of FIG. 40 is set in a plurality.

In an example of FIG. 44, a coding target image is a 400% HDR image. In addition, knee_function_info SEI (hereinafter, referred to as 800% HDR image knee_function_info SEI) for setting a desired converted image to a 800% HDR image whose dynamic range is 0 to 800%, and knee_function_info SEI (hereinafter, referred to as SDR image knee_function_info SEI) for setting a desired converted, image to an SDR image, are set. In this case, different knee conversion IDs are given to the 800% HDR image knee_function_info SEI and the SDR image knee_function_info SEI.

In a case where the display unit 95 is an HDR display which can display a 800% HDR image, the decoding device 90 knee-decompresses luminance of a 400% HDR image which is a decoded image on the basis of the 800% HDR image knee_function_info SEI, so as to generate a desired 800% HDR image as a display image.

On the other hand, in a case where the display unit 95 is an HDR display which can display a 400% HDR image, the decoding device 90 uses a 400% HDR image which is a decoded image as a display image without change. In addition, in a case where the display unit 95 is an SDR display, the decoding device 90 knee-compresses luminance of a 400% HDR image which is a decoded image on the basis of the SDR image knee_function_info SEI, so as to generate a desired SDR image as a display image.

In addition, the DR conversion information of FIG. 40 may be included in SEI such as tone_mapping_info_SET other than knee_function_info SEI.

(Fourth Example of Syntax of Tone_Mapping_Info_SEI)

FIG. 45 is a diagram, illustrating an example of syntax of tone_mapping_info_SEI in a case where the DR conversion information of FIG. 40 is included in the tone_mapping_info_SEI.

As illustrated in FIG. 45, in a case where the DR conversion information of FIG. 40 is included in the tone_mapping_info_SEI, tone_map_model_id is set to, for example, 5. In addition, in the tone_mapping_info_SEI, a compression flag (compression_flag), input luminance range information (input_d_range), input display luminance range (input_d_range_disp_luminance), output luminance range information (output_d_range), output display luminance range (output_d_range_disp_luminance), a knee point number (num_knee_point_minus1), and pre-conversion position information (input_knee_point) and post-conversion position information (output_knee_point) of each knee point are set in the tone_mapping_info_SEI as DR conversion information.

In addition, at least one of the input luminance range information (input_d_range), the input display luminance range (input_d_range_disp_luminance), the output luminance range information (output_d_range), and the output, display luminance range (output_d_range_disp_luminance) may not be included in the tone_mapping_info_SEI of FIG. 45.

In addition, in the above description, the DR conversion information is disposed in SEI, but may be disposed in a system layer.

(Example of Disposing DR Conversion Information in Box of MP4)

[Description of Box of MP4 in Which DR Conversion Information is Disposed]

FIG. 46 is a diagram illustrating a box of MP4 as a system layer in which DR conversion information is disposed.

As illustrated in FIG. 46, in a case where DR conversion information is disposed in a box of MP4, a tinf (Tone Mapping Information Box) box which stores DR conversion information as ToneMapInfo is newly defined. The tinf box is stored in a trak box (track box) (a stbl box stored therein) or a traf box (track fragment box).

(Example of Syntax of ToneMapInfo)

FIG. 47 is a diagram illustrating an example of syntax of ToneMapInfo.

ToneMapInfo of FIG. 47 has the same configuration as that of the tone_mapping_info_SEI of FIG. 32 except that padding value for byte alignment is inserted thereinto.

In addition, although not illustrated, ToneMapInfo may have the same configuration as that of the tone_mapping_info_SEI of FIG. 26, 27, 39, or 45 except that padding_value for byte alignment is inserted thereinto.

In addition, in the same manner as in the second embodiment, the conversion information in the first, embodiment may be disposed in a system layer.

In addition, an HDR image desired by a user may be an HDR image which is input to the coding device 70.

Further, in the second embodiment, an HDR image is input to the coding device 70, but an SDR image may be input thereto. In this case, when a coding target image is an HDR image, the coding device 70 converts an SDR image which is input from an external device into an HDR image which is then set as a coding target image.

In addition, a plurality of knee points are set in the knee_function_info SEI of FIG. 40. Therefore, knee conversion of a smoother and more complex function can be defined than in a case where only one knee point is set. As a result, the conversion unit 93 can perform the optimal knee conversion.

However, if the number of knee points increases, an amount of DR conversion information increases. Therefore, for example, in a case where a decoded image and DR conversion information are transmitted with HDMI, an amount of the DR conversion information is equal to or larger than 27 bytes which is a size of one packet of AVI InfoFrame of HDMI, and thus the DR conversion information may not be included in AVI InfoFrame.

Therefore, in a third embodiment described later, a decoding device performs thinning-out of an optimal knee point in a case where an amount of DR conversion information is reduced, such as a case where the DR conversion information is transmitted with HDMI.

Third Embodiment (First Example of Semantics)

A first configuration of a third embodiment of a coding device to which the present disclosure is applied is the same as the configuration of the coding device 70 of FIG. 16 except for the order i of knee points and semantics indicated by the knee_function_info SEI of FIG. 40 set by the setting unit 71. Therefore, hereinafter, only the order i of knee points and semantics indicated by the knee_function_info SEI of FIG. 40 will be described.

In the first configuration of the third embodiment of the coding device to which the present disclosure is applied, the order i of knee points is set in an order in which priorities for representing a desired function of knee conversion are higher in the knee_function_info SEI of FIG. 40.

In addition, FIG. 48 is a diagram illustrating that semantics in the first configuration of the third embodiment of the coding device to which the present disclosure is applied is different from that in the second embodiment.

As illustrated in FIG. 48, in the semantics of FIG. 40 in the first configuration of the third embodiment of the coding device to which the present disclosure is applied, pre-conversion position information (input_knee_point[i]) of an i-th knee point may be equal to or less than pre-conversion position information (input_knee_point[i-1]) of a (i-1)-th knee point. In other words, the order i (where i is an integer of 0 or more) in which the pre-conversion position information and the post-conversion position information of a knee point, are set may not be an order in which the post-conversion position information is less.

In addition, a function (knee function) of knee conversion is a straight line -which connects knee points to each other in an order (ascending order) in which the pre-conversion position information (input_knee_point) is smaller.

Further, a decoded image may be knee-converted by using an approximate function of knee conversion. The approximate function of knee conversion is a straight line which connects 0-th to N-th (where N is equal to or greater than 0 and equal to or smaller than num_knee_point_minus1) knee points to each other in an order in which the pre-conversion position information is less. Since the order i of knee points is set in an order in which a priority for representing a desired function of knee conversion is higher, an approximate function of knee conversion is more approximate to a desired function of knee conversion as N is greater.

(First Configuration Example of One Embodiment of Decoding System)

Figure 49:
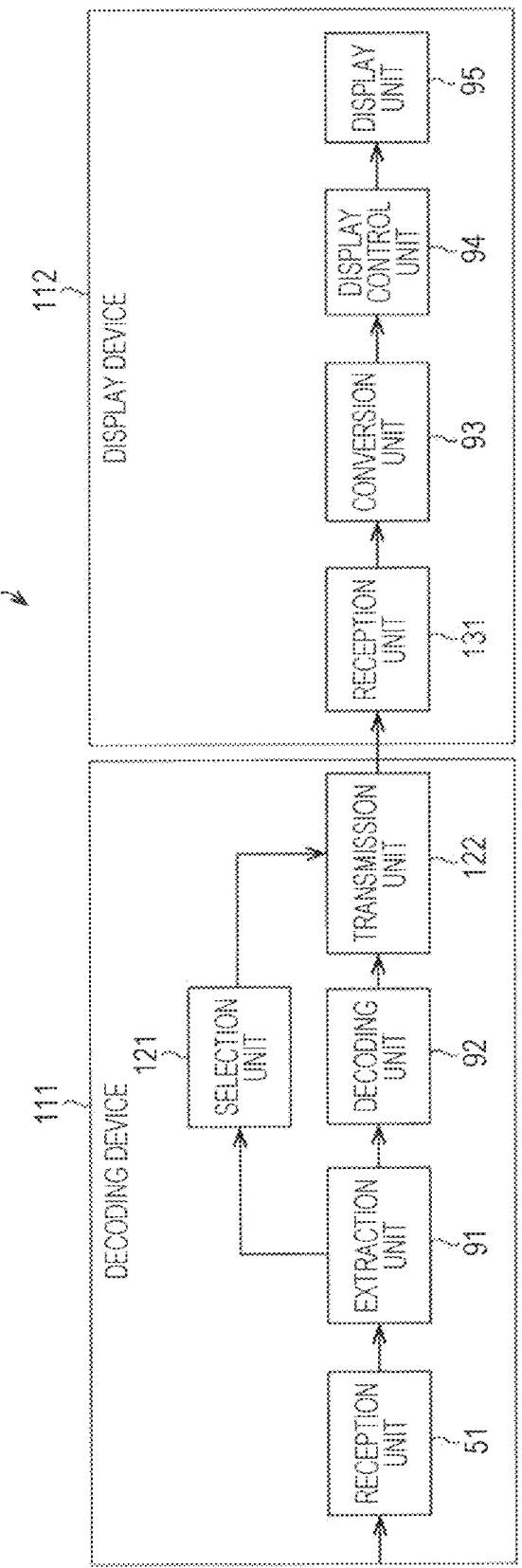
FIG. 49 is a block diagram illustrating a first configuration example of an embodiment of a decoding system to which the present disclosure is applied.

FIG. 49 is a block diagram illustrating a first configuration example of an embodiment of a decoding system to which the present disclosure is applied and which decodes a coded stream transmitted, from the first configuration of the third embodiment of the coding device to which the present disclosure is applied.

Among constituent elements illustrated in FIG. 49, the same constituent elements as the constituent elements of FIGS. 12 and 22 are given the same reference numerals. Repeated description will be omitted as appropriate.

A decoding system 110 of FIG. 49 includes a decoding device 111 and a display device 112. The decoding device 111 includes a reception unit 51, an extraction unit 91, a decoding unit 92, a selection unit 121, and a transmission unit 122.

The selection unit 121 of the decoding device 111 acquires knee_function_info SEI among parameter sets extracted by the extraction unit 91. The selection unit 121 selects DR conversion information of the number (for example, 3) of knee points included in a single packet of AVI InfoFrame of HDMI in an order in which the order i is lower from among DR conversion information pieces of a plurality of knee points included in the knee_function_info SEI. The selection unit 121 supplies the selected DR conversion information of the knee point to the transmission unit 122.

The transmission unit 122 disposes the DR conversion information selected by the selection unit 121 in a single packet of AVI InfoFrame of HDMI, and transmits a result thereof to the display device 112 with HDMI along with a decoded image generated by the decoding unit 92.

The display device 112 includes a reception unit 131, a conversion unit 93, a display control unit 94, and a display unit 95.

The reception unit 131 of the display device 112 receives AVI InfoFrame and the decoded image which are transmitted from the transmission unit 122 with HDMI. The reception unit 131 supplies the DR conversion information disposed, in AVI InfoFrame and the decoded, image to the conversion unit 93.

[Description of First Selection Method of Knee Point]

FIG. 50 is a diagram illustrating an example of a knee point and a function of knee conversion defined by the knee_function_info SEI which is received by the decoding system 110 of FIG. 49.

In addition, in the example of FIG. 50, a knee point number (number_knee_point_minus1) set in the knee_function_info SEI is 8.

Figures 50A, 50B:
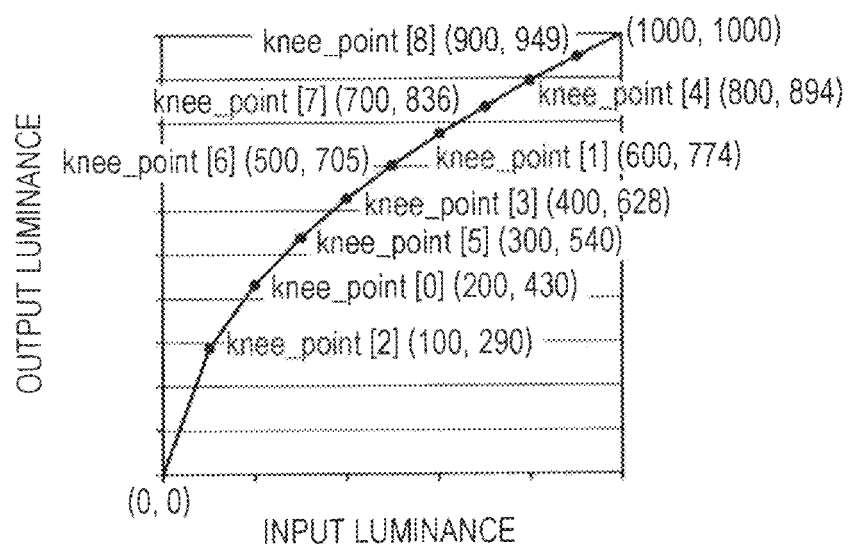
FIG. 50A is a diagram illustrating an example of a knee point, and a function of knee conversion defined by knee_function_info SEI which is received by the decoding system of FIG. 49.
FIG. 50B is a diagram illustrating an example of a knee point, and a function of knee conversion defined by knee_function_info SEI which is received by the decoding system of FIG. 49.

As illustrated in FIG. 50A, among eight knee points set in the knee_function_info SEI, pre-conversion position information (input_knee_point[0])) of the 0-th knee point is 200, and post-conversion position information (output_knee_point[0]) thereof is 433. In addition, pre-conversion position information (input_knee_point[1]) of the first knee point is 600, and post-conversion position information (output_knee_point[1]) thereof is 774, and pre-conversion position information (input_knee_point[2]) of the second knee point is 100, and post-conversion position information (output_knee_point[2]) thereof is 290.

Further, pre-conversion position information (input_knee_ point[3]) of the third knee point is 400, and post-conversion position information (output_knee_point[3]) thereof is 628, and pre-conversion position information (input_knee_point[4]) of the fourth knee point is 800, and post-conversion position information (output_knee_point [4]) thereof is 894.

Furthermore, pre-conversion position information (input_knee_point[5]) of the fifth knee point is 300, and post-conversion position information (output_knee_point [5]) thereof is 540, and pre-conversion position information (input_knee_point[6]) of the sixth knee point is 500, and post-conversion position information (output_knee_point [6]) thereof is 705.

In addition, pre-conversion position information (input_knee_point[7]) of the seventh knee point is 700, and post-conversion position information (output_knee_point[7]) thereof is 836, and pre-conversion position information (input_knee_point[8]) of the eighth knee point is 900, and post-conversion position information (output_knee_point [8]) thereof is 949.

In this case, the respective knee points are connected to each other in an order in which the pre-conversion position information is less, and thus a function of knee conversion is as illustrated in FIG. 50B. In other words, a straight line which connects the knee points to each other in an order of the second, 0-th, fifth, third, sixth, first, seventh, fourth and eighth knee points, serves as a function of knee conversion. In addition, the transverse axis of FIG. 50B expresses luminance of a coding target image, and the longitudinal axis expresses luminance of a converted image. This is also the same for FIGS. 51, 52, and 57 to 59 described later.

Figure 51:
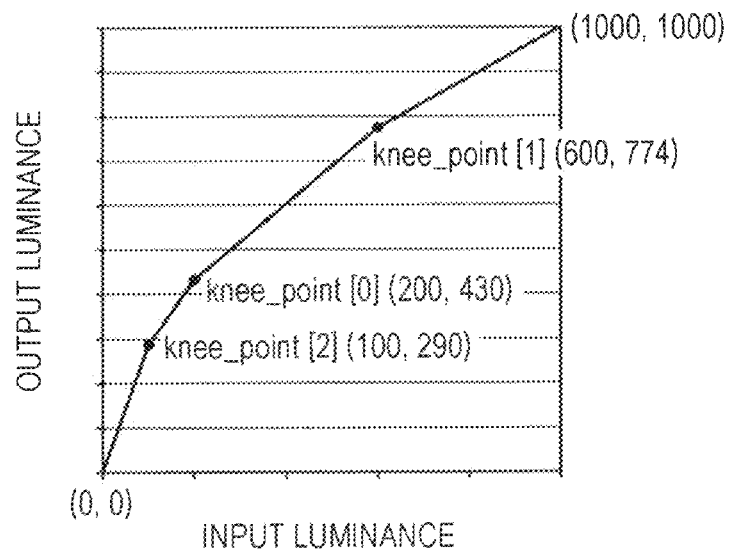
FIG. 51 is a diagram illustrating an example of an approximate function of the knee conversion of FIG. 50.

In a case where the selection unit 121 selects DR conversion information pieces of three knee points from the DR conversion information pieces of the knee points defined by the knee_function_info SEI of FIG. 50A, an approximate function of knee conversion having the selected knee points is as illustrated in FIG. 51.

In other words, in this case, the selection unit 121 selects DR conversion information pieces of the 0-th to second knee points from among the DR conversion information pieces of the 0-th to eighth knee points defined by the knee_function_info SEI. Therefore, a knee conversion function having the selected knee points is a straight line which connects the 0-th to second knee points to each other in an order in which the pre-conversion position information is less, that is, in an order of the second, 0-th and first knee points.

Figure 52:
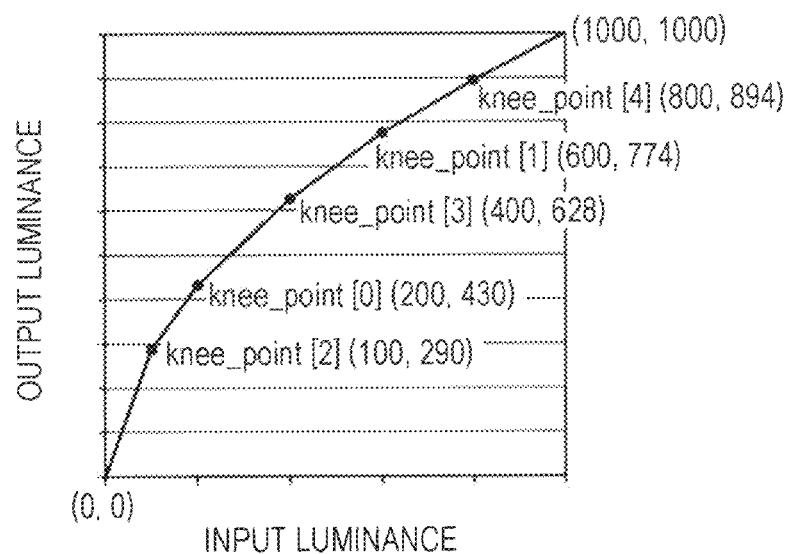
FIG. 52 is a diagram illustrating an example of an approximate function of the knee conversion of FIG. 50.

Meanwhile, in a case where the selection unit 121 selects DR conversion information pieces of five knee points from among the DR conversion information pieces of the knee points defined by the knee_function_info SEI of FIG. 50A, an approximate function of knee conversion having the selected knee points is as illustrated in FIG. 52.

In other words, in this case, the selection unit 121 selects DR conversion information pieces of the 0-th to fourth knee points from among the DR conversion, information pieces of the 0-th to eighth knee points defined by the knee_function_info SEI. Therefore, a knee conversion function having the selected knee points is a straight line which connects the 0-th to fourth knee points to each other in an order in which the pre-conversion position information is less, that, is, in an order of the second, 0-th, third, first and fourth knee points.

The order i of the knee points is set in an order of a priority for representing the function of FIG. 50B which is a desired function of knee conversion is higher, and DR conversion information pieces of a predetermined number of knee points are selected from the lower order i. Therefore, as illustrated in FIGS. 51 and 52, an approximate function of knee conversion is more approximate to the function of FIG. 50B than in a case where other knee points of the same number are selected.

In addition, a larger number of knee points lead to a smoother and more complex function. Therefore, an approximate function of knee conversion of FIG. 52 in which the number of knee points is five is more approximate to the function of knee conversion of FIG. 50B than an approximate function of knee conversion of FIG. 51 in which the number of knee points is three.

[Description of Process in Decoding System]

Figure 53:
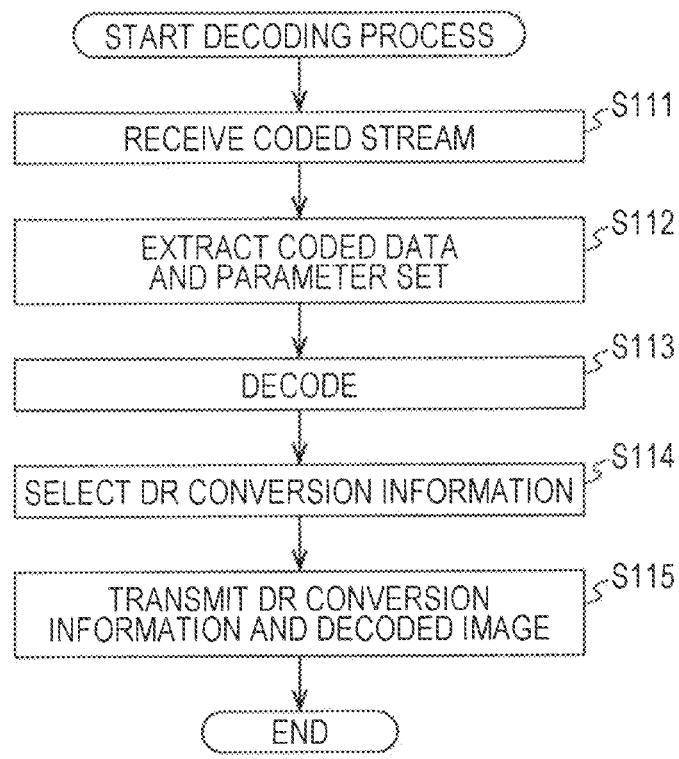
FIG. 53 is a flowchart illustrating a decoding process performed by the decoding device of FIG. 49.

FIG. 53 is a flowchart illustrating a decoding process performed by the decoding device 111 of the decoding system 110 of FIG. 49.

In step S111 of FIG. 53, the reception unit 51 of the decoding device 111 receives a coded stream transmitted from the coding device 70 of FIG. 16, and supplies the coded stream to the extraction unit 91.

In step S112, the extraction unit 91 extracts parameter sets and coded data from the coded stream which is supplied from the reception unit 51. The extraction unit 91 supplies the parameter sets and the coded data to the decoding unit 92. In addition, the extraction unit 91 supplies knee_function_info SEI among the parameter sets to the selection unit 121.

In step S113, the decoding unit 92 decodes the coded data supplied from the extraction unit 91 in the HEVC method. At this time, the decoding unit 92 also refers to the parameter sets supplied from the extraction unit 91 as necessary. The decoding unit 92 supplies the decoded image to the transmission unit 122.

In step S114, the selection unit 121 selects DR conversion information of the number of knee points included in a single packet of AVI InfoFrame of HDMI in an order in which the order i is lower from among DR conversion information pieces of a plurality of knee points included in the knee_function_info SEI from the extraction unit 91. The selection unit 121 supplies the selected DR conversion information of the knee point to the transmission unit 122.

In step S115, the transmission unit 122 disposes the DR conversion information selected by the selection unit 121 in a single packet of AVI InfoFrame of HDMI, and transmits a result thereof to the display device 112 with HDMI along with a decoded image generated by the decoding unit 92. In addition, the process is finished.

Figure 54:
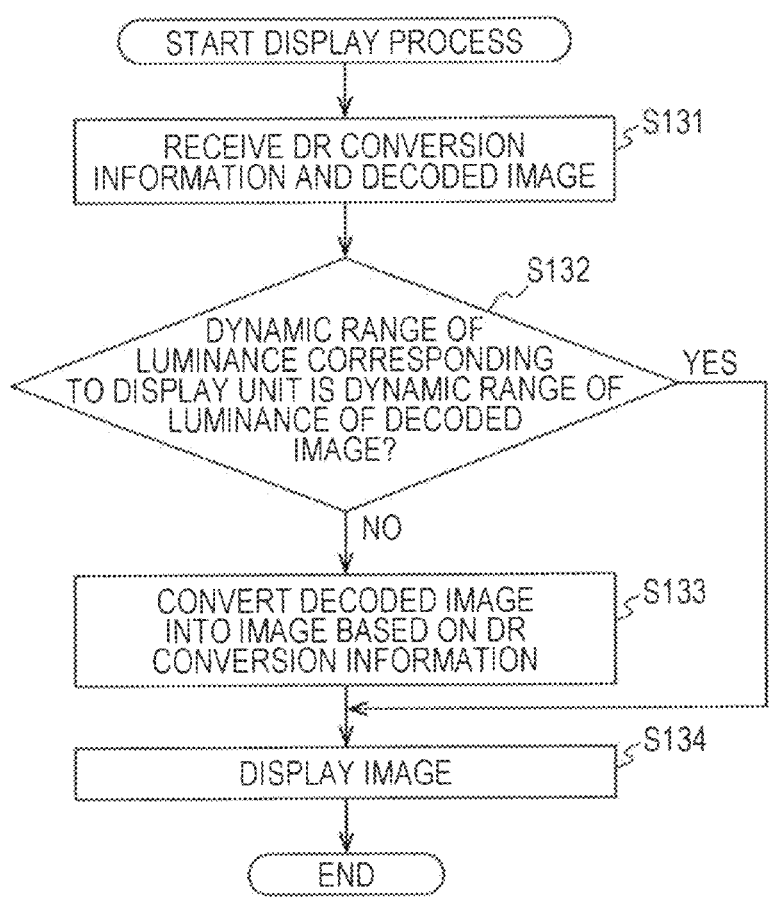
FIG. 54 is a flowchart illustrating a display process performed by a display device of FIG. 49.

FIG. 54 is a flowchart illustrating a display process performed by the display device 112 of the decoding system 110.

In step S131 of FIG. 54, the reception unit 131 of the display device 112 receives the DR conversion information disposed in AVI InfoFrame and the decoded image which are transmitted from the transmission unit 122 with HDMI. The reception unit 131 supplies the DR conversion information and the decoded image to the conversion unit 93.

Processes in steps S132 to S134 are the same as the processes in steps S95 and S97 of FIG. 23, and thus description thereof will not be repeated.

As mentioned above, in the first configuration of the third embodiment to which the present disclosure is applied, the DR conversion information of the knee point in which the order is set in an order in which a priority for representing a desired, knee conversion is higher is set in the knee_function_info SEI and is transmitted. Therefore, the decoding device 111 selects DR conversion information of the number of knee points included in a single packet of AVI InfoFrame in an order in which the order i is lower, and thus can dispose DR conversion information of the knee point indicating an approximate function of knee conversion which is more approximate to a desired function of knee conversion, in a single packet of AVI InfoFrame.

(Example of Syntax of Knee_Function_Info SEI)

A second configuration of the third embodiment of the coding device to which, the present disclosure is applied, is the same as the configuration of the coding device 70 of FIG. 16 except for the knee_function_info SEI set by the setting unit 71 and semantics. Therefore, hereinafter, only the knee_function_info SEI and semantics will be described.

FIG. 55 is a diagram illustrating an example of syntax of knee_function_info SEI set by the setting unit 71 in the second configuration of the third embodiment of the coding device to which the present disclosure is applied.

The knee_function_info SEI of FIG. 55 is the same as the knee_function_info SEI of FIG. 40 except that an approximate knee point index (approximate_knee_point_index) (priority information) indicating the order i is set in an order in which a priority for representing a desired function of knee conversion is higher.

In the knee_function_info SEI of FIG. 55, the order i of knee points is an order in which the pre-conversion position information is less in the same manner as in the case of FIG. 40, but the approximate knee point index (approximate_knee_point_index) is newly set. A value of the approximate knee point index (approximate_knee_point_index) is equal to or less than the knee point number (number_knee_point_minus1).

(Second Example of Semantics)

FIG. 56 is a diagram illustrating that semantics of FIG. 55 is different from that of the second embodiment.

As illustrated in FIG. 56, in the semantics of FIG. 55, a decoded image may be knee-converted by using an approximate function of knee conversion. This approximate function of knee conversion is a straight line which connects knee points in which the order i is 0-th to N-th (where N is equal to or greater than 0 and equal to or smaller than num_knee_point_minus1) approximate knee point index (approximate_knee_point_index [0] to approximate_knee_point_index[N]) in an order in which the order i is lower. An order j of the approximate knee point indexes is an order in which a priority for representing a desired function of knee conversion is higher, and thus an approximate function of knee conversion is more approximate to a desired function of knee conversion as N is greater.

(Configuration Example of One Embodiment of Coding System)

A second configuration of an embodiment of the decoding system to which the present disclosure is applied is the same as the configuration of the decoding system 110 of FIG. 49 except that selection by the selection unit 121 is performed on the basis of not the order i of knee points but the order j of the approximate knee point, indexes. Therefore, hereinafter, only selection by the selection unit 121 will be described.

[Description of Second Selection Method of Knee Point]

Figures 57A, 57B:
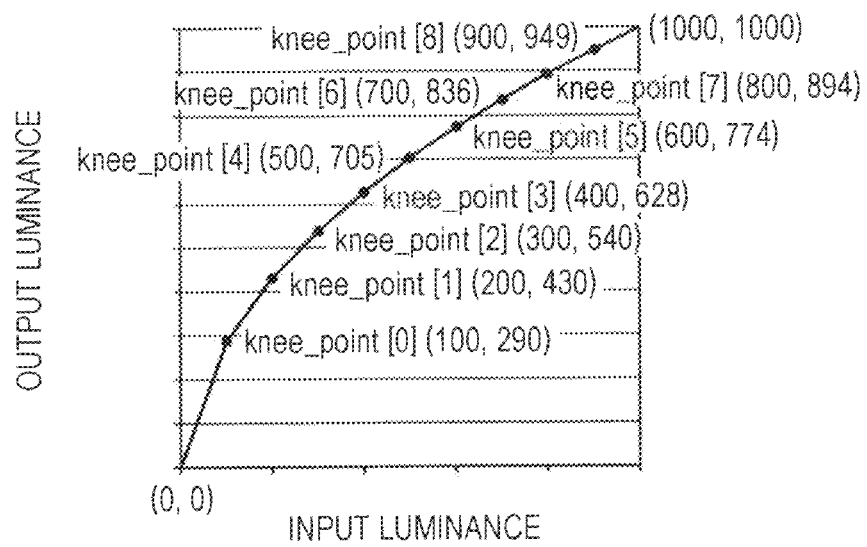
FIG. 57A is a diagram illustrating an example of a knee point and a function of knee conversion defined by knee_function_info SEI of FIG. 55.
FIG. 57B is a diagram illustrating an example of a knee point and a function of knee conversion defined by knee_function_info SEI of FIG. 55.

FIGS. 57A and 57B are diagrams illustrating an example of a knee point and a function of knee conversion defined by the knee_function_info SEI of FIG. 55.

In addition, in the example of FIGS. 57A and 57B, a knee point number (number_knee_point_minus1) set in the knee_function_info SEI is 8 in the same manner as in FIGS. 50A and 50B, and knee points are also the same as in FIGS. 50A and 50B. However, in the knee_function_info SEI of FIG. 55, the order i of knee points is an order in which the pre-conversion position information is less, and is thus different from that of FIGS. 50A and 50B.

As illustrated in FIG. 57A, among eight knee points set in the knee_function_info SEI, pre-conversion position information (input_knee_point[0]) of the 0-th knee point is 100, and post-conversion position information (output_knee_point[0]) thereof is 290. In addition, pre-conversion position information (input_knee_point[1]) of the first knee point is 200, and post-conversion position information (output_knee_point[1]) thereof is 433, and pre-conversion position information (input_knee_point[2]) of the second knee point is 300, and post-conversion position information (output_knee_point[2]) thereof is 540.

Further, pre-conversion position information (input_knee_ point [3]) of the third knee point is 400, and post-conversion position information (output_knee_point[3]) thereof is 628, and pre-conversion position information (input_knee_point[4]) of the fourth knee point is 500, and post-conversion position information (output_knee_point [4]) thereof is 705.

Furthermore, pre-conversion position information (input_knee_point[5]) of the fifth knee point is 600, and post-conversion position information (output_knee_point[5]) thereof is 774, and pre-conversion position information (input_knee_point [6]) of the sixth knee_point is 700, and post-conversion position information (output_knee_point [6]) thereof is 836.

In addition, pre-conversion position information (input_knee_point [7]) of the seventh knee_point, is 800, and post-conversion position information (output_knee_point [7]) thereof is 894, and pre-conversion position information (input_knee_point [8]) of the eighth knee point, is 900, and post-conversion position information (output_knee_point [8]) thereof is 949.

In this case, the respective knee points are connected to each other in an order in which the order i is lower, and thus a function of knee conversion is as illustrated in FIG. 57B.

In addition, as illustrated in FIG. 57A, the approximate knee point indexes (approximate_knee_point_index) in which the order j is 0 to 8 are 1, 5, 0, 3, 7, 2, 4, 6, and 8 in order.

Figure 58:
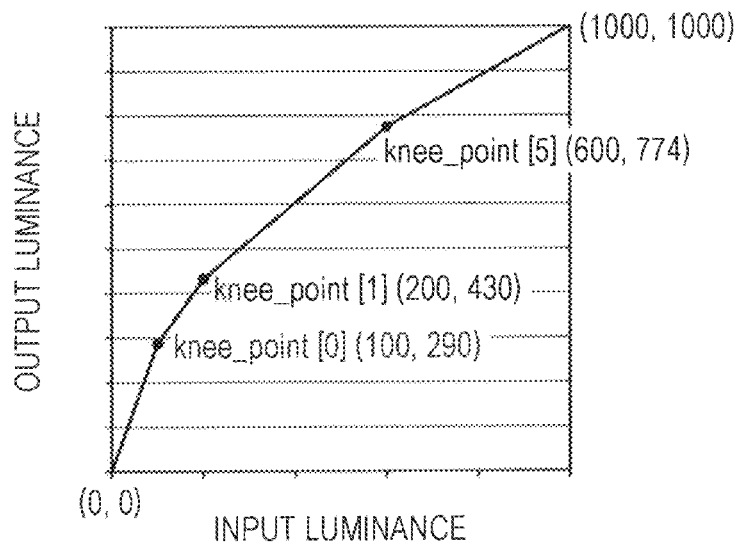
FIG. 58 is a diagram illustrating an example of an approximate function of the knee conversion of FIG. 57.

In a case where the selection unit 121 selects DR conversion information pieces of three knee points from among the DR conversion information pieces of the knee points defined by the knee_function_info SEI of FIG. 57A, a function of knee conversion having the selected knee points is as illustrated in FIG. 58.

In other words, in this case, the selection unit 121 selects DR conversion information pieces of the knee points in which the order i is the 0-th to second approximate, knee point indexes (approximate_knee_point_index) from among the DR conversion information pieces of the 0-th to eighth knee points defined by the knee_function_info SEI. In other words, the selection unit 121 selects the DR conversion information pieces of the first, fifth and 0-th knee points. Therefore, a knee conversion function having the selected knee points is a straight line which connects the first, fifth and 0-th knee points to each other in an order in which the order is lower, that is, in an order of the 0-th, first and fifth knee points.

Figure 59:
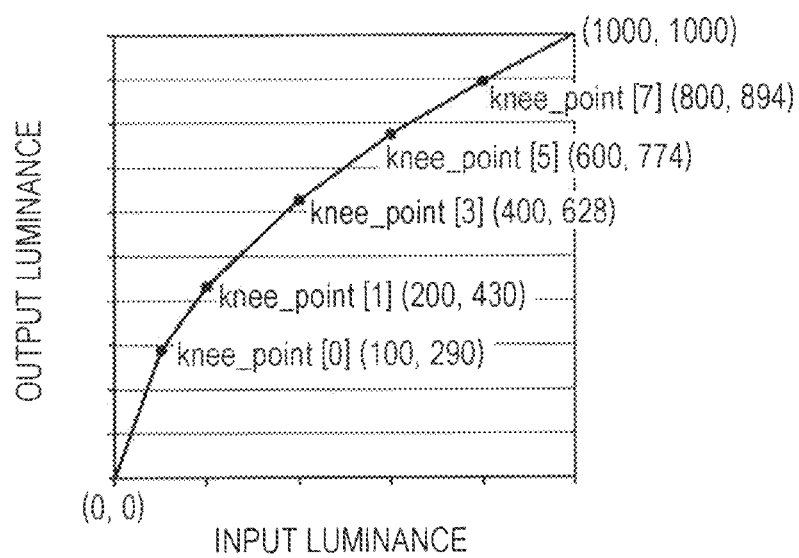
FIG. 59 is a diagram illustrating an example of an approximate function of the knee conversion of FIG. 57.

Meanwhile, in a case where the selection unit 121 selects DR conversion information pieces of five knee points from among the DR conversion information pieces of the knee points defined by the knee_function_info SEI of FIG. 57A, a function of knee conversion having the selected knee points is as illustrated in FIG. 59.

In other words, in this case, the selection unit 121 selects DR conversion information pieces of the knee points in which the order i is the 0-th to fourth approximate knee point indexes (approximate_knee_point_index) from among the DR conversion information pieces of the 0-th to eighth knee points defined by the knee_function_info SEI. In other words, the selection unit 121 selects the DR conversion information pieces of the first, fifth, 0-th, third and seventh knee points. Therefore, a knee conversion function having the selected knee points is a straight line which connects the first, fifth, 0-th, third and seventh knee points to each other in an order in which the order i is lower, that is, in an order of the 0-th, first, third, fifth and seventh knee points.

The order j of the approximate knee point indexes is set in an order of priorities for representing the function of FIG. 57B which is a desired function of knee conversion is higher, and DR conversion information pieces of knee points with a predetermined number of approximate knee point, indexes in the order i are selected from the lower order j. Therefore, as illustrated in FIGS. 58 and 59, an approximate function of knee conversion is more approximate to the function of FIG. 57B than in a case where other knee points of the same number are selected.

In addition, a larger number of knee points lead to a smoother and more complex function. Therefore, an approximate function of knee conversion of FIG. 59 in which the number of knee points is five is more approximate to the function of knee conversion of FIG. 57B than an approximate function of knee conversion of FIG. 58 in which the number of knee points is three.

In addition, as illustrated in FIG. 60, the approximate knee point index (approximate_knee_point_index) may be set in approximate_knee_function_info SEI different from knee_function_info SEI.

In this case, an approximate knee conversion ID (approximate_knee_function_id) and an approximate knee conversion cancel flag (approximate_knee_function_cancel_flag) are set in the approximate_knee_function_info SEI.

The approximate knee conversion ID is an ID unique to the purpose of knee conversion using an approximate function. In addition, the approximate knee conversion cancel flag is a flag illustrating whether or not persistence of previous approximate_knee_function_info SEI is canceled. The approximate knee conversion cancel flag is set to 1 when indicating that persistence of previous approximate_knee_function_info SEI is canceled, and is set to 0 when the persistence is not canceled.

In a case where the approximate knee conversion cancel flag is 0, a reference knee conversion ID (ref_knee_function_id) is set in the approximate knee_function_info SEI. The reference knee conversion ID is a knee conversion ID of knee_function_info SEI including DR information of a knee point indicating a function, of knee conversion which is approximated by using an approximate knee point index of the approximate_knee_function_info SEI.

In addition, an approximate knee_point index number (num_approximate_knee_point_indices_minus1) which is a value, obtained by subtracting 1 from the number of approximate knee point indexes, and an approximately knee_point index (approximate_knee_point_index) are set.

As mentioned above, also in a case where the approximate knee point index (approximate_knee_point_index) is set in the approximate_knee_function_info SEI, semantics is the same as the semantics described in FIG. 56.

In addition, in the above description, only the knee_function_info SEI including DR information of a knee point indicating a function of knee conversion is set, but knee_function_info SEI including DR information of a knee point indicating an approximate function of knee conversion may be set. In this case, for example, DR information of a knee point indicating a function of knee conversion is set to knee_function_info SEI in which a knee conversion ID is 0, and DR information of a knee point indicating an approximate function of knee conversion is set to knee_function_info SEI in which a knee conversion ID is 1. Further, in a case where DR information is transmitted with HDMI, the decoding device disposes the DR information included in the knee_function_info SEI in which the knee conversion ID is 1, in a single packet of AVI InfoFrame, and transmits the DR information.

In addition, a unique ID is set in predetermined brightness as the unconverted display luminance information (input_disp_luminance) and the converted luminance range information (output_d_range), and thus it is possible to reduce a DR information amount. In this case, for example, 0 may be assigned to 400 candela per square meter, and 1 may be assigned to 800 candela per square meter, as an ID. A correspondence relationship between an ID and brightness assigned with the ID is set in common to a coding side and a display side, and thus the display side can recognize the brightness from the ID.

In the third embodiment, a knee point is selected in an order in which priorities for representing a desired function of knee conversion are higher, but a knee point may be selected in other orders.

In addition, in the third embodiment, the number of selected knee points is the number which can be included in a single packet of AVI InfoFrame, but is not limited thereto. For example, in a case where the decoding device 111 has a function of the display device 112, the number of selected knee points may be the number of knee points corresponding to knee conversion which can be processed by the conversion unit 93, or the like.

Fourth Embodiment

Basis of Fourth Embodiment

Figure 61:
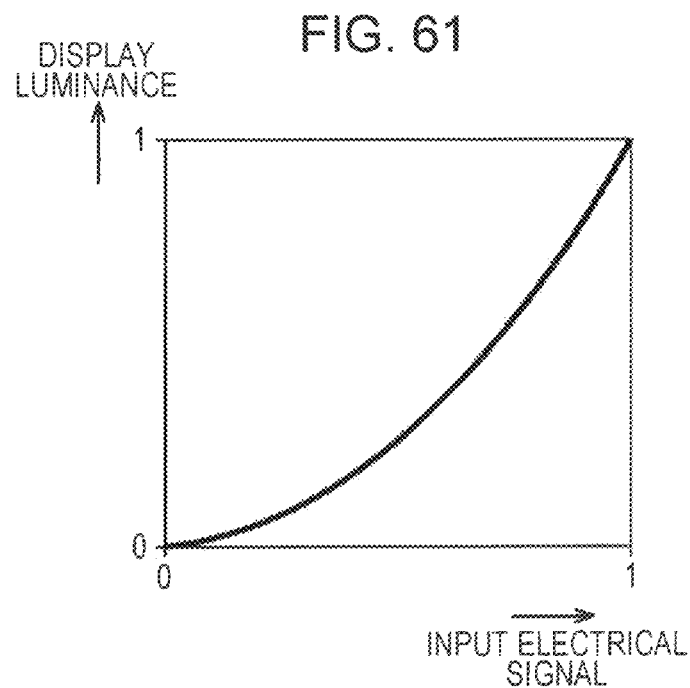
FIG. 61 is a diagram illustrating a relationship between an input electrical signal and display luminance of a CRT.
Figure 62:
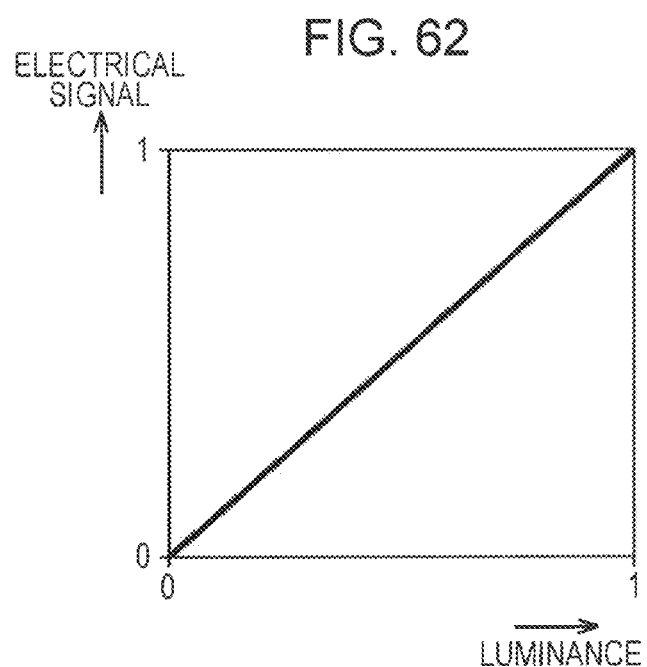
FIG. 62 is a diagram illustrating an electrical signal which is proportional to luminance.
Figure 63:
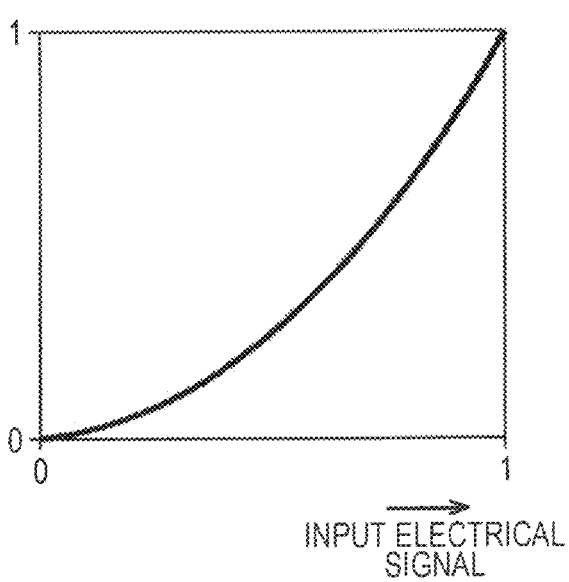
FIG. 63 is a diagram illustrating a relationship between an input electrical signal and display luminance.

As illustrated in FIG. 61, in a cathode ray tube (CRT) used in a CRT display, an input electrical signal and display luminance have no proportional relationship, and it is necessary to input, a higher electrical signal in order to display high luminance. Therefore, if an electrical signal which is proportional to luminance of an image is input to the CRT display as illustrated in FIG. 62, display luminance is lower than original luminance of the image as illustrated in FIG. 63. Therefore, in order to display an image with the original luminance of the image, as illustrated in FIG. 64, it is necessary to convert luminance of an image into an electrical signal by using a function having a characteristic reverse to that of the function of FIG. 61.

In addition, in FIGS. 61 and 63, the transverse axis expresses a value obtained by normalizing an input electrical signal when a value of the input electrical signal for displaying with the maximum luminance in the CRT display is set to 1, and the longitudinal axis expresses a value obtained by normalizing display luminance when the maximum value of the display luminance of the CRT display is set to 1. In FIGS. 62 and 64, the transverse axis expresses a value obtained by normalizing luminance of a display target image when the maximum value of the luminance of a display target image is set to 1, and the longitudinal axis expresses a value obtained by normalizing an electrical signal when a value of the electrical signal corresponding to the maximum value of the luminance of a display target image is set to 1.

Figure 64:
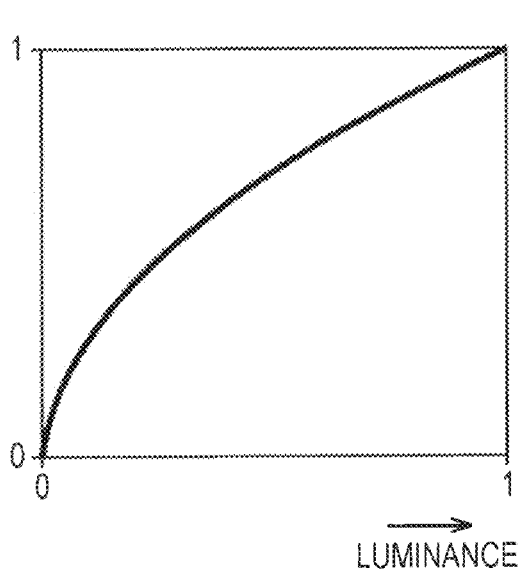
FIG. 64 is a diagram illustrating a function with a characteristic reverse to a function of FIG. 61.

A function for converting an input electrical signal into display luminance as illustrated in FIG. 61 is referred to as electro-optical transfer function (EOTF), and a function for converting luminance of an image into an electrical signal as illustrated in FIG. 64 is referred to as an optical-electro transfer function (OETF).

Other displays such as a light emitting diode (LED) panel have characteristics different from the characteristics of the CRT display. However, in order not to change generation procedures of an input electrical signal depending on displays, processes using the EOTF and the OETF are also performed in the same manner as in the CRT display in a case of performing display with other displays.

Figure 65:
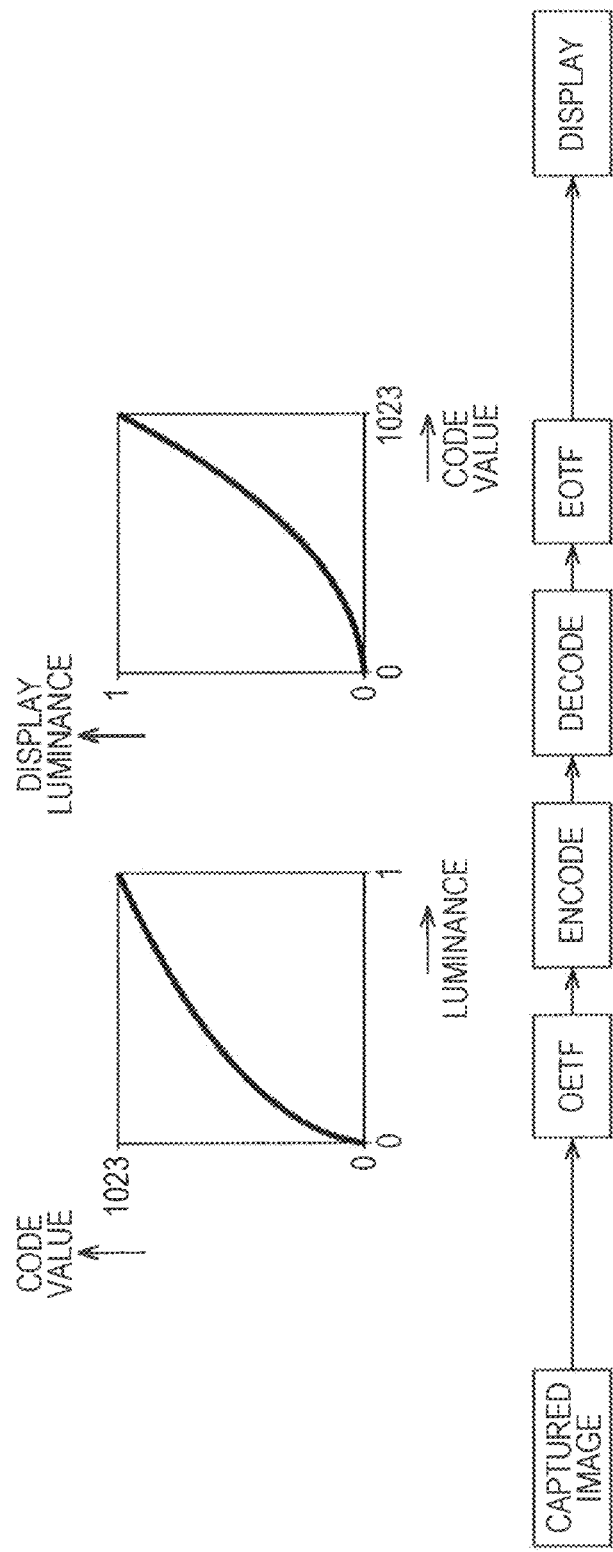
FIG. 65 is a diagram illustrating an example of a flow of a process until an image is displayed from capturing of the image.

FIG. 65 is a diagram illustrating an example of a flow of a process until an image is displayed from capturing of the image.

In addition, in the example of FIG. 65, an electrical signal is a code value of 10 bits (0 to 1023), and the OETF and the EOFT are defined in BT.709.

As illustrated in FIG. 65, when an image is captured by a camera or the like, a photoelectric conversion process of converting luminance (light) into an electrical signal (code value) by using the OETF is performed on the captured image. Then, the electrical signal is coded, and the coded electrical signal is decoded. In addition, an electro-optical conversion process of converting an electrical signal into luminance by using the EOTF is performed on the decoded electrical signal.

Meanwhile, the human visual sense has a characteristic of being sensitive to a luminance difference at low luminance and being insensitive to a luminance difference at high luminance. Therefore, as illustrated in FIG. 65, the OETF of BT.709 is a function in which more code values are assigned to a low luminance part than a high luminance part. As a result, subjectively sufficient image quality is realized.

In a case where the maximum luminance of an image is about 100 candela per square meter, satisfactory code values can be assigned to a low luminance part by using the OETF of BT.709. However, the maximum luminance of displays has recently tended to increase, and is expected to be accelerated in the future. If the maximum luminance of an image increases in accordance therewith, code values to be assigned to a low luminance part are insufficient in the OETF of BT.709, and thus satisfactory image quality is unable to be obtained.

Therefore, it is considered that a new OETF for use in an HDR image in which a ratio of code values assigned to a low luminance part is increased is generated, and thus satisfactory image quality is obtained in an HDR image. However, in this case, in order to perform a photoelectric conversion process and an electro-optical conversion process, it is necessary to prepare for both an OETF and an EOTF for an HDR image and an OETF and an EOTF for an SDR image.

On the other hand, in a case where electro-optical conversion is performed on an SDR image by using an OETF for an HDR image, grayscale expression of luminance is roughened.

Figure 66:
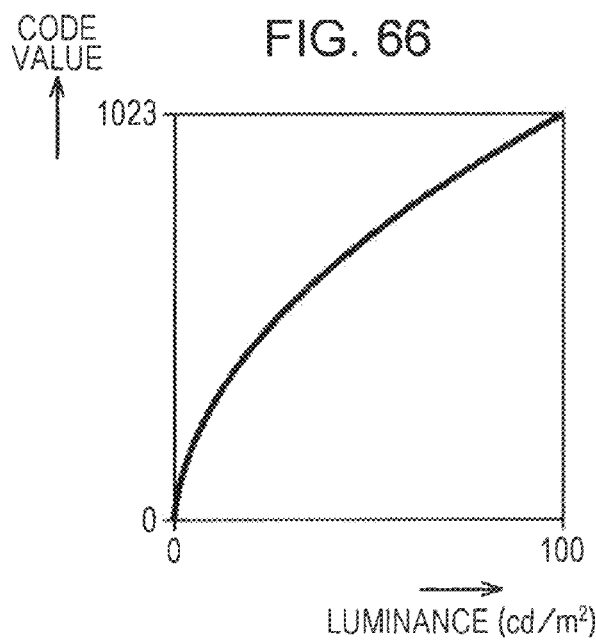
FIG. 66 is a diagram illustrating OETF for use in an SDR image.
Figure 67:
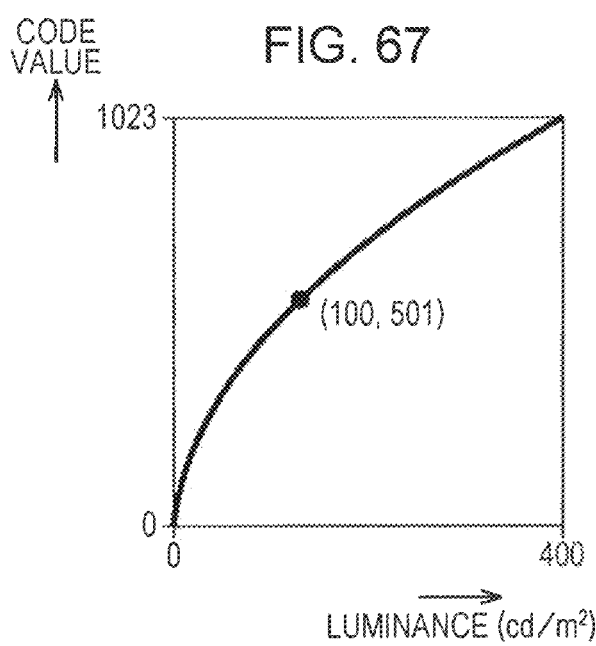
FIG. 67 is a diagram illustrating OETF for use in an HDR image.

For example, as illustrated in FIG. 66, in a case where photoelectric conversion is performed on an SDR image by using an OETF of BT.709 for an SDR image having the maximum luminance of 100 candela per square meter, luminance of the SDR image is expressed in codes of 1024 including 0 to 1023. In contrast, as illustrated in FIG. 67, in a case where photoelectric conversion is performed on an SDR image by using an OETF for an HDR image having the maximum luminance of 400 candela per square meter, luminance of the SDR image is expressed, for example, in 502 code values including 0 to 501.

Therefore, an OETF and an EOTF are preferably variable in order to assign sufficient code values to a low luminance part in both an HDR image having high maximum luminance and an SDR image having low maximum luminance. Therefore, in the fourth embodiment, knee conversion is performed before the OETF of BT.709 and after the EOTF of BT.709, and thus sufficient code values can be assigned to a low luminance part.

[Overview of Photoelectric Conversion Process in Fourth Embodiment.]

Figure 68:
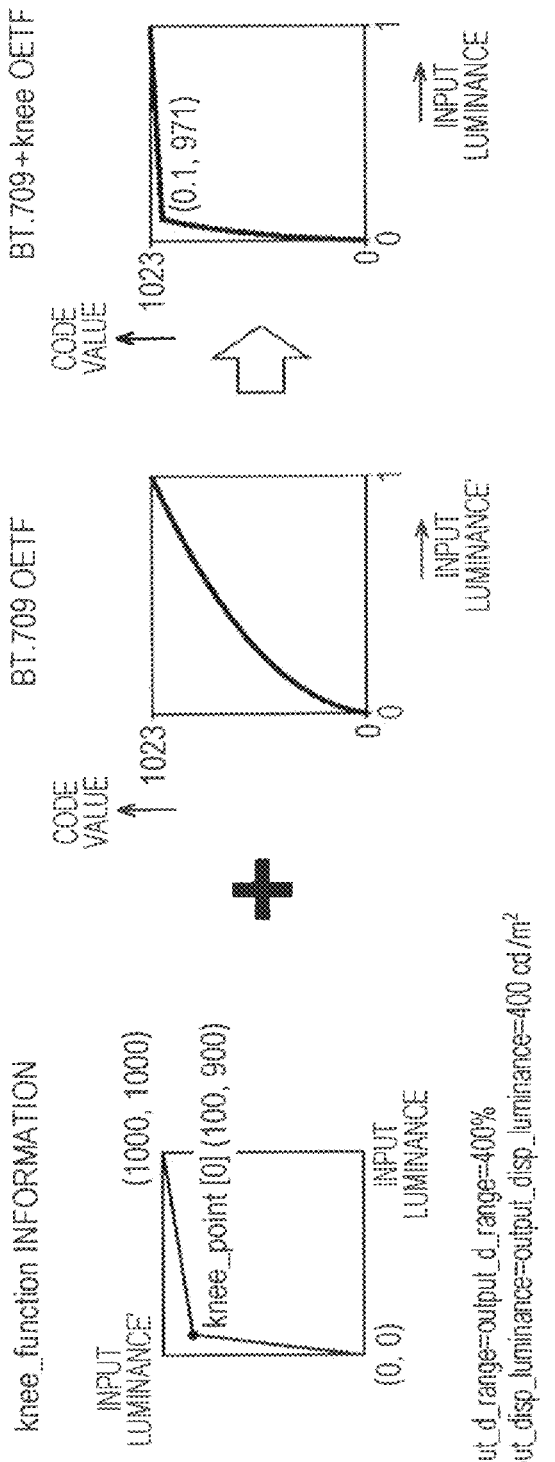
FIG. 68 is a diagram illustrating an overview of a photoelectric conversion process in a fourth embodiment.

FIG. 68 is a diagram illustrating an overview of a photoelectric conversion process in the fourth embodiment.

As illustrated in the left part of FIG. 68, in the fourth embodiment, first, predetermined, knee conversion is performed on luminance (input luminance) of a captured image. In an example of FIG. 68, through the knee conversion, 10% of a low luminance part of the input luminance is converted into 90% of the low luminance part of input luminance', and 90% of a high luminance part of the input luminance is converted into 10% of the high luminance part, of the input luminance'. Accordingly, there is a generation of the input luminance' in which more values are assigned to the low luminance part than the high luminance part.

Next, as illustrated in the central part, of FIG. 68, a photoelectric conversion process using the OETF of BT.709 is performed on the input luminance' so as to generate a code value of a predetermined number of bits (10 bits in the example of FIG. 68). As described above, since, in the input luminance', more values are assigned to the low luminance part, than the high luminance part, as illustrated, in the right part of FIG. 68, more values are assigned in code values converted from the input luminance' due to the low luminance part of the input luminance than in the OETF of BT.709. In the example of FIG. 68, 10% of the low luminance part of the input luminance is assigned to 94% of code values.

As mentioned above, in the fourth embodiment, an extent of assigning code values to a low luminance part (dark part) and an extent of assigning the code values to a high luminance part (bright part) are adjusted by using a function of knee conversion as a parameter.

In addition, information on a knee point of knee conversion performed on the input luminance is set in the knee_function_info SEI of FIG. 40 and is transmitted to a decoding side.

[Overview of Electro-Optical Conversion Process in Fourth Embodiment]

Figure 69:
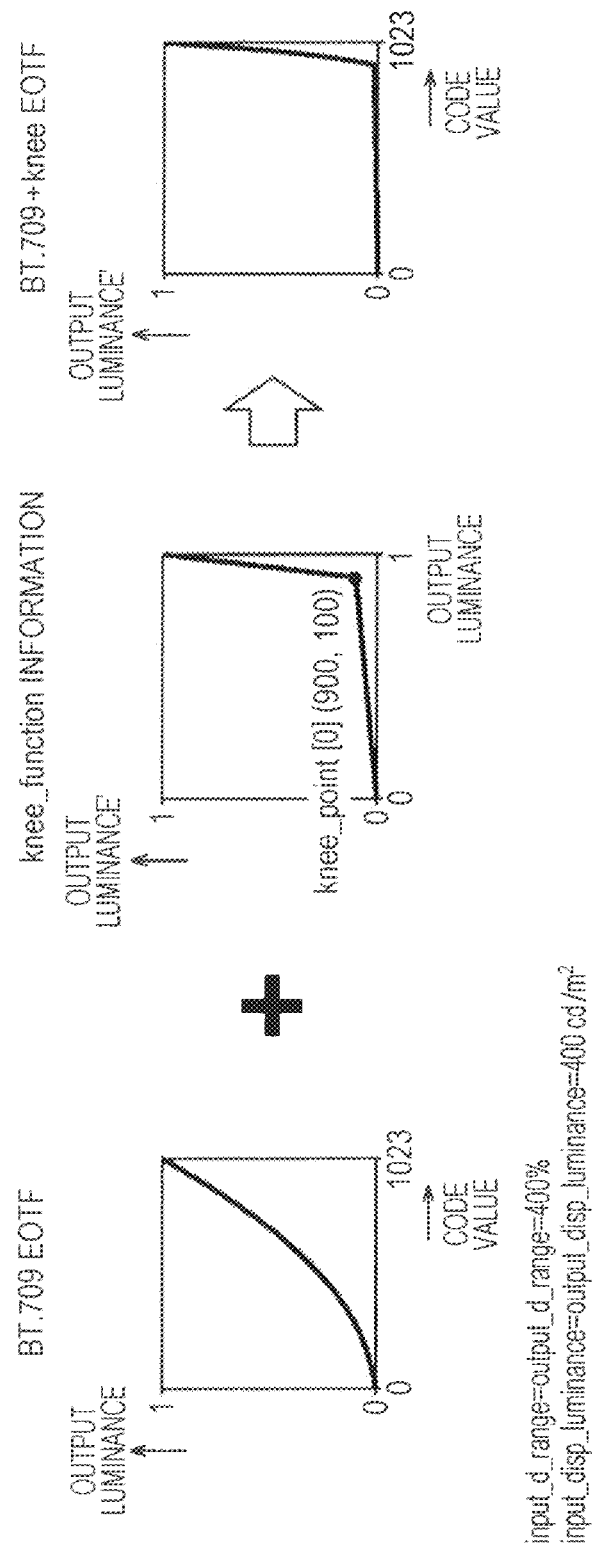
FIG. 69 is a diagram illustrating an overview of an electro-optical conversion in the fourth embodiment.

FIG. 69 is a diagram illustrating an overview of an electro-optical conversion process in the fourth embodiment.

As illustrated in the left part of FIG. 69, in the fourth embodiment, first, an electro-optical conversion process using the EOTF of BT.709 is performed on code values of a decoded image so as to generate luminance (output luminance). Next, as illustrated in the central part of FIG. 69, predetermined knee conversion is performed on the output luminance. In an example of FIG. 68, through the knee conversion, 90% of a low luminance part of the output luminance is converted into 10% of a low luminance part, of output luminance', and 10% of a high luminance part of the output luminance is converted into 90% of a high luminance part of the output luminance'.

Accordingly, as illustrated in the right part of FIG. 69, code values in which more values are assigned due to the low luminance part of the input luminance than in the EOTF of BT.709 can be converted into the same output luminance' as input luminance corresponding to the code values.

As mentioned above, in the fourth embodiment, code values in which an extent of assignment to a low luminance part (dark part) and an extent of assignment to a high luminance part (bright part) are adjusted are converted, into luminance by using a function of knee conversion as a parameter.

In addition, information on a knee point of knee conversion performed on the output luminance is determined on the basis of information set in knee_function_info SET or the like transmitted from a coding side.

(Configuration Example of Fourth Embodiment, of Coding Device)

Figure 70:
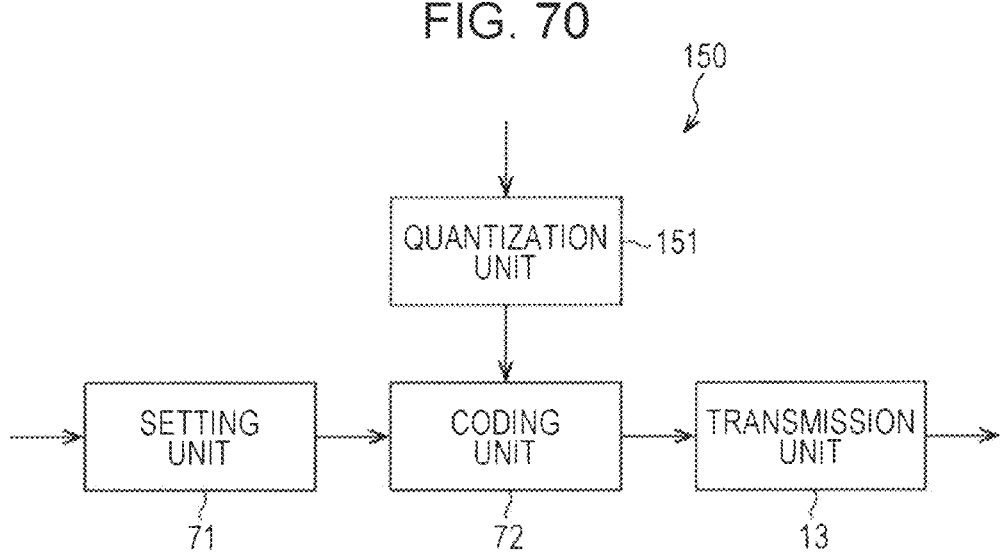
FIG. 70 is a block diagram illustrating a configuration example of the fourth embodiment of a coding device to which the present disclosure is applied.

FIG. 70 is a block diagram illustrating a configuration example of the fourth embodiment, of a coding device to which the present disclosure is applied.

Among constituent elements illustrated, in FIG. 70, the same constituent elements as the constituent elements of FIG. 6 or 16 are given the same reference numerals. Repeated description will be omitted as appropriate.

A configuration of a coding device 150 of FIG. 70 is different from the configuration of FIG. 16 in that a quantization unit 151 is provided instead of the conversion unit 73. The coding device 150 performs a photoelectric conversion process on a captured image which is input from an external device so as to perform coding.

Specifically, the quantization unit 151 of the coding device 150 knee-converts luminance of the captured, image which is input from the external device. Information on a knee point of the knee conversion is set in knee_function_info SEI by the setting unit 71. The quantization unit 151 performs a photoelectric conversion process using the OETF of BT.709 on the knee-converted luminance so as to generate a code value. The quantization unit 151 supplies the generated code value to the coding unit 72 as a coding target image.

<Description of Process in Coding Device>

Figure 71:
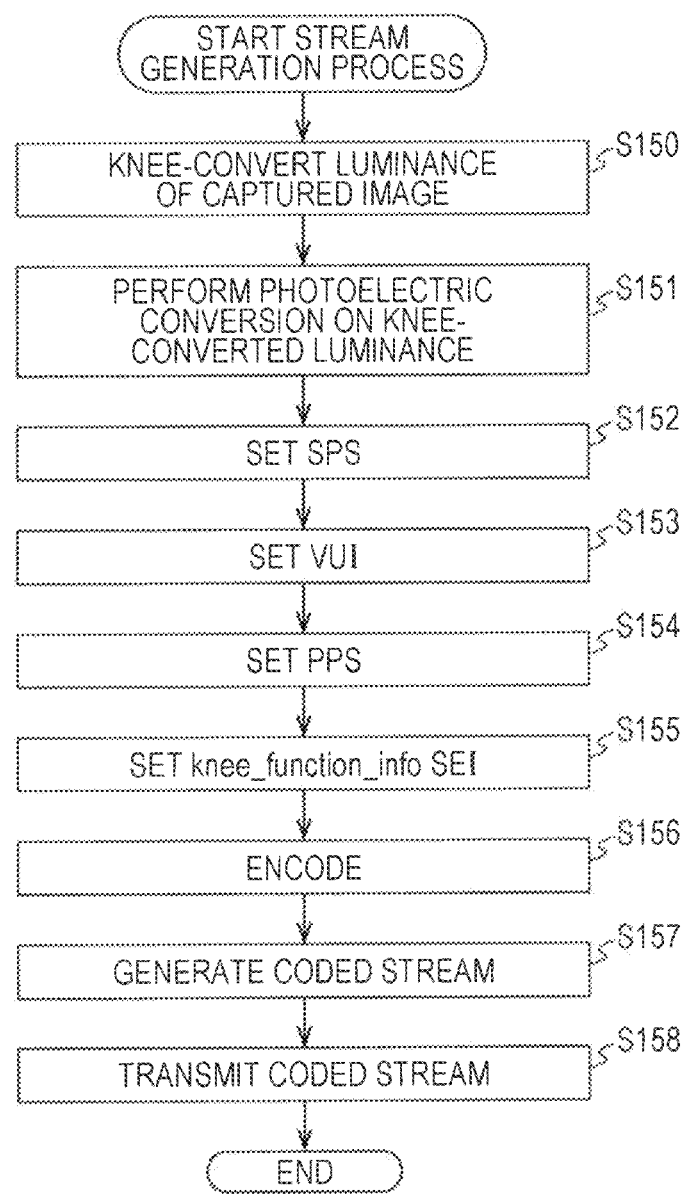
FIG. 71 is a flowchart illustrating a stream generation process performed by the coding device of FIG. 70.

FIG. 71 is a flowchart illustrating a stream generation process performed by the coding device 150 of FIG. 70.

In step S150 of FIG. 71, the quantization unit 151 of the coding device 150 knee-converts luminance of a captured image which is input, from an external device. In step S152, the quantization unit 151 performs a photoelectric conversion process using the EOTF of BT.709 on the knee-converted luminance so as to generate a code value. The quantization unit 151 supplies the generated code value to the coding unit 72 as a coding target image.

Processes in steps S152 to S154 are the same as the processes in steps S73 to S75 of FIG. 21, and thus description thereof will be omitted.

In step S155, the setting unit 71 sets knee_function_info SEI including information on a knee point of the knee conversion performed due to the process in step S150. The setting unit 71 supplies parameter sets such, as the set SPS, PPS, VUI and knee_function_info SEI to the coding unit 72.

In step S156, the coding unit 72 codes the coding target image which is supplied from the conversion unit 73 in the HEVC method. Processes in steps S157 and S158 are the same as the processes in steps S78 and S79 of FIG. 21, and thus description thereof will be omitted.

As mentioned above, the coding device 150 performs the knee conversion before the OETF of BT.709, and thus can perform a photoelectric conversion process suitable for both an SDR image and an HDR image by using the OETF of BT.709.

(Configuration Example of Fourth Embodiment of Decoding Device)

Figure 72:
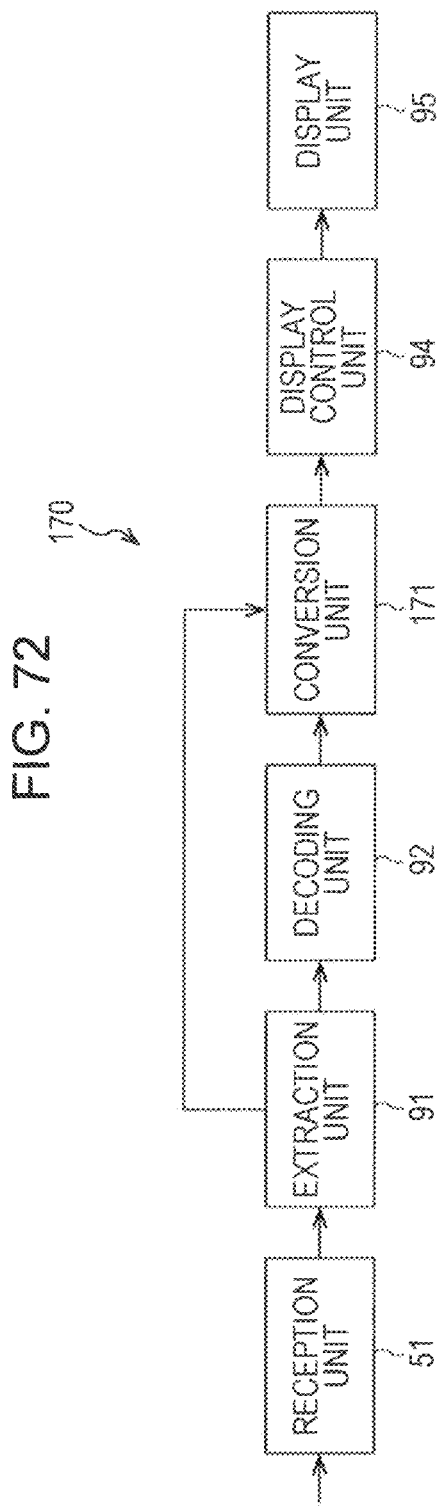
FIG. 72 is a block diagram illustrating a configuration example of the fourth embodiment of a decoding device to which the present disclosure is applied.

FIG. 72 is a block diagram illustrating a configuration example of the fourth embodiment of a decoding device to which the present disclosure is applied and which decodes a coded stream transmitted from the coding device 150 of FIG. 70.

Among constituent elements illustrated in FIG. 72, the same constituent, elements as the constituent elements of FIG. 12 or 22 are given the same reference numerals. Repeated description will be omitted as appropriate.

A configuration of a decoding device 170 of FIG. 72 is different from the configuration of the decoding device 90 of FIG. 22 in that a conversion unit 171 is provided instead of the conversion unit 93. The decoding device 170 decodes a coded stream, and performs an electro-optical conversion process on a decoded image, which is obtained, as a result thereof.

Specifically, the conversion unit 171 of the decoding device 170 performs an electro-optical conversion process using the EOTF of BT.709 on a code value as a decoded image supplied from the decoding unit 92, so as to generate luminance. The conversion unit 171 performs knee conversion on the luminance on the basis of knee_function_info SEI from the extraction unit 91. The conversion unit 171 supplies luminance which is obtained as a result of the knee conversion to the display control unit 94 as a display image.

<Description of Process in Decoding Device>

Figure 73:
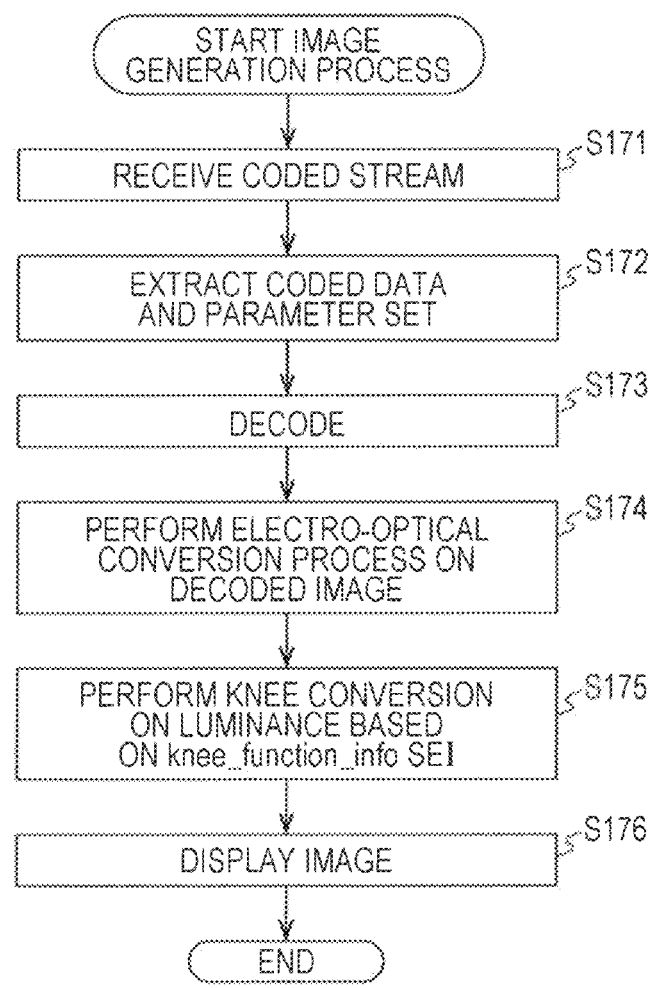
FIG. 73 is a flowchart illustrating an image generation process performed by the decoding device of FIG. 72.

FIG. 73 is a flowchart illustrating an image generation process performed by the decoding device 170 of FIG. 72.

Processes in steps S171 to S173 of FIG. 73 are the same as the processes in steps S91 to S93 of FIG. 23, and thus description thereof will be omitted.

In step S174, the conversion unit 171 of the decoding device 170 performs an electro-optical conversion process using the EOTF of BT.709 on a code value as a decoded image supplied from the decoding unit 92, so as to generate luminance.

In step S175, the conversion unit 171 performs knee conversion on the generated luminance on the basis of knee_function_info SEI from the extraction unit 91. The conversion unit 171 supplies luminance which is obtained as a result of the knee conversion to the display control unit 94 as a display image.

In step S176, the display control unit 94 displays the display image supplied from the conversion unit 93 on the display unit 95, and finishes the process.

As mentioned above, the decoding device 170 performs the knee conversion after the EOTF of BT.709, and thus can perform an electro-optical conversion process suitable for both an SDR image and an HDR image by using the EOTF of BT.709.

In addition, the maximum luminance of a coding target image may be included in a coded stream along with coded data and may be transmitted to the decoding device 170 from the coding device 150, and may be determined in advance as a value common to the coding device 150 and the decoding device 170. Further, knee_function_info SEI may be set for each item of the maximum, luminance of a coding target image.

In addition, in the fourth embodiment, the knee_function_info SEI of the first to third embodiments may be set. In this case, the decoding side performs knee conversion by using DR conversion information, and thus it is possible to perform conversion into an image which is suitable for various luminance displays.

In addition, the decoding device 170 in the fourth embodiment may be divided into a decoding device and a display device in the same manner as in the third embodiment.

Further, in the fourth embodiment, an extent of assigning code values to a low luminance part and an extent of assigning the code values to a high luminance part are adjusted by using a function of knee conversion as a parameter, but may be adjusted by using functions other than the function of knee conversion as a parameter.

Furthermore, the present disclosure may be applied to the AVC method.

Fifth Embodiment

[Description of Computer to Which Present Disclosure is Applied]

The above-described, series of processes may be performed by hardware or software. When the above-described series of processes is performed by the software, programs constituting the software are; installed in a computer. Here, the computer includes a computer incorporated into dedicated hardware, or a general purpose personal computer or the like which can execute various kinds of functions by installing various kinds of programs.

Figure 74:
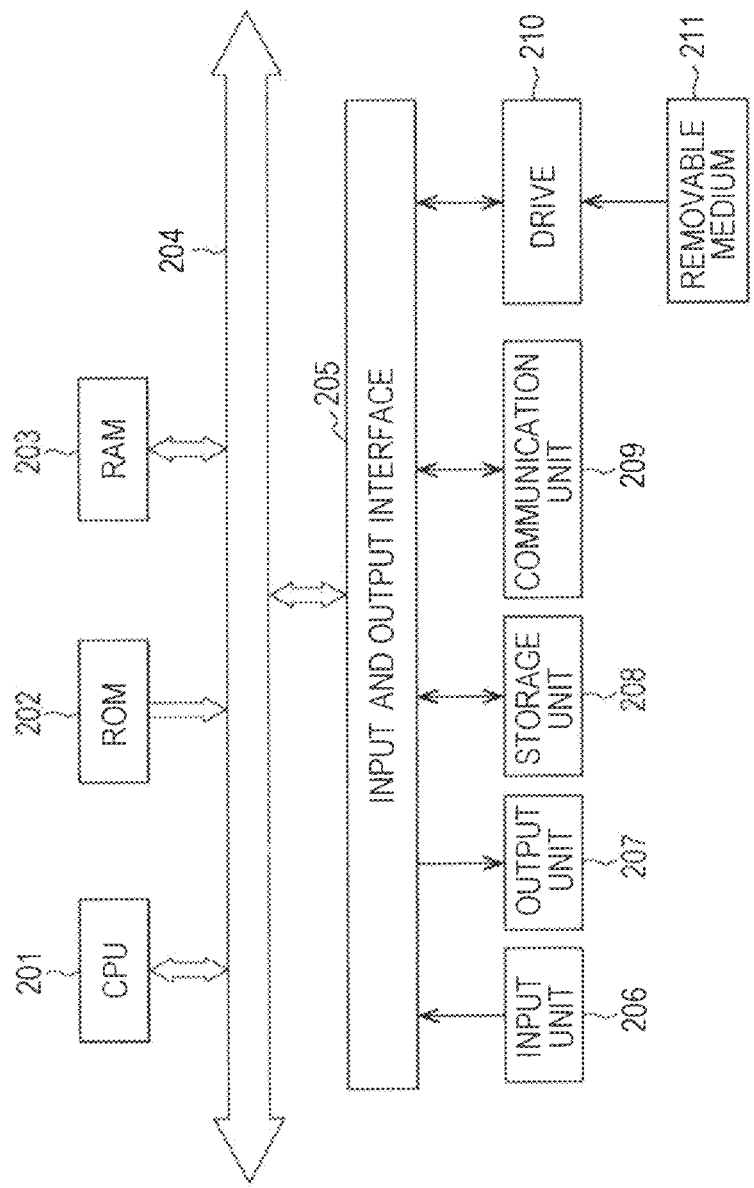
FIG. 74 is a block diagram illustrating a hardware configuration example of a computer.

FIG. 74 is a block diagram illustrating a configuration example of hardware of a computer which performs the above-described series of processes according to a program.

In the computer, a central processing unit (CPU) 201, a read only memory (ROM) 202, and a random access memory (RAM) 203 are connected to each other via a bus 204.

The bus 204 is also connected to an input and output interface 205. The input and output interface 205 is connected to an input unit 206, an output unit 207, a storage unit 208, a communication unit 209, and a drive 210.

The input unit 206 includes a keyboard, a mouse, a microphone, and the like. The output unit 207 includes a display, a speaker, and the like. The storage unit 208 includes a hard disk, a nonvolatile memory, or the like. The communication unit 209 includes a network interface or the like. The drive 210 drives a removable medium 211 such as a magnetic disk, an optical disc, a magneto-optical disc, or the like.

In the computer configured in this way, the CPU 201 performs the above-described series of processes, for example, by loading the program stored in the storage unit 208 to the RAM 203 via the input and output interface 205 and the bus 204 and executing the program.

The program executed by the computer (the CPU 201) may be recorded on the removable medium 211, for example, as a package medium, and may be provided. In addition, the program, may be provided via a wired or wireless transmission medium such as a local area network, the Internet, or a digital satellite broadcast.

In the computer, the program may be installed in the storage unit 208 via the input and output interface 205 by installing the removable medium 211 in the drive 210. In addition, the program may be received by the communication unit 209 via a wired or wireless transmission medium and may be installed, in the storage unit 208. Further, the program may be installed in the ROM 202 or the storage unit 208 in advance.

In addition, the program executed by the computer may be a program which performs processes in a time series according to the order described in the present specification, and may be a program which performs processes in parallel or at a necessary timing such as when accessed.

Sixth Embodiment

[Application to Multi-View Image Coding and Multi-View Image Decoding]

Figure 75:
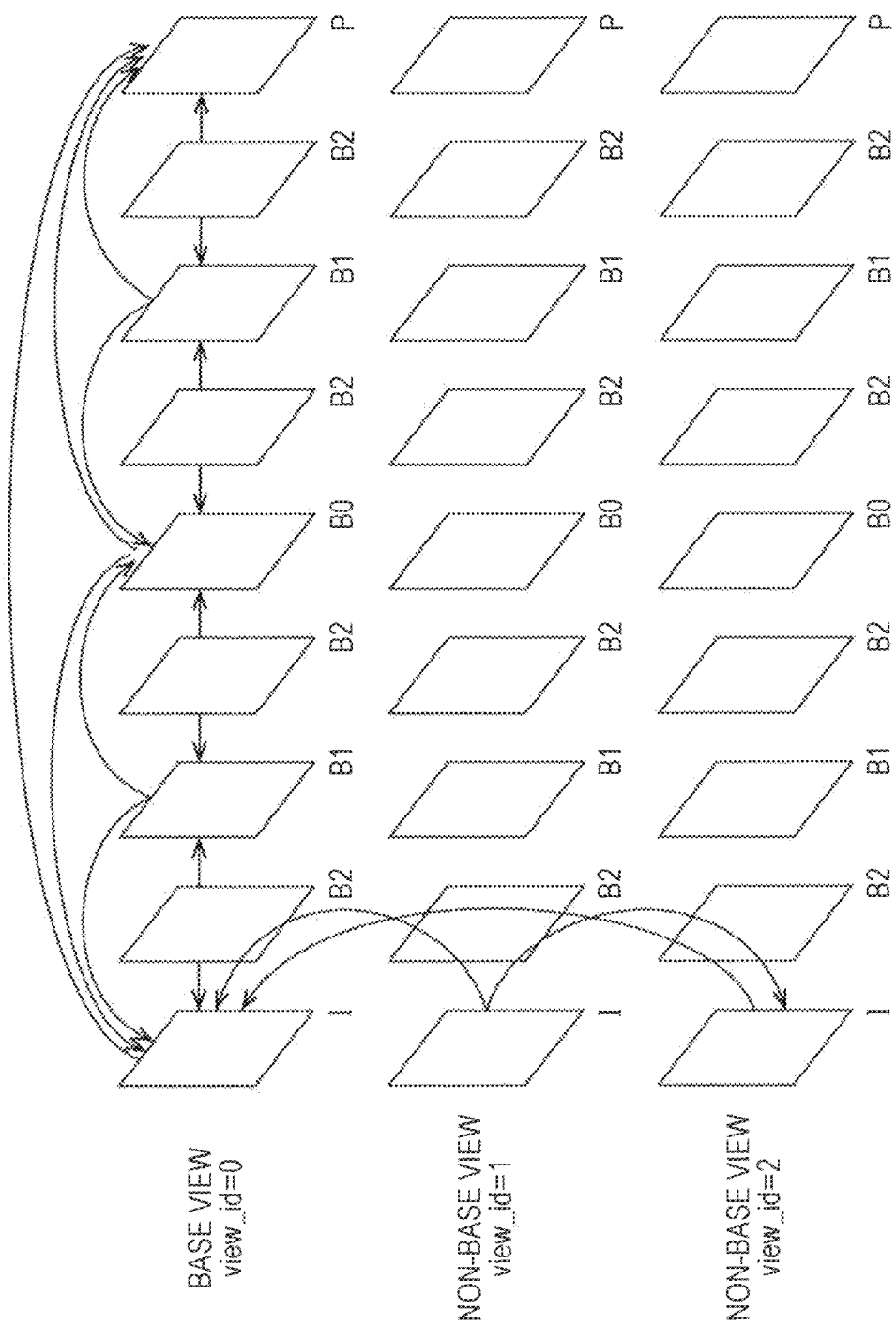
FIG. 75 is a diagram illustrating an example of a multi-viewpoint image coding method.

The above-described series of processes may be applied to multi-view image coding and multi-view image decoding. FIG. 75 is a diagram illustrating an example of a multi-view image coding method.

As illustrated in FIG. 75, multi-view images include images at a plurality of views. The plurality of views of the multi-view images includes a base view in which coding/decoding is performed by using only an image at its own view, and a non-base view in which coding/decoding is performed by using images at other views. The non-base view may use a base view image and may use other non-base view images.

In a case of coding/decoding multi-view images as in FIG. 75, each view image is coded/decoded, and the above-described method of the first embodiment may be applied to coding/decoding of each view. In this way, a decoded image can be converted into a desired image with a different dynamic range.

In addition, in coding/coding of each view, the flag or the parameter used in the method of the first embodiment may be shared. More specifically, for example, the syntax element or the like of the knee_function_info SEI may be snared in coding/decoding of each view. Of course, necessary information other than these elements may be shared in coding/decoding of each view.

In this way, it is possible to minimize transmission of redundant information and thus to reduce transmitted information amount (bit rate) (that is, it is possible to minimise a reduction in coding efficiency).

[Multi-View Image Coding Device]

Figure 76:
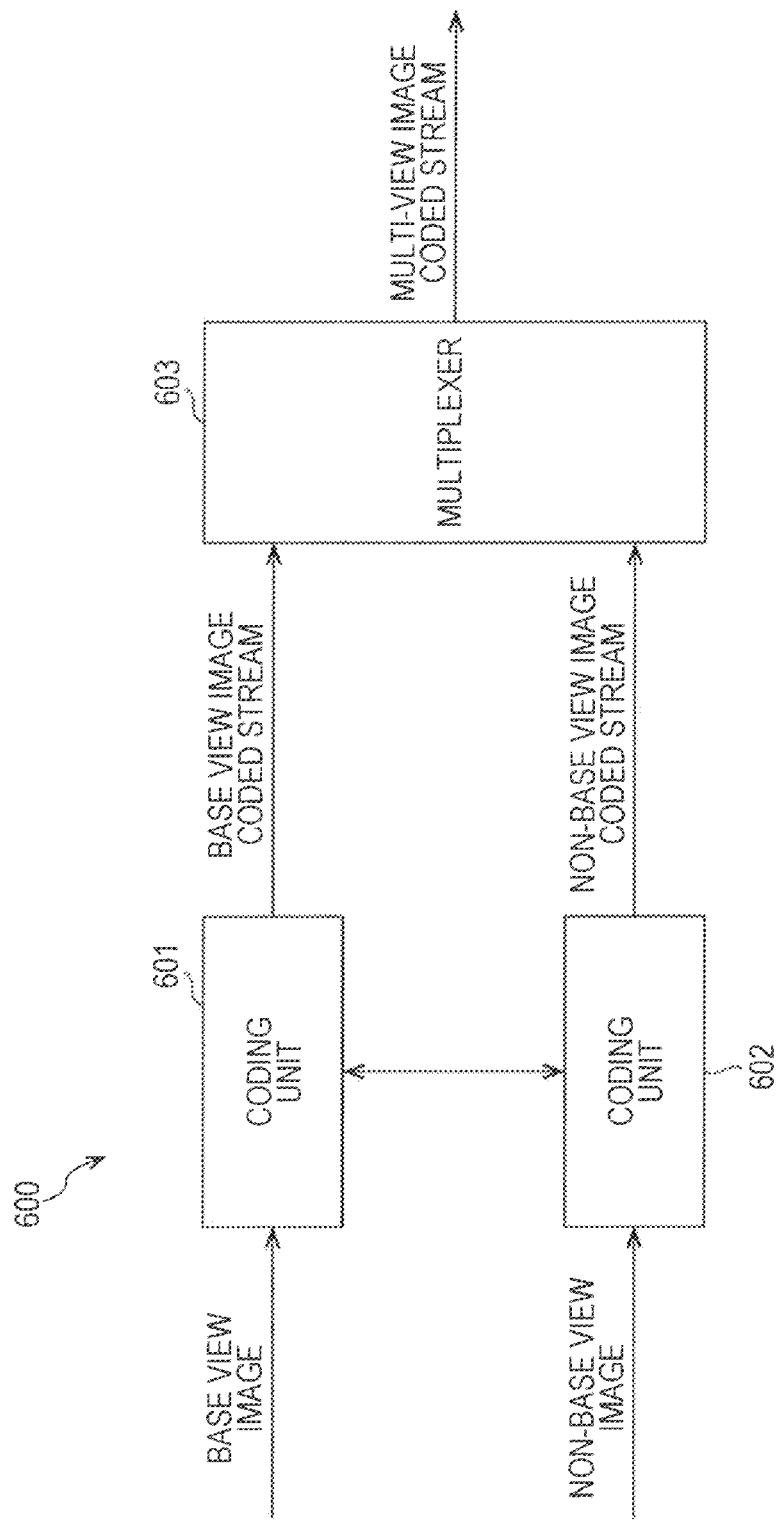
FIG. 76 is a diagram illustrating a configuration example of a multi-view image coding device to which the present disclosure is applied.

FIG. 76 is a diagram illustrating a multi-view image coding device which performs the above-described multi-view image coding. As illustrated in FIG. 76, the multi-view image coding device 600 includes a coding unit 601, a coding unit 602, and a multiplexer 603.

The coding unit 601 codes a base view image so as to generate a base view image coded stream. The coding unit 602 codes a non-base view image so as to generate a non-base view image coded stream. The multiplexer 603 multiplexes the base view image coded stream generated in the coding unit 601 and the non-base view image coded stream generated in the coding unit 602, so as to generate a multi-view image coded stream.

The coding device 10 (FIG. 6) is applicable to the coding unit 601 and the coding unit 602 of the multi-view image coding device 600. In other words, in coding of each view, an image can be coded so that a decoded image can be converted, into a desired image with a different dynamic range during decoding. In addition, the coding unit 601 and the coding unit 602 can perform coding (that is, a flag or a parameter can be shared) by using the mutually same flags or parameters (for example, a syntax element or the like regarding a process of images), and thus it is possible to minimize a reduction in coding efficiency.

[Multi-View Image Decoding Device]

Figure 77:
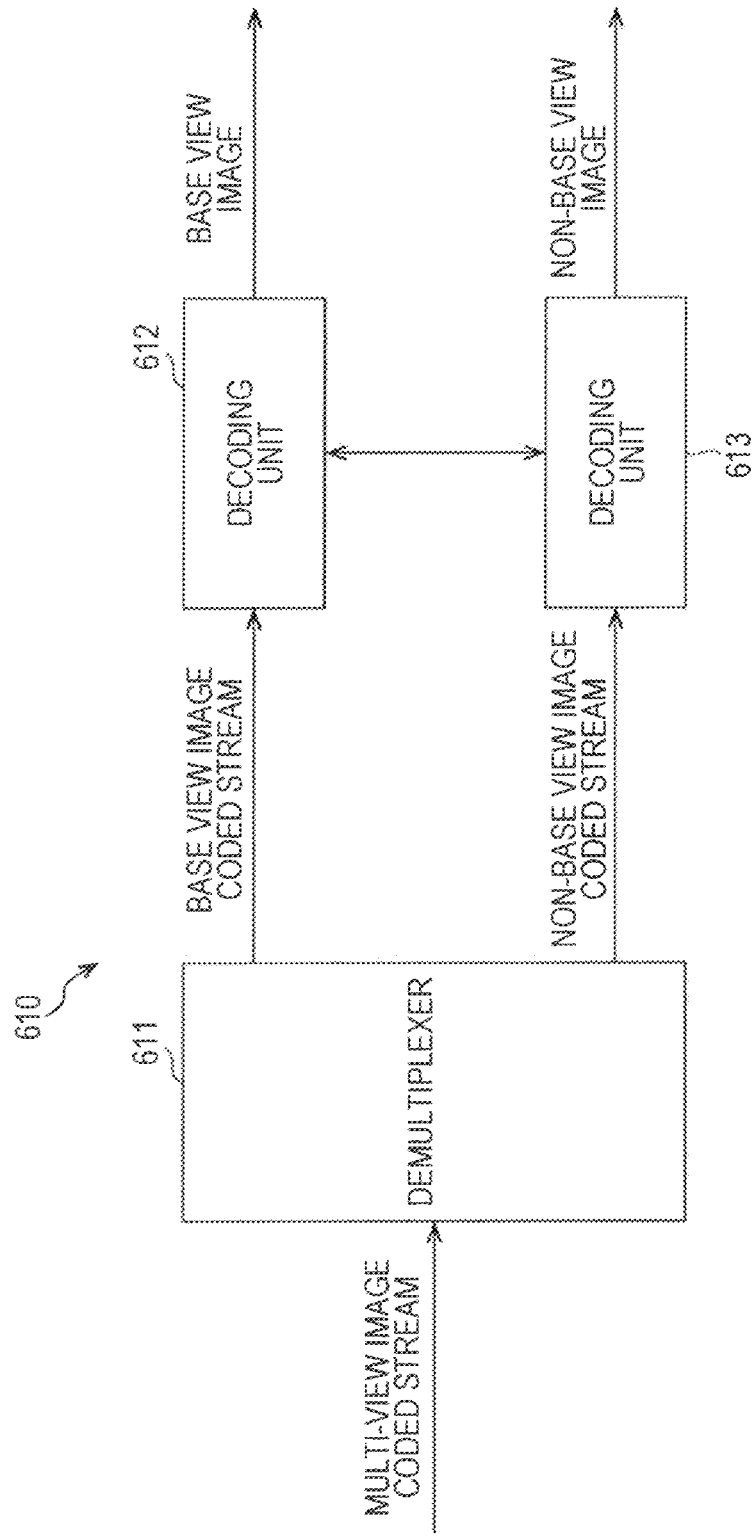
FIG. 77 is a diagram illustrating a configuration example of a multi-view image decoding device to which the present disclosure is applied.

FIG. 77 is a diagram illustrating a multi-view image decoding device which performs the above-described multi-view image decoding. As illustrated in FIG. 77, the multi-view image decoding device 610 includes a demultiplexer 611, a decoding unit 612, and a decoding unit 613.

The demultiplexer 611 demultiplexes the multi-view image coded stream into which the base view image coded stream and the non-base view image coded stream are multiplexed, so as to extract the base view image coded stream and the non-base view image coded stream. The decoding unit 612 decodes the base view image coded stream, extracted by the demultiplexer 611 so as to obtain a base view image. The decoding unit 513 decodes the non-base view image coded stream extracted by the demultiplexer 611 so as to obtain a non-base view image.

The decoding device 50 (FIG. 12) is applicable to the decoding unit 612 and the decoding unit 613 of the multi-view image decoding device 610. In other words, in decoding of each view, a decoded image can be converted into a desired image with a different dynamic range. In addition, the decoding unit 612 and the decoding unit 613 can perform coding (that is, a flag or a parameter can be shared) by using the mutually same flags or parameters (for example, a syntax element or the like regarding a process of images), and thus it is possible to minimize a reduction in coding efficiency.

Seventh Embodiment

[Application to Layer Image Coding and Layer Image Decoding]

Figure 78:
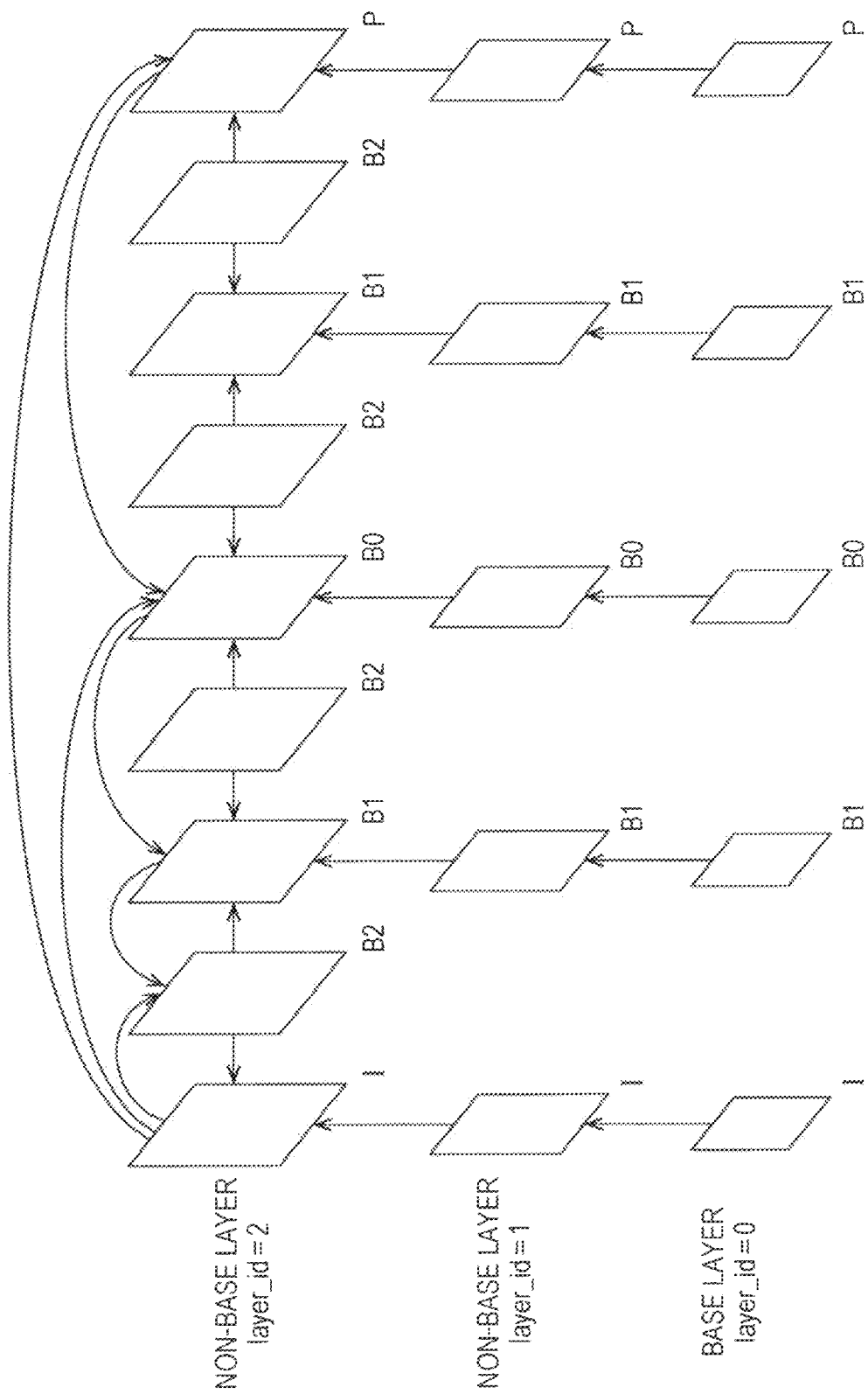
FIG. 78 is a diagram illustrating an example of a layer image coding method.

The above-described series of processes may be applied, to layer image coding and layer image decoding FIG. 78 illustrates an example of a layer image coding method.

The layer image coding (scalable coding) is to generate a plurality of layers of an image and to code each layer so that image data has a scalable function with respect to a predetermined parameter. The layer image decoding (scalable decoding) is decoding corresponding to the layer image coding.

As illustrated, in FIG. 78, in layering of an image, a single image is divided into a plurality of images (layers) with a predetermined parameter having a scalable function as a reference. In other words, layered images (layer images) include images of a plurality of layers in which values of the predetermined parameter are different from each other. A plurality of layers of the layer images include a base layer in which coding/decoding is performed by using only an image of its own layer and a non-base layer (also referred to as an enhancement layer) in which coding/decoding is performed by using images of other layers. The non-base layer may use a base layer image and may use other non-base layer images.

Generally, the non-base layer is formed by its own image and data (difference data) on a difference image with images of other layers. For example, in a case where a single image is generated as two layers including a base layer and a non-base layer (also referred to as an enhancement layer), an image with quality lower than that of an original image is obtained only by using data of the base layer, and thus data of the base layer and data of the non-base layer are combined with each other so as to obtain the original image (that is, high quality image).

An image is layered as mentioned above, and thus various quality images can be easily obtained depending on circumstances. For example, image compression information of only a base layer is transmitted to a terminal having low processing performance, such as a mobile phone, so that a moving image of which spatial and temporal resolution is low or image quality is low is reproduced, and image compression information of an enhancement layer as well as a base layer is transmitted to a terminal with high processing performance, such as a television set or a personal computer, so that, a moving image of which spatial and temporal resolution is high or image quality is high is reproduced. In this way, image compression information can be transmitted from a server depending on a terminal or network performance without performing a trans code process.

A layer image as in the example of FIG. 78 is coded/decoded, an image of each layer is coded/decoded, the above-described method of the first embodiment may be applied to coding/decoding of each layer. In this way, a decoded image can be converted into a desired image with a different dynamic range.

In addition, in coding/coding of each layer, the flag or the parameter used in the method of the first embodiment may be shared. More specifically, for example, the syntax element or the like of the knee_function_info SEI may be shared in coding/decoding of each layer. Of course, necessary information other than these elements may be shared in coding/decoding of each layer.

In this way, it is possible to minimize transmission of redundant information and thus to reduce transmitted information amount (bit rate) (that is, it is possible to minimize a reduction in coding efficiency).

[Scalable Parameters]

Figure 79:
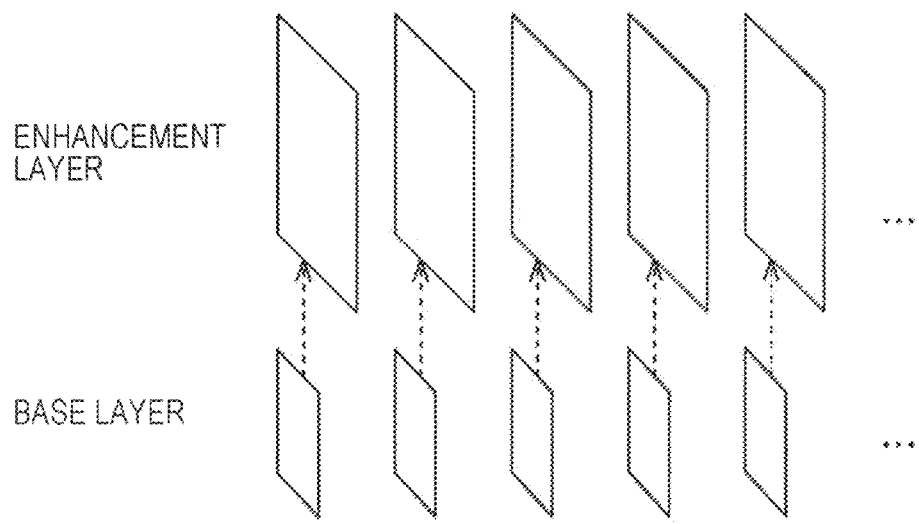
FIG. 79 is a diagram illustrating an example of spatially scalable coding.

In such layer image coding and layer image decoding (scalable coding and scalable decoding), a parameter having a scalable function is arbitrary. For example, a spatial resolution as illustrated in FIG. 79 may be a parameter (spatial scalability). In a case of the spatial scalability, a resolution of an image is different for each layer. In other words, in this case, as illustrated in FIG. 79, each picture is generated as two layers including a base layer of which a spatial resolution is lower than that of an original image, and an enhancement layer which allows an original spatial resolution to be obtained through combination with the base layer. Of course, the number of layers is an example, and any number of layers may be generated.

Figure 80:
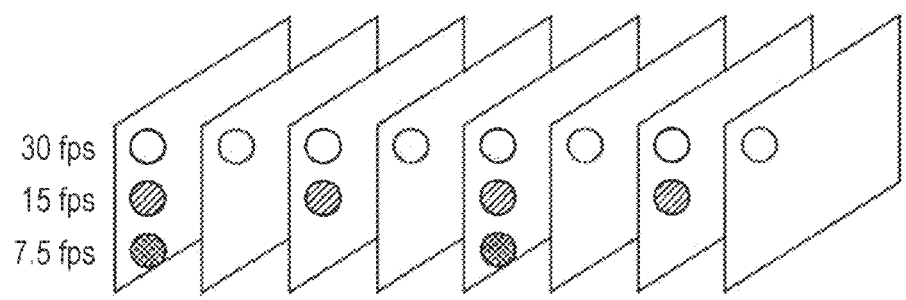
FIG. 80 is a diagram illustrating an example of a temporally sealable coding.

In addition, as a parameter which gives such scalability, for example, a temporal resolution may be employed (temporal scalability) as illustrated in FIG. 80. In a case of the temporal scalability, a frame rate is different for each layer. In other words, in this case, as illustrated in FIG. 80, each picture is generated as two layers including a base layer of which a frame rate is lower than that of an original moving image, and an enhancement layer which allows an original frame rate to be obtained through combination with the base layer. Of course, the number of layers is an example, and any number of layers may be generated.

Figure 81:
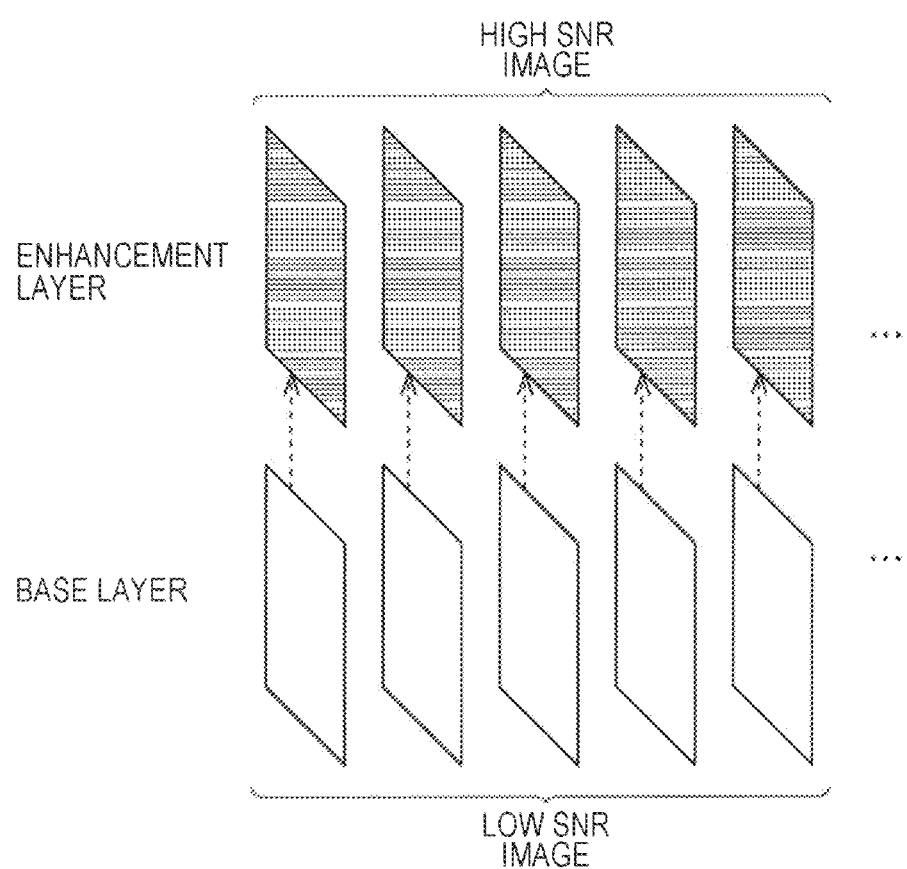
FIG. 81 is a diagram illustrating an example of scalable coding of an S/N ratio.

Further, as a parameter which gives such scalability, for example, a signal to noise ratio (SNR) may be employed (SNR scalability). In a case of the SNR scalability, an SNR is different for each layer. In other words, in this case, as illustrated in FIG. 81, each picture is generated as two layers including a base layer of which an SNR is lower than that of an original image, and an enhancement layer which allows an original SNR to be obtained through combination with the base layer. Of course, the number of layers is an example, and any number of layers may be generated.

Parameters which give scalability may use parameters other than the above-described examples. For example, as a parameter which gives scalability, a bit depth may be used (bit-depth scalability). In a case of the bit-depth scalability, a bit depth is different for each layer. In this case, for example, a base layer is formed by an 8-bit image, and an enhancement layer is added thereto so that a 10-bit image can be obtained.

In addition, as a parameter which gives scalability, a chroma format may be used (chroma scalability). In a case of the chroma, scalability, a chroma format is different for each layer. In this case, for example, a base layer is formed by a component image with a 4:2:0 format, and an enhancement layer is added thereto so that a component image with a 4:2:2 format can be obtained.

Further, as a parameter which gives scalability, a dynamic range of luminance may be used (DR scalability). In a case of the DR scalability, a dynamic range of luminance is different for each layer. In this case, for example, a base layer is formed by an SDR image, and an enhancement layer is added thereto so that an HDR image can be obtained.

In a case of applying the above-described series of processes to the dynamic range scalability, for example, information regarding knee decompression from an SDR image to an HDR image is set in a coded stream of a base layer image as DR conversion information. In addition, information regarding knee compression of a dynamic range of luminance of a HDR image is set in a coded stream of an enhancement layer image as DR conversion information.

In addition, a decoding device, which can decode only a coded stream of a base layer image and includes an HDR display, converts an SDR image which is a decoded image into an HDR image on the basis of the DR conversion information, and sets the HDR image as a display image. On the other hand, a decoding device, which can also decode a coded stream of an enhancement layer image and includes an HDR display which can display an HDR image with a low dynamic range, knee-compresses a dynamic range of luminance of an HDR image which is a decoded image on the basis of the DR conversion information, and sets a result thereof as a display image.

Further, information on decompression of a dynamic range of luminance of an HDR image may be set in a coded stream of an enhancement layer image as DR conversion information. In this case, a decoding device, which can also decode a coded stream of an enhancement layer image and includes an HDR display which can display an HDR image with a high dynamic range, knee-decompresses a dynamic range of luminance of an HDR image which is a decoded image on the basis of the DR conversion information, and sets a result thereof as a display image.

As mentioned above, the DR conversion information is set in a coded stream of a base layer image or an enhancement layer image, and thus it is possible to display an image which is more suitable for display performance.

[Layer Image Coding Device]

Figure 82:
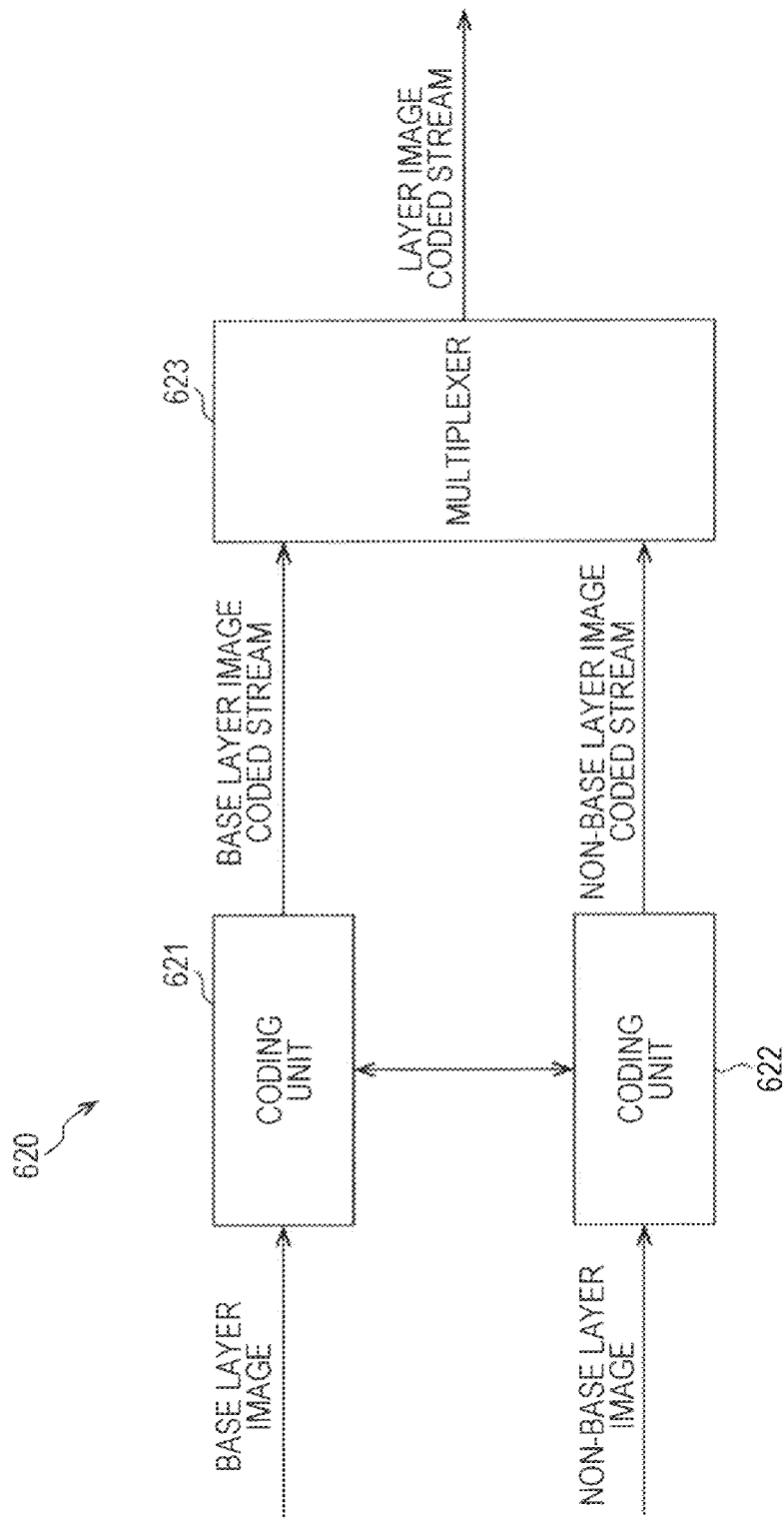
FIG. 82 is a diagram illustrating a configuration example of a layer image coding device to which the present disclosure is applied.

FIG. 82 is a diagram illustrating a layer image coding device which performs the above-described layer image coding. As illustrated in FIG. 82, the layer image coding device 620 includes a coding unit 621, a coding unit 622, and a multiplexer 623.

The coding unit 621 codes a base layer image so as to generate a base layer image coded stream. The coding unit 622 codes a non-base layer image so as to generate a non-base layer image coded stream. The multiplexer 623 multiplexes the base layer image coded stream generated in the coding unit 621 and the non-base layer image coded stream generated in the coding unit 622, so as to generate a layer image coded stream.

The coding device 10 (FIG. 6) is applicable to the coding unit 621 and the coding unit 622 of the layer image coding device 620. In other words, in coding of each layer, an image can be coded so that a decoded, image can be converted into a desired image with a different dynamic range during decoding. In addition, the coding unit 621 and the coding unit 622 can perform control or the like of an intra-prediction filter process (that is, a flag or a parameter can be shared) by using the mutually same flags or parameters (for example, a syntax element or the like regarding a process of images), and thus it is possible to minimize a reduction in coding efficiency.

[Layer Image Decoding Device]

Figure 83:
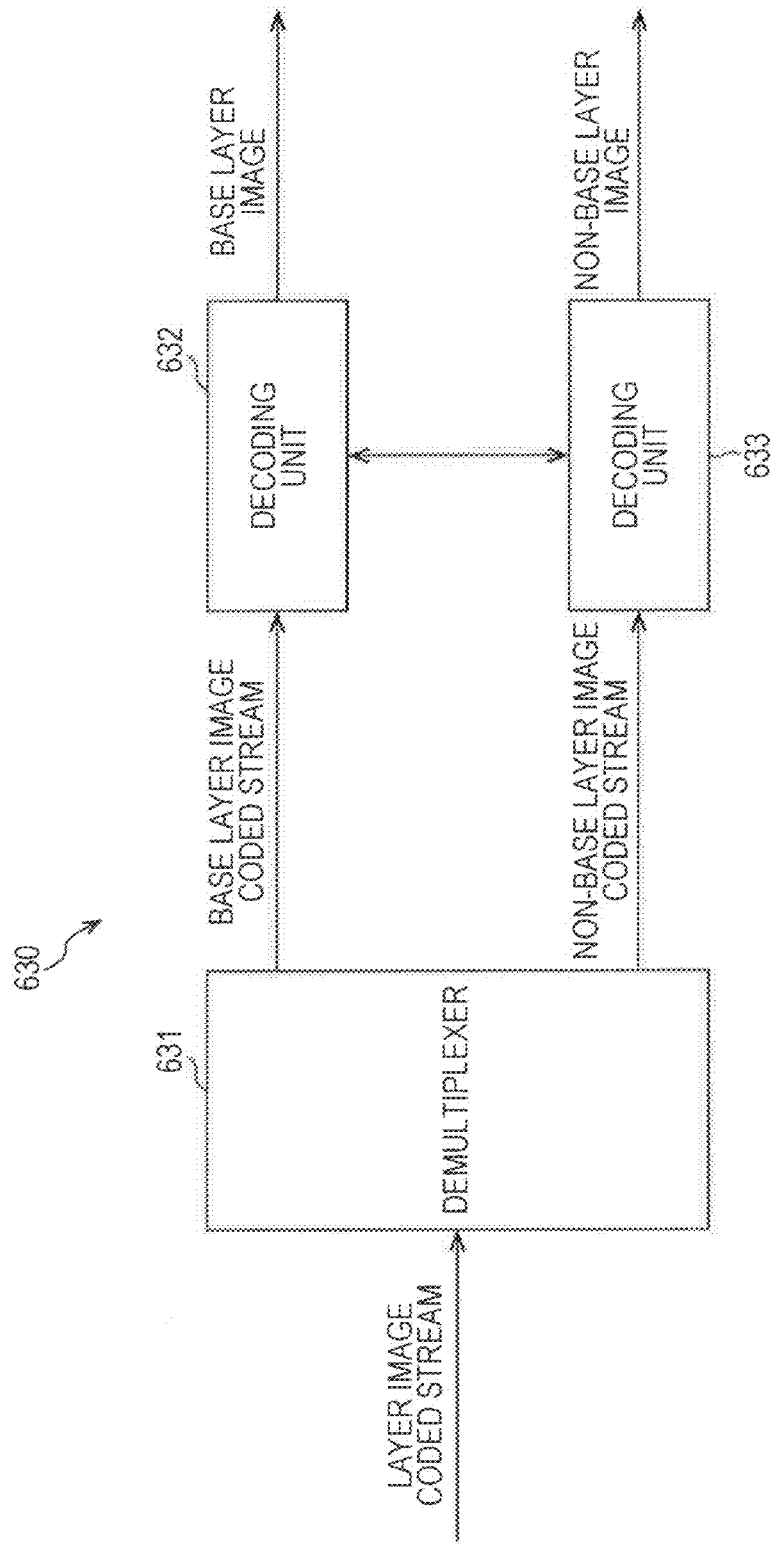
FIG. 83 is a diagram illustrating a configuration example of a layer image decoding device to which the present disclosure is applied.

FIG. 83 is a diagram illustrating a layer image decoding device which performs the above-described layer image decoding. As illustrated in FIG. 83, the layer image decoding device 630 includes a demultiplexer 631, a decoding unit 632, and a decoding unit 633.

The demultiplexer 631 demultiplexes the layer image coded stream Into which the base layer image coded stream and the non-base layer image coded stream are multiplexed, so as to extract the base layer image coded stream and the non-base layer image coded stream. The decoding unit 632 decodes the base layer image coded stream extracted by the demultiplexer 631 so as to obtain a base layer image. The decoding unit 633 decodes the non-base layer image coded stream extracted by the demultiplexer 631, so as to obtain a non-base layer image.

The decoding device 50 (FIG. 12) is applicable to the decoding unit 632 and the coding unit 633 of the layer image decoding device 630. In other words, in decoding of each layer, a decoded image can be converted into a desired image with a different dynamic range. In addition, the decoding unit 612 and the decoding unit 613 can perform coding (that is, a flag or a parameter can be shared) by using the mutually same flags or parameters (for example, a syntax element or the like regarding a process of images), and thus it is possible to minimize a reduction in coding efficiency.

Eighth Embodiment (Configuration Example Of Television Apparatus)

Figure 84:
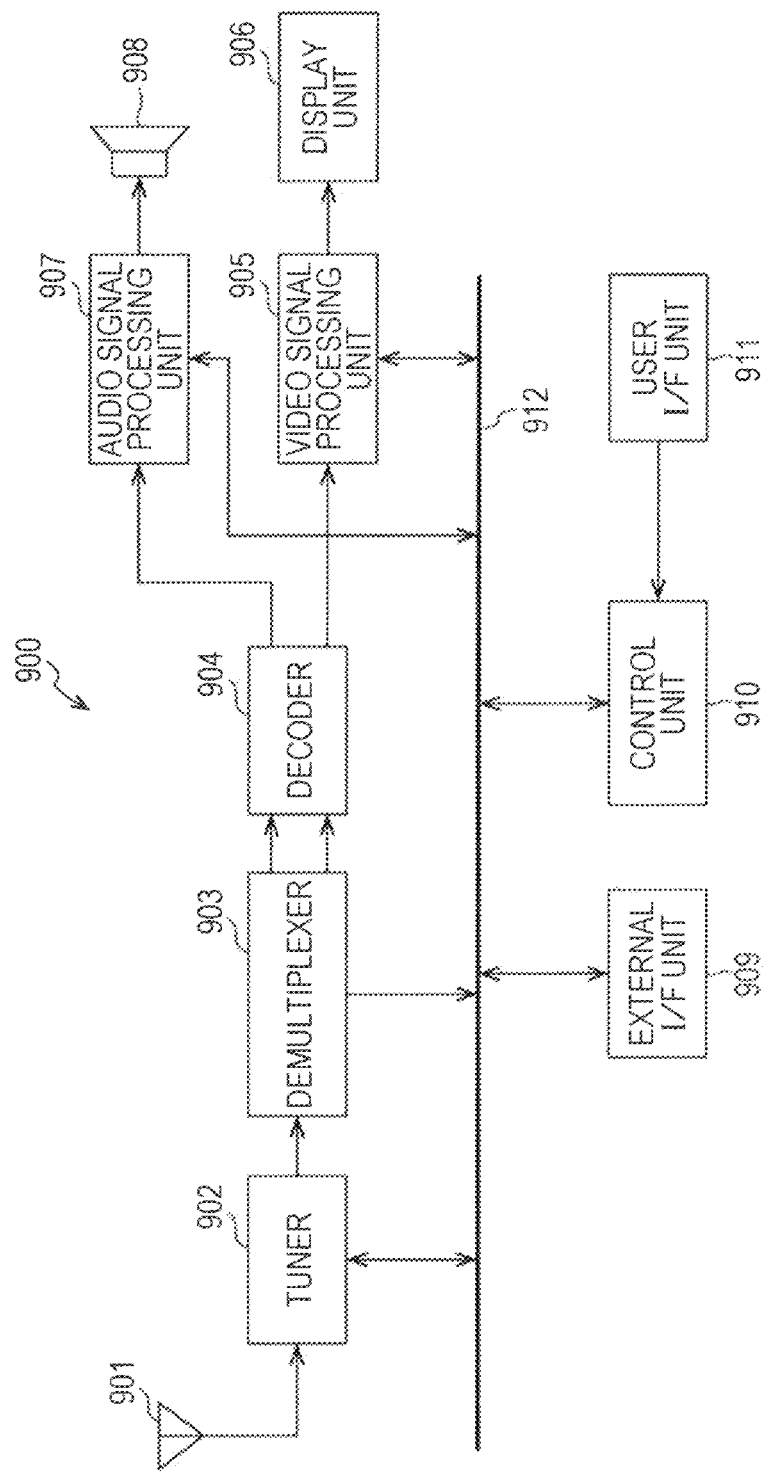
FIG. 84 is a block diagram illustrating a schematic configuration example of a television apparatus to which the present disclosure is applied.

FIG. 84 exemplifies a television apparatus to which the present technology is applied. The television apparatus 900 includes an antenna 901, a tuner 902, a demultiplexer 903, a decoder 904, a video signal processing unit 905, a display unit 906, an audio signal processing unit 907, a speaker 908, and an external interface unit 909. In addition, the television apparatus 900 includes a control unit 910, a user interface 911, and the like.

The tuner 902 selects a desired channel from a broadcast signal which is received via the antenna 901, demodulates the selected channel, and outputs a coded, bit stream which is obtained through demodulation, to the demultiplexer 903.

The demultiplexer 903 extracts a video or an audio packet of a program which is a viewing target from the coded bit stream, and outputs the data on the extracted packet to the decoder 904. In addition, the demultiplexer 903 supplies a packet of data such as electronic program guide (EPG) to the control unit 910. Further, the demultiplexer or the like may perform descrambling when the coded stream is scrambled.

The decoder 904 decodes the packet, and outputs video data and audio data generated through the decoding to the video signal processing unit 905 and the audio signal processing unit 907, respectively.

The video signal processing unit 905 performs noise removal or a video process or the like in accordance; with user's settings on the video data. The video signal processing unit 905 generates video data of a program which is displayed on the display unit 906, or image data or the like through a process based on an application which is supplied via a network. In addition, the video signal processing unit 905 generates video data for displaying a menu screen such as selection of items, and superimposes the video data on the video data of a program. The video signal processing unit 905 generates a driving signal on the basis of the video data generated in this way, so as to generate the display unit 906.

The display unit 906 drives a display device (for example, a liquid crystal display element) on the basis of the driving signal from the video signal processing unit 905 so as to display a video of a program or the like.

The audio signal processing unit 907 performs a process such as noise removal on the audio data, and performs D/A conversion or amplification on the processed audio data which is then supplied to the speaker 908, thereby outputting sounds.

The external interface unit 909 is an interface for connection to an external apparatus or the network, and transmits and receives data such as video data or audio data.

The control unit 901 is connected to the user interface unit 911. The user interface unit 911 is constituted by an operation switch, a remote control signal reception portion, and the like, and supplies an operation signal corresponding to a user's operation to the control unit 910.

The control unit 910 is formed by using a central processing unit (CPU), memories, and the like. The memories store a program executed by the CPU, a variety of data which is necessary in the CPU performing a process, EPS data, data acquired via the network, and the like. The program stored in the memories is read and executed by the CPU, for example, when the television apparatus 900 is started. The CPU executes the program, and thus controls each unit so that the television apparatus 900 performs an operation responding to a user's operation.

In addition, the television apparatus 900 is provided with a bus 912 which connects the tuner 902, the demultiplexer 903, the video signal processing unit 905, the audio signal processing unit 907, the external interface unit 909, and the control unit 910, to each other.

In the television apparatus having the configuration, a function of the decoding device (decoding method) of the present application is provided in the decoder 904. For this reason, it is possible to convert a decoded image into a desired image with a different dynamic range.

Ninth Embodiment (Configuration Example of Mobile Phone)

Figure 85:
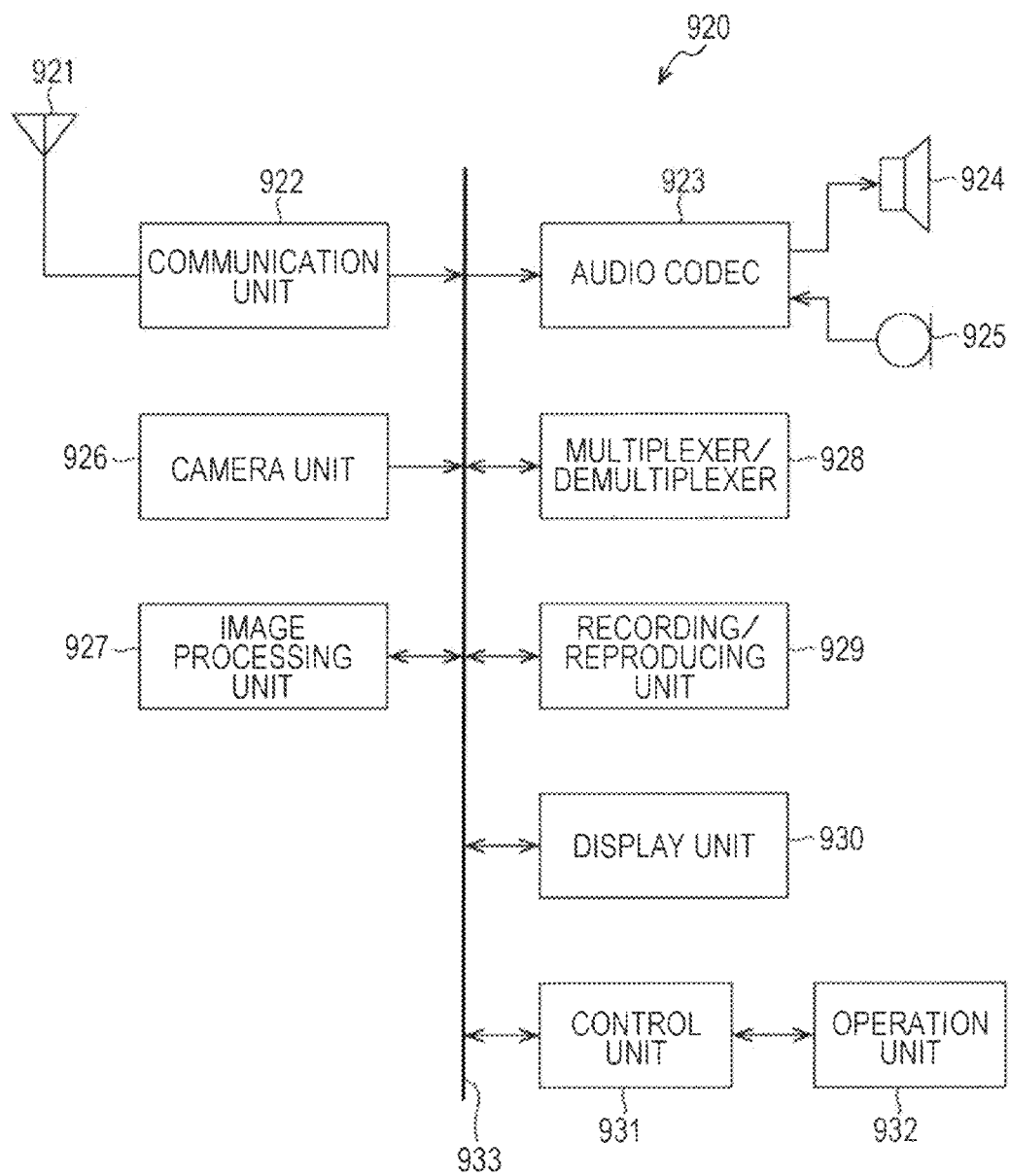
FIG. 85 is a block diagram illustrating a schematic configuration example of a mobile phone to which the present disclosure is applied.

FIG. 85 exemplifies a schematic configuration of a mobile phone to which the present disclosure is applied. The mobile phone 920 includes a communication unit 922, an audio codec 923, a camera unit 926, an image processing unit 927, a multiplexer/demultiplexer 928, a recording/reproducing unit 929, a display unit 930, and a control unit 931. Theses constituent elements are connected to each other via a bus 933.

In addition, the communication unit 922 is connected to an antenna 921, and the audio codec 923 is connected to a speaker 924 and a microphone 925. Further, the control unit 931 is connected to an operation unit 932.

The mobile phone 920 performs various operations such as transmission and reception of audio signals, transmission and reception of electronic mails or image data, capturing of an image, and recording of data in various operation modes such as a speech mode and a data communication mode.

In the speech mode, an audio signal generated by the microphone 925 undergoes conversion into audio data or data compression in the audio codec 923, and is then supplied to the communication unit 922. The communication unit 922 performs a modulation process or a frequency conversion process on the audio data so as to generate a transmission signal. Further, the communication unit 922 transmits the transmission signal to the antenna 921 so as to transmit the transmission signal to a base station (not illustrated). Furthermore, the communication unit 922 performs amplification, a frequency conversion process, and a demodulation process on a signal which is received via the antenna 921, and supplies the generated audio data to the audio codec 923. The audio codec 923 performs data decompression on the audio data or converts the audio data into an analog audio signal, and outputs the generated audio signal to the speaker 924.

Further, in the data communication mode, in a case of transmitting a mail, the control unit 931 receives text, data which is input by using the operation unit 932, and displays the input text, on the display unit 930. Moreover, the control unit 931 generates mail data in response to an instruction made by the user by using the operation unit 932, and supplies the generated mail data to the communication unit 922. The communication unit 922 performs a modulation process or a frequency conversion process on the mail data, and transmits the generated transmission signal from the antenna 921. Further, the communication unit 922 performs amplification, a frequency conversion process, and a demodulation process on a signal which is received, via the antenna 921, so as to recover mail data. The mail data is supplied to the display unit 930, and thus content of the mail is displayed.

In addition, the mobile phone 920 may store the received mail data on a recording medium by using the recording/reproducing unit 929. The recording medium is any rewritable recording medium. For example, the recording medium is a semiconductor memory such as a RAM or a built-in flash memory, or a removable medium such as a hard disk, a magnetic disk, a magneto-optical disc, an optical disc, a universal, serial bus (USB) memory, or a memory card.

In a case where image data is transmitted in the data communication mode, image data generated by the camera unit 926 is supplied to the image processing unit 927. The image processing unit 927 performs a coding process on the image data so as to generate coded data.

Further, the multiplexer/demultiplexer 928 multiplexes the image stream which has been generated by the image processing unit 927 and the audio data which is supplied from the audio codec 923, and supplies the multiplexed data to the communication unit 922. The communication unit 922 performs a modulation process or a frequency conversion process on the multiplexed data, and transmits an obtained transmission signal to the antenna 921. Furthermore, the communication unit 922 performs an amplification process, a frequency conversion process, and a demodulation process on a signal which is received via the antenna 921 so as to recover multiplexed data. The multiplexed data is supplied to the multiplexer/demultiplexer 928. The multiplexer/demultiplexer 928 demultiplexes the multiplexed data, and supplies coded data to the image processing unit 927 and audio data to the audio codec 923. The image processing unit 927 decodes the coded data so as to generate image data. The image data is supplied to the display unit 930 so as to allow the received image to be displayed. The audio codec 923 converts the audio data into an analog audio signal which is then supplied to the speaker 924 so as to output a received sound.

In the mobile phone apparatus having the configuration, functions of the coding device and the decoding device (the coding method and the decoding method) of the present application are provided in the image processing unit 927. For this reason, an image can be coded so that a decoded image can be converted into a desired image with a different dynamic range during decoding. In addition, it is possible to convert a decoded image into a desired image with a different dynamic range.

Tenth Embodiment (Configuration Example of Recording/Reproducing Apparatus)

Figure 86:
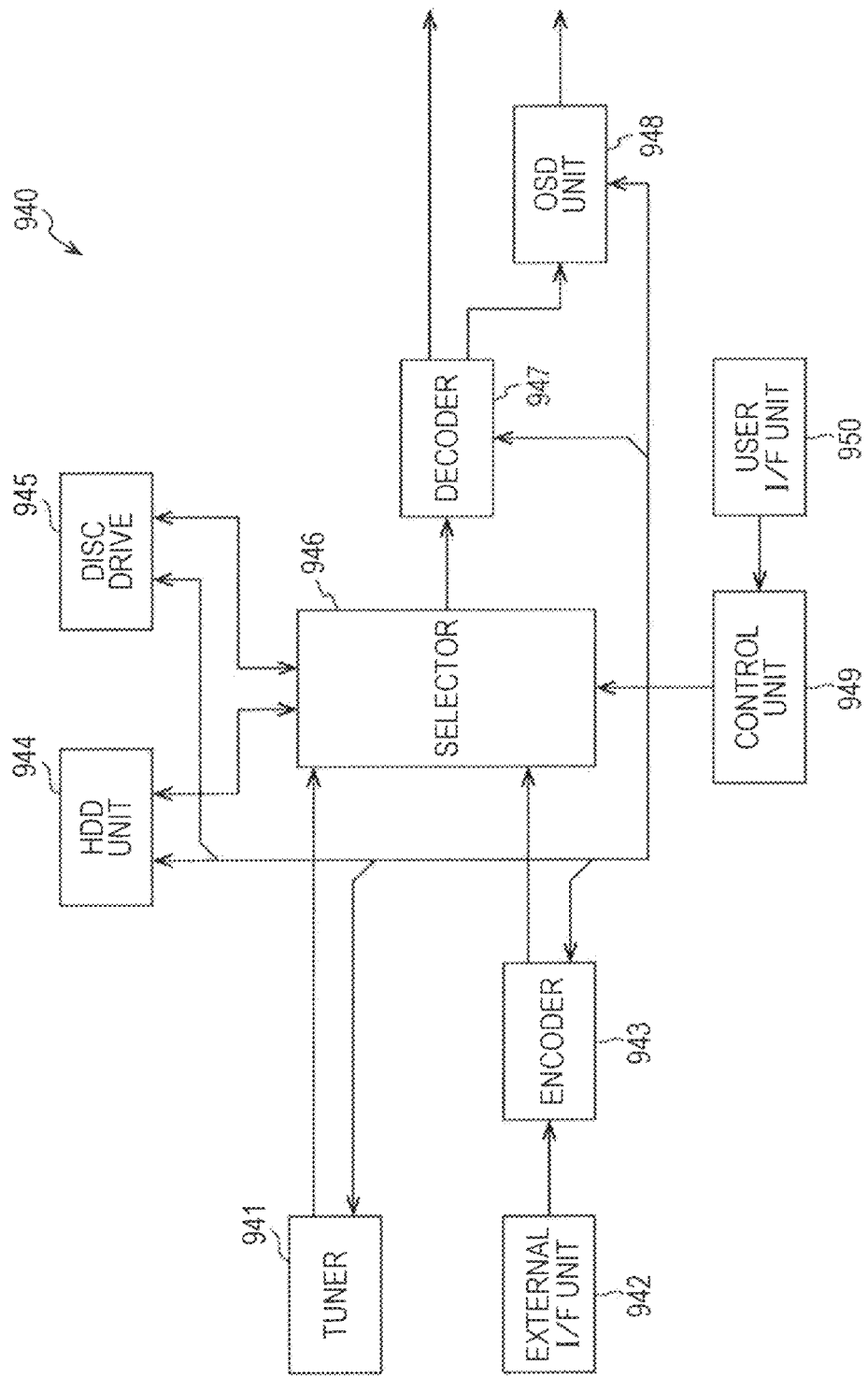
FIG. 86 is a block diagram, illustrating a schematic configuration example of a recording/reproducing apparatus to which the present disclosure is applied.

FIG. 86 exemplifies a schematic configuration of a recording/reproducing apparatus to which the present technology is applied. The recording/reproducing apparatus 940 records, for example, audio data and video data of a received broadcast program on a recording medium, and provides the recorded data to a user at a timing responding to an instruction from, the user. In addition, the recording/reproducing apparatus 940 may acquire, for example, audio data and image data from other apparatuses, and may record the data on the recording medium. Further, the recording/reproducing apparatus 940 codes and outputs the audio data or video data recorded on the recording medium so that image display or sound output can be performed in a monitor device.

The recording/reproducing apparatus 940 includes a tuner 941, an external interface unit 942, an encoder 943, a hard disk drive (HDD) unit 944, a disc drive 945, a selector 946, a decoder 947, an on-screen display (OSD) unit 948, a control unit 949, said a user interface unit 950.

The tuner 941 selects a desired channel from, a broadcast signal which is received via an antenna (not illustrated). In addition, the tuner 941 outputs a coded bit stream which is obtained by demodulating the received signal of the desired channel, to the selector 946.

The external interface unit 942 includes any one of an IEEE1394 interface, a network interface, a USB interface, a flash memory interface, or the like. The external interface unit 942 is an interface which is connected to an external apparatus, a network, a memory card, or the like, and receives data such as video data or audio data to be recorded.

The encoder 943 codes vide data or audio data in a predetermined method in a case where the video data and the audio data supplied from the external interface unit 942 are not coded, and outputs a coded bit stream to the selector 946.

The HDD unit 944 records content data such as a video and a sound, various programs, and other data in a built-in hard disk, and reads the data from the hard disk when the video and the sound are reproduced.

The disc drive 945 records and reproduces data on and from an optical disc which is installed therein. The optical disc may be, for example, a DVD disc (DVD-Video, DVD-RAM, DVD-R, DVD-RW, DVD+R, DVD+RW, or the like), a Blu-ray (registered trademark) disc, or the like.

When a video and a sound, are recorded, the selector 946 selects a coded bit stream which is input from the tuner 941 or the encoder 943, and outputs the selected coded bit stream to the HDD unit 944 or the disc drive 945. In addition, when, a video and a sound are reproduced, the selector 946 outputs a coded bit stream which is output from the HDD unit 944 or the disc drive 945, to the decoder 947.

The decoder 947 decodes the coded bit stream. In addition, the decoder 947 supplies video data generated through the decoding process, to the OSD unit 948. Further, the decoder 947 outputs audio data generated through the decoding process.

The OSD unit 948 generates video data for displaying a menu screen such as selection of items, and superimposes and outputs the video data on video data which is output, from the decoder 947.

The control unit 949 is connected to the user interface unit 950. The user interface unit 950 is constituted by an operation switch, a remote control signal reception portion, and the like, and supplies an operation signal corresponding to a user's operation to the control unit 949.

The control unit 949 is formed by using a central processing unit (CPU), memories, and the like. The memories store a program executed by the CPU, a variety of data which is necessary in the CPU performing a process, EPG data, data acquired via the network, and the like. The program stored in the memories is read and executed by the CPU at a predetermined timing, for example, when the recording/reproducing apparatus 940 is started. The CPU executes the program, and thus controls each unit so that the recording/reproducing apparatus 940 performs an operation responding to a user's operation.

In the recording/reproducing apparatus having the configuration, a function of the decoding device (decoding method) of the present application is provided in the decoder 947. For this reason, it is possible to convert a decoded image into a desired image with a different dynamic range.

Eleventh Embodiment (Configuration Example of Imaging Apparatus)

Figure 87:
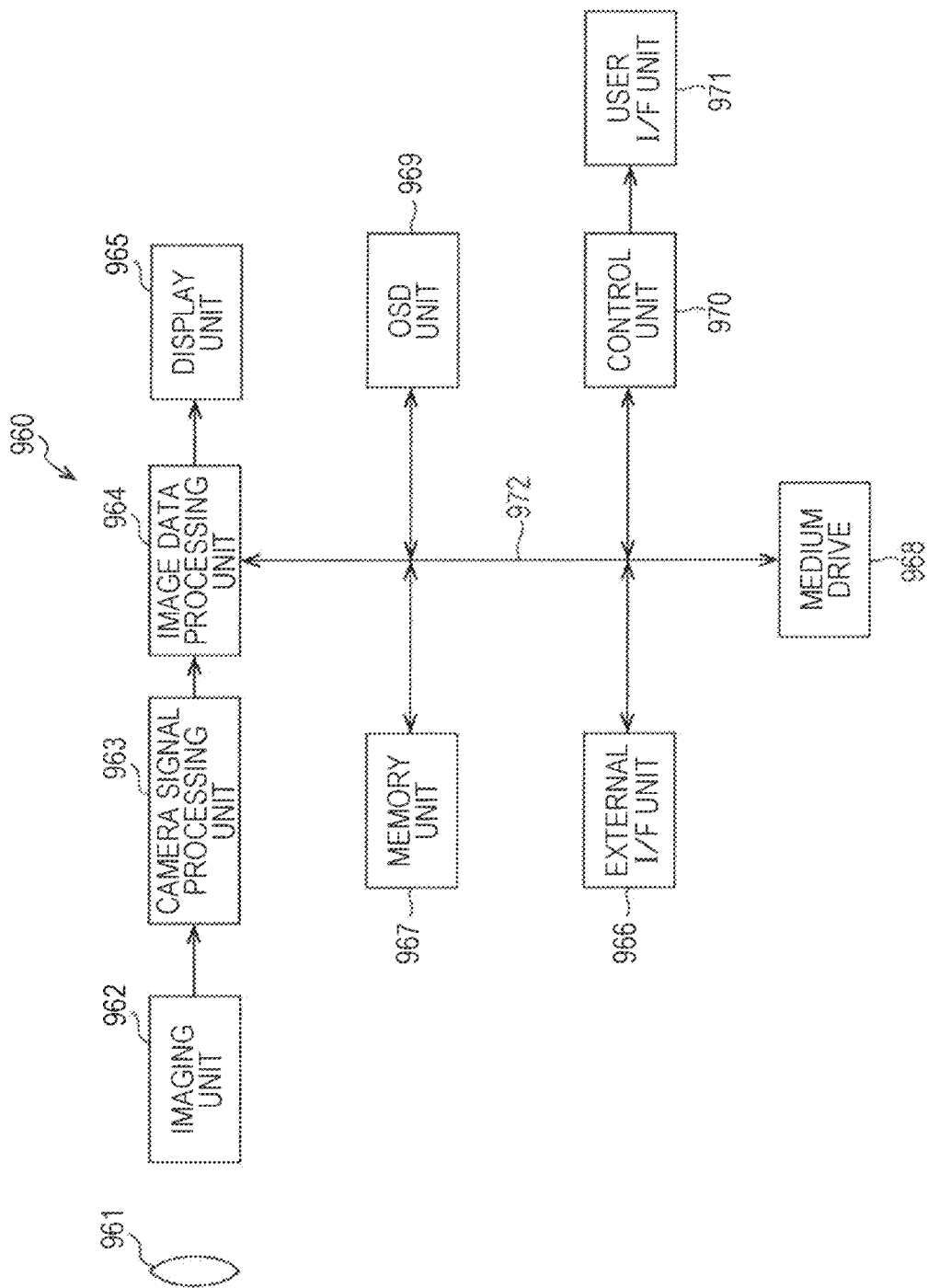
FIG. 87 is a block diagram illustrating a schematic configuration example of an imaging apparatus to which the present disclosure is applied.

FIG. 87 exemplifies a schematic configuration of an imaging apparatus to which the present technology is applied. The imaging apparatus 960 captures an image of a subject, and displays the image of the subject on a display unit or records the image on a recording medium as image data.

The imaging apparatus 960 includes an optical block 961, an imaging unit 962, a camera signal processing unit 963, an image data processing unit 964, a display unit 965, an external interface unit 966, a memory unit 967, a medium drive 968, an OSD unit 969, and a control unit 970. In addition, the control unit 970 is connected to a user interface 971. Further, the image data processing unit 964, the external interface unit 966, the memory unit 967, the medium drive 968, the OSD unit 969, the control unit 970, and the like are connected to each other via a bus 972.

The optical block 961 includes a focus lens, a diaphragm mechanism, and the like. The optical block 961 forms an optical image of a subject on an imaging surface of the imaging unit 962. The imaging unit 962 includes an image sensor such as a CCD or a CMOS, and generates an electrical signal corresponding to the optical image through photoelectric conversion, and supplies the electrical signal to the camera signal processing unit 963.

The camera signal processing unit 963 performs various camera signal processes such as knee correction, gamma correction, and color correction, on the image signal which is input from the imaging unit 962. The camera signal processing unit 963 supplies the image data having undergone the camera signal processes to the image data processing unit 964.

The image data processing unit 964 codes the image data which is supplied from the camera signal processing unit 963. The image data processing unit 964 supplies coded data generated through the coding process to the external interface unit 966 or the medium, drive 968. Further, the image data processing unit 964 decodes the coded data which is supplied from the external interface unit 966 or the medium drive 968. Furthermore, the image data processing unit 964 supplies image data generated through the decoding process to the display unit 965. Moreover, the image data processing unit 964 supplies image data which is supplied from the camera signal processing unit 963, to the display unit 965, or superimposes display data which is acquired from the OSD unit 969, on image data which is then output to the display unit 965.

The OSD unit 969 generates and outputs display data such as a menu screen formed by symbols, characters, or figures, or an icon, to the image data processing unit 964.

The external interface unit 966 is formed by, for example, a USB input and output terminal, and is connected to a printer when an image is printed. In addition, the external interface unit 966 is connected to a drive as necessary. A removable medium, such as a magnetic disk or an optical disc is installed in the drive as appropriate, and a computer program read from, the removable medium is installed therein as necessary. Further, the external interface unit 966 includes a network interface which is connected to a predetermined network such as a LAN or the Internet. The control unit 970 may read coded data from the medium drive 968, for example, in response to an instruction from the user interface 971, and may supply the coded data to other apparatuses which is connected thereto via the network, from the external interface unit 966. In addition, the control unit 970 may acquire coded data or image which is supplied from other apparatuses via the network, through the external interface unit 966, and may supply the data to the image data processing unit 964.

A recording medium driven by the medium drive 968 may be any readable and writable removable medium such as a magnetic disk, a magneto-optical disc, an optical disc, or a semiconductor memory. In addition, the recording medium may be any kind of removable medium, may be a tape device, may be a disk, and may be a memory card. Of course, a noncontact integrated circuit (IC) card or the like may be used.

Further, the medium drive and a recording medium may be integrally formed so as to be constituted by a non-portable storage unit such as a built-in hard, disk drive or a solid state drive (SSD).

The control unit 970 is formed by using a CPU. The memory unit 967 stores a program executed by the control unit 970, a variety of data which is necessary in the control unit 970 performing a process, and the like. The program stored in the memory unit 967 is read and executed by the control unit 970, a predetermined timing, for example, when the imaging apparatus 960 is started. The control unit 970 executes the program, and thus controls each unit so that the imaging apparatus 960 performs an operation responding to a user's operation.

In the imaging apparatus having the configuration, functions of the coding device and the decoding device (the coding method and the decoding method) of the present application are provided in the image data processing unit 964. For this reason, an image can be coded so that a decoded image can be converted into a desired image with a different dynamic range during decoding. In addition, it is possible to convert a decoded image into a desired image with a different dynamic range.

(Application Examples of Scalable Coding)
[First System]

Next, description will be made of a specific example of using scalable coded (layer coded) data which is seal ably coded. The scalable coding is used, for example, to select data to be transmitted as in an example illustrated in FIG. 88.

Figure 88:
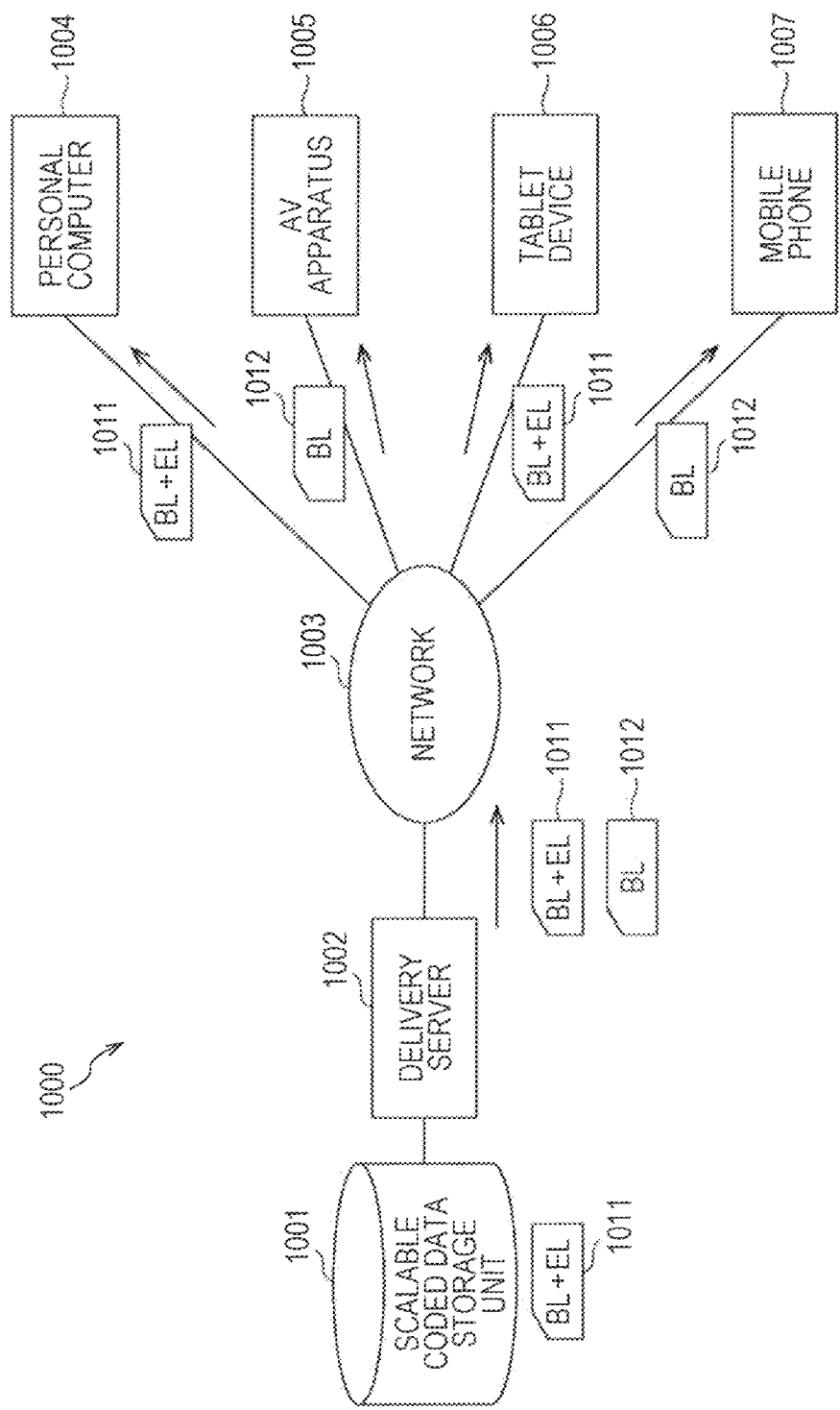
FIG. 88 is a block diagram illustrating an example of using scalable coding.

In a data transmission system 1000 illustrated in FIG. 88, a delivery server 1002 reads the scalable coded data stored in the scalable coded data storage unit 1001, and delivers the scalable coded data to terminal apparatuses such as a personal computer 1004, an AV apparatus 1005, a tablet device 1006, and a mobile phone 1007 via a network 1003.

At this time, the delivery server 1002 selects and transmits coded data with appropriate quality on the basis of performances of the terminal apparatuses, communication circumstances, or the like. If the delivery server 1002 unnecessarily transmits high quality data, it is unable to be said that a high quality image is obtained in the terminal apparatus, and there is a concern that delay or overflow may occur. In addition, there is a concern that high quality data may unnecessarily occupy a communication band, and may unnecessarily increase a load on the terminal apparatus. Conversely, if the delivery server 1002 unnecessarily transmits low quality data, there is a concern that an image with sufficient image quality may not be obtained in the terminal apparatus. For this reason, the delivery server 1002 reads and transmits coded data with quality (layer) which is suitable for the performances of the terminal apparatuses or the communication circumstances from the scalable coded data storage unit 1001.

Here, it is assumed that, the scalable coded data storage unit 1001 stores scalable coded data (BL+EL) 1011 which is scalably coded. The scalable coded data (BL+EL) 1011 is coded data including both a base layer and an enhancement layer, and is data which allows both a base layer image and an enhancement layer image to be obtained through decoding.

The delivery server 1002 selects an appropriate layer on the basis of a performance of a terminal apparatus to which data is transmitted or communication circumstances, and reads data of the layer. For example, the delivery server 1002 reads the scalable coded data (BL+EL) 1011 which has high quality from the scalable coded data storage unit 1001, and transmits the data as it is, in relation to the personal computer 1004 or the tablet device 1006 having a high processing performance. In contrast, for example, in relation to the AV apparatus 1005 or the mobile phone 1007 having a low processing performance, the delivery server 1002 extracts base layer data from the scalable coded, data (BL+BL) 1011, and transmits the data as scalable coded data (BL) 1012 which is the same content data as the scalable coded data (BL+EL) 1011 in terms of content but has lower quality than the scalable coded, data (BL+EL) 1011.

As mentioned above, since a data amount can be easily adjusted by using the scalable coded data, it is possible to minimize the occurrence of delay or overflow or to minimize an unnecessary increase in a load on a terminal apparatus or a communication medium. In addition, redundancy between layers is reduced in the scalable coded data (BL+EL) 1011, and thus a data amount thereof can be further reduced than in a case where coded data of each layer is used as separate data. Therefore, a storage region of the scalable coded data storage unit 1001 can be used more efficiently.

In addition, various apparatuses such as the personal computer 1004 to the mobile phone 1007 can be employed as terminal apparatuses and thus performances of hardware of the terminal apparatuses are different depending on the apparatuses. Further, there are various applications which are executed by the terminal apparatuses, and thus there are also various performances of software thereof. Furthermore, all communication line networks including a wired network, a wireless network, or both networks such as, for example, the Internet or a local area network (LAN) can be employed as the network 1003 which is a communication medium, and there are various data transmission performances. Moreover, there is a concern that a data transmission performance may vary depending on other communication circumstances or the like.

Therefore, before starting data transmission, the delivery server 1002 may perform communication with a terminal apparatus which is a transmission destination of the data, so as to obtain information regarding performances of the terminal apparatus such as a hardware performance of the terminal apparatus and a performance of an application (software) executed by the terminal apparatus, and information regarding communication circumstances such as an available bandwidth of the network 1003. In addition, the delivery server 1002 may select an appropriate layer on the basis of the information obtained here, Further, the extraction of a layer may be performed by the terminal apparatus. For example, the personal computer 1004 may decode the transmitted scalable coded data (BL+EL) 1011 so as to display a base layer image and display an enhancement layer image. Furthermore, for example, the personal computer 1004 may extract, the base layer scalable coded data (BL) 1012 from the transmitted scalable coded data (BL+EL) 1011 so as to store the data, to transmit the data to other devices, or to decode the data for display of a base layer image.

Of course, the number of scalable coded data storage units 1001, the number of delivery servers 1002, the number of networks 1003, and the number of terminal apparatuses are all arbitrary. In addition, in the above description, a description has been made of an example in which the delivery server 1002 transmits data to the terminal apparatus, but a usage example is not limited thereto. The data transmission system 1000 is applicable to any system as long as the system selects and transmits an appropriate layer on the basis of a performance of a terminal apparatus, communication circumstances, or the like when coded, data which is scalably coded, is transmitted to the terminal apparatus.

[Second System]

Figure 89:
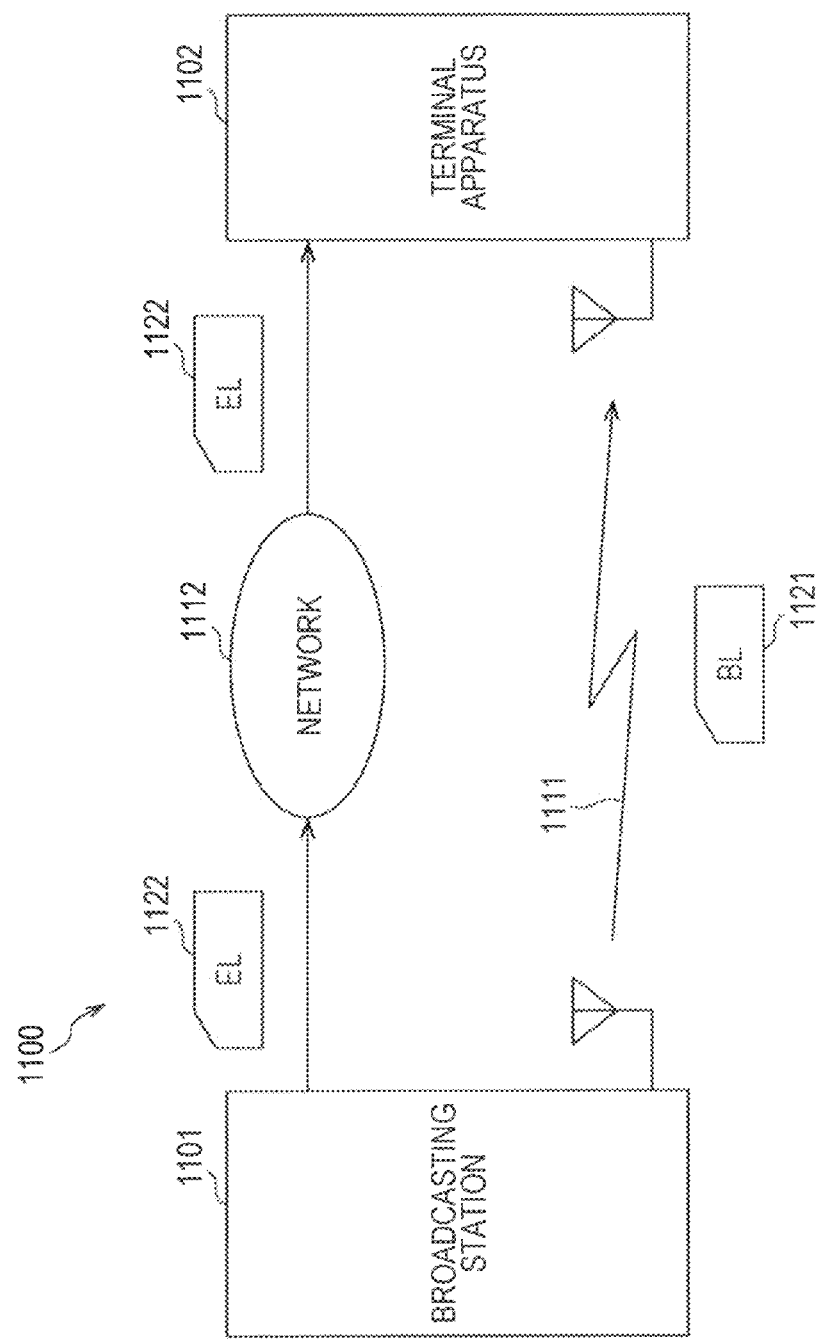
FIG. 89 is a block diagram illustrating another example of using scalable coding.

The scalable coding is used, for example, for transmission using a plurality of communication media as in an example illustrated in FIG. 89.

In a data transmission system 1100 illustrated in FIG. 89, a broadcasting station 1101 transmits base layer scalable coded data (BL) 1121 by using a terrestrial broadcast 1111. In addition, the broadcasting station 1101 transmits (for example, packetizes and transmits) enhancement layer scalable coded data (EL) 1122 via any network 1112 formed by a wired network, a wireless network, or both networks.

A terminal apparatus 1102 has a reception function of the terrestrial broadcast 1111 which is broadcasted by the broadcasting station 1101, and receives the base layer scalable coded data (BL) 1121 which is transmitted via the terrestrial broadcast 1111. In addition, the terminal apparatus 1102 further has a communication function of performing communication using the network 1112, and receives the enhancement layer scalable coded data (EL) 1122 which is transmitted via the network 1112.

The terminal apparatus 1102 may decode the base layer scalable coded data (BL) 1121 which is acquired via the terrestrial broadcast 1111, for example, in response to an instruction from a user, so as to obtain a base layer image, to store the image, and to transmit the image to other apparatuses.

In addition, for example, in response to an instruction from a user, the terminal apparatus 1102 may combine the base layer scalable coded, data (BL) 1121 which is acquired via the terrestrial broadcast 1111 with the non-base layer scalable coded data (EL) 1122 which is acquired via the network 1112 so as to obtain scalable coded data (BL+EL), and may decode the data so as to obtain a base layer image, to store the image, and to transmit the image to other apparatuses.

As mentioned, above, the scalable coded data may be transmitted via a communication medium which is different for each layer, for example. In this case, a load can be distributed, and thus it is possible to minimize the occurrence of delay or overflow.

In addition, a communication medium used, for transmission may be selected for each layer depending on circumstances. For example, the base layer scalable coded data (BL) 1121 having a relatively large amount of data may be transmitted, via a communication media having a wide bandwidth, and the enhancement layer scalable coded data (EL) 1122 having a relatively small amount of data may be transmitted via a communication medium having a narrow bandwidth. In addition, for example, a communication medium for transmitting the enhancement layer scalable coded data (EL) 1122 may be changed between the network 1112 and the terrestrial broadcast 1111 depending on an available bandwidth of the network 1112. Of course, this is also the same for data of any layer.

The control is performed as mentioned above, and thus it is possible to further minimize an increase in a load in data transmission.

Of course, the number of layers is arbitrary, and the number of communication media used for transmission is also arbitrary. Further, the number of terminal apparatuses 1102 serving as a data transmission destination is also arbitrary. Furthermore, in the above description, the description has been made of broadcasting from the broadcasting station 1101 as an example, but a usage example is not limited thereto. The data transmission system 1100 is applicable to any system as long as the system splits coded data which is scalably coded into a plurality of data, items in the unit of layers and transmits the data items via a plurality of lines.

[Third System]

Figure 90:
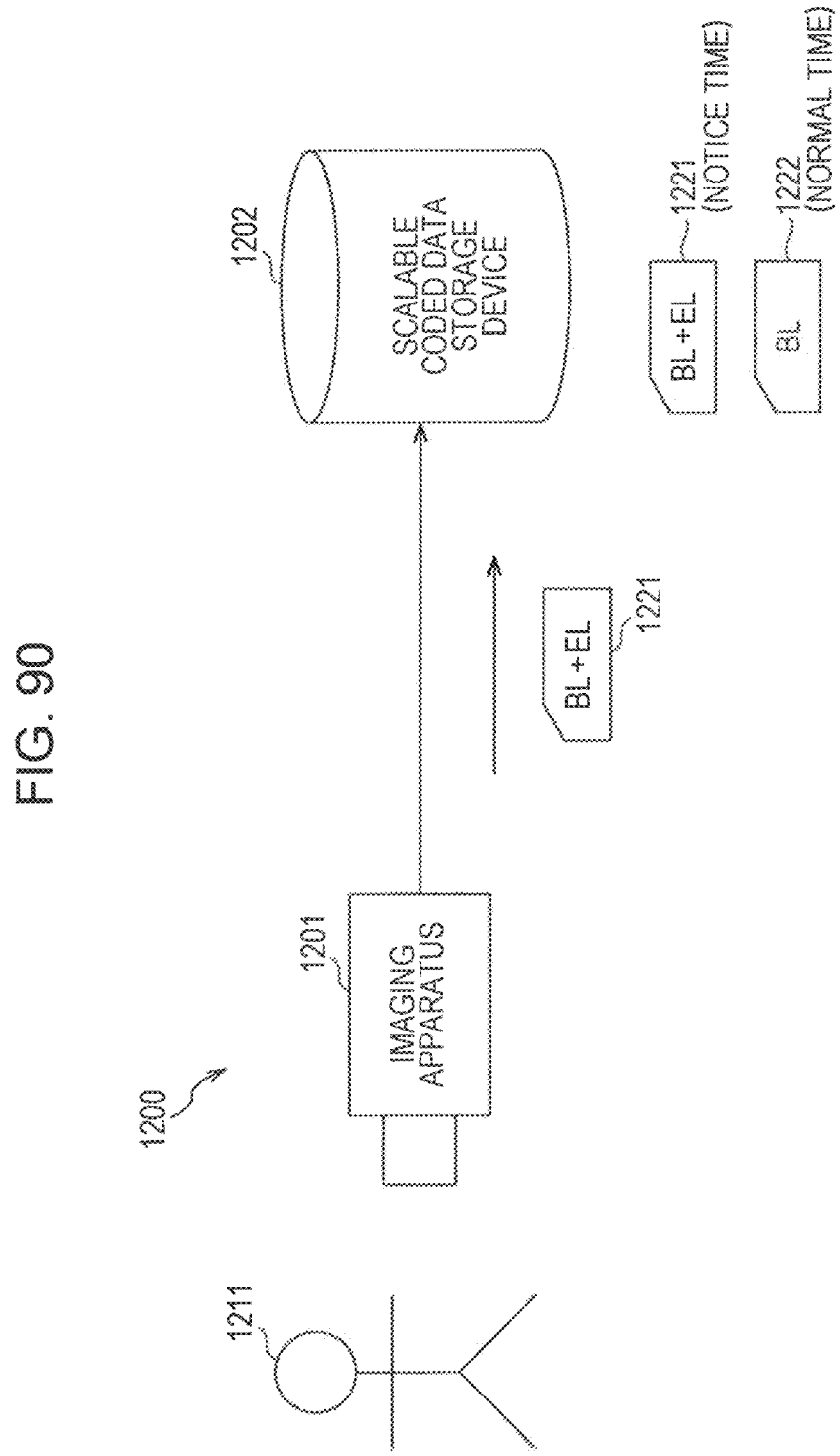
FIG. 90 is a block diagram illustrating still another example of using scalable coding.

The scalable coding is used, for example, to store coded data as in an example, illustrated in FIG. 90.

In an imaging system 1200 illustrated in FIG. 90, an imaging apparatus 1201 scalably codes image data which is obtained by imaging a subject 1211, and supplies resultant data to a scalable coded data storage device 1202 as scalable coded data (BL+EL) 1221.

The scalable coded data storage device 1202 stores the scalable coded data (BL+EL) 1221 which is supplied from, the imaging apparatus 1201, with quality based on circumstances. For example, in a case of the normal time, the scalable coded data storage device 1202 extracts base layer data from the scalable coded data (BL+EL) 1221, and stores the data as base layer scalable coded, data (RL) 1222 having a small amount of data with low quality. In contrast, for example, in a case of the notice time, the scalable coded data storage device 1202 stores the scalable coded data (BL+EL) 1221 having a large amount of data with high quality as it is.

Accordingly, since the scalable coded data storage device 1202 can preserve a high quality image as necessary only, it is possible to minimize an increase in a data amount while minimizing a reduction in the value of an image due to image quality deterioration, and thus to improve use efficiency of a storage region.

For example, the imaging apparatus 1201 is assumed to be a monitoring camera. In a case (a case of the normal time) where a monitoring target (for example, an trespasser) is not reflected in a captured image, there is a high probability that content of the captured image may not be important, and thus a reduction in a data amount is prioritized, and the image data (scalable coded data) is stored with low quality. In contrast, in a case (a case of the notice time) where a monitoring target is reflected in a captured image as the subject 1211, there is a high probability that content of the captured image may be important, and thus image quality is prioritized, and the image data (scalable coded data) is stored with high quality.

In addition, the normal time arid the notice time may be determined, for example, by the scalable coded data storage device 1202 analyzing an image. Further, the normal time and the notice time may be determined, for example, by the imaging apparatus 1201, and a determination result may be transmitted to the scalable coded data storage device 1202.

In addition, a determination criterion of the normal time and the notice time is arbitrary, and content of a captured image which is used as a determination criterion is arbitrary. Of course, conditions other than the content of a captured image may be used as a determination criterion. For example, the normal time and the notice time may be changed on the basis of the magnitude, a waveform, or the like of a recorded sound, and may be changed, for example, for each predetermined time interval, or by an external instruction such as an instruction from a user.

In addition, in the above description, an example of changing two states including the normal time, and the notice time has been described, but the number of states is arbitrary, and, for example, three or more states such as the normal time, the slight notice time, the notice time, the great notice time, may be changed. Here, an upper limit number of changed states depends on the number of layers of scalable coded data.

In addition, the imaging apparatus 1201 may determine the number of scalable coded layers on the basis of a state. For example, in a case of the normal time, the imaging apparatus 1201 may generate the base layer scalable coded, data (BL) 1222 having a small amount of data with low quality, and may supply the data to the scalable coded data storage device 1202. Further, for example, in a case of the notice time, the imaging apparatus 1201 may generate the base layer and non-base layer scalable coded data (BL+EL) 1221 having a large amount of data with high quality, and may supply the data to the scalable coded, data storage device 1202.

In the above description, the description has been made of the monitoring camera as an example, but usage of the imaging system 1200 is arbitrary and is not limited to a monitoring camera.

Twelfth Embodiment

Other Examples

In the above description, examples of apparatuses or systems to which the present technology is applied have been described, but the present, technology is not limited thereto, and may be realized by ail configurations mounted in a device forming the apparatus or the system, for example, a processor as system large scale integration (LSI) or the like, a module using a plurality of processors, a unit using a plurality of modules, a set in which other functions are added to the unit, and the like (a configuration of a part of an apparatus).

(Configuration Example of Video Set)

Figure 91:
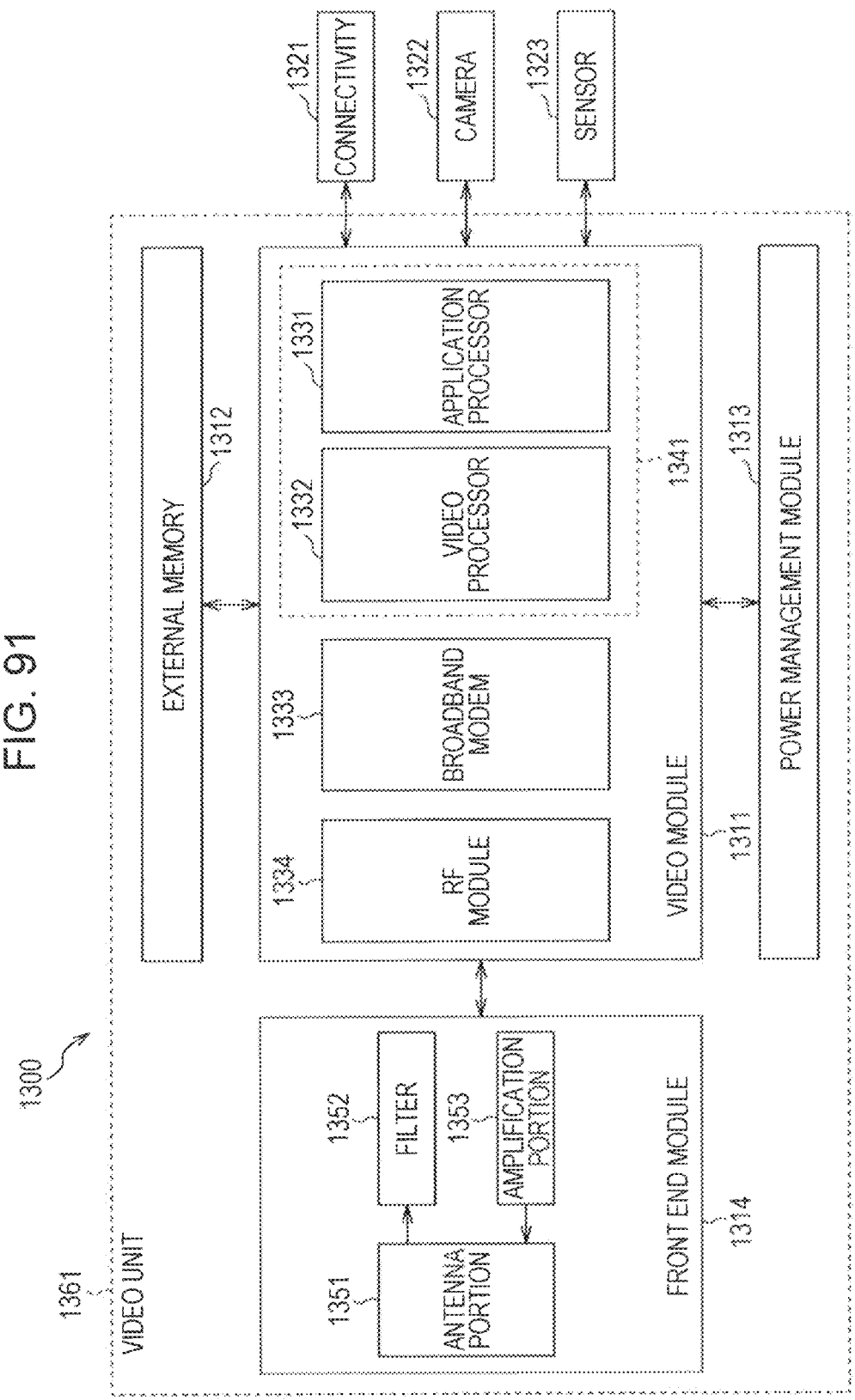
FIG. 91 is a diagram illustrating a schematic configuration example of a video set to which the present disclosure is applied.

With reference to FIG. 91, description will be made of an example in which the present technology is realized by a set. FIG. 91 illustrates an example of a schematic configuration of a video set to which the present technology is applied.

Multi-functioning of an electronic apparatus has recently progressed, and thus there are many cases where, when a partial configuration is sold or provided in development or manufacturing thereof, not only a configuration having a single function is realized but also a set having a plurality of functions through combination of a plurality of configurations having related functions is implemented.

A video set 1300 illustrated in FIG. 91 has a multi-functional configuration, and is one in which a device having a function regarding coding or decoding (one or both of the coding or decoding may be used) of an image is combined with a device having other functions related to the function.

As illustrated in FIG. 91, the video set 1300 includes a module group such as a video module 1311, an external memory 1312, a power management, module 1313, and a front end module 1314, and devices having related functions, such as a connectivity 1321, a camera 1322, and a sensor 1323.

The module is a component having a unified function by collecting several mutually related component functions. A specific physical configuration of the module is arbitrary, and, for example, a plurality of processors having each function, electronic circuit elements such as resistors and capacitors, other devices, and the like may be disposed on a wiring board and integrally formed. In addition, a module may be combined with other modules, processors, or the like, so as to form a new module.

In a case of the example of FIG. 91, the video module 1311 is a combination of configurations having functions regarding image processing, and includes an application processor, a video processor, a broadband modem 1333, and an RF module 1334.

The processor is one in which configurations having predetermined functions are integrated into a semiconductor chip by using a system on a chip (SoC), and there may be a processor which is called, for example, system large scale integration (LSI). The configurations having predetermined functions may be logic circuits (hardware configuration), may be a CPU, a ROM, a RAM, and the like, and programs (software configuration) executed by using the configurations, and may be a combination of both thereof. For example, the process includes a logic circuit, a CPU, a ROM, a RAM, and the like, some functions may be realized by the logic circuit, (hardware configuration), and other functions may be realized by the program (software configuration) executed by the CPU.

The application processor 1331 of FIG. 91 is a processor which executes an application related to image processing. The application executed by the application processor 1331 may perform a calculation process in order to realize a predetermined function, and may also control constituent elements inside and outside the video module 1311, such as the video processor 1332.

The video processor 1332 is a processor having a function related to coding/decoding (one or both thereof) of an image, The broadband modem 1333 is a processor (or a module) which performs a process related to wired or wireless (or both thereof) broadband communication which is performed via a broadband line such as the Internet or a public telephone line. For example, the broadband modem 1333 digitally modulates data (digital signal) to be transmitted, for conversion into an analog signal, or demodulates a received analog signal for conversion into data (digital signal). For example, the broadband modem 1333 can digitally modulate/demodulate any information such as image data processed by the video processor 1332, a stream in which the image data is coded, an application program, or setting data.

The RF module 1334 is a module which performs frequency conversion, modulation/demodulation, amplification, filtering, and the like on a radio frequency (RF) signal which is transmitted and received via an antenna. For example, the RF module 1334 performs frequency conversion or the like on a baseband signal generated by the broadband modem 1333 so as to generate an RF signal. In addition, for example, the RF module 1334 performs frequency conversion or the like on an RF signal which is received via the front end module 1314, so as to generate a baseband signal.

Further, in FIG. 91, as indicated by a dotted line 1341, the application processor 1331 and the video processor 1332 may be integrally formed so as to configure a single processor.

The external memory 1312 is a module which is provided outside the video module 1311 and includes a storage device used by the video module 1311. The storage device of the external memory 1312 may be implemented by any physical configuration, but is generally used to store a large volume of data such as image data of frame units, and is thus preferably implemented by a large capacity semiconductor memory which is relatively cheap, such as a dynamic random access memory (DRAM).

The power management module 1313 manages and control power which is supplied to the video module 1311 (each constituent element in the video module 1311).

The front end module 1314 is a module which provides a front end function (a circuit of a transmission and reception end of an antenna side) to the RF module 1334. As illustrated in FIG. 91, the front end module 1314 includes, for example, an antenna portion 1351, a filter 1352, and an amplification portion 1353.

The antenna portion 1351 includes an antenna and peripheral constituent elements which transmit and receive a wireless signal. The antenna portion 1351 transmits a signal which is supplied from the amplification portion 1353 as a wireless signal, and supplies the received wireless signal to the filter 1352 as an electrical signal (RF signal). The filter 1352 performs a filter process on the received RF signal which is received via the antenna portion 1351, and supplies a processed RF signal to the RF module 1334. The amplification portion 1353 amplifies the RF signal supplied from the RF module 1334, and supplies the amplified signal to the antenna portion 1351.

The connectivity 1321 is a module having a function related to connection to an external device. A physical configuration of the connectivity 1321 is arbitrary. For example, the connectivity 1321 includes a constituent element having a communication function other than a communication standard supported by the broadband modem 1333, an external input and output terminal, and the like.

For example, the connectivity 1321 may include a module having a communication function conforming to a wireless communication standard such as Bluetooth (registered trademark) or IEEE 802.11 (for example, Wireless Fidelity (Wi-Fi, registered trademark), near field communication (NFC), or Infrared Data Association (IrDA)), an antenna which transmits and receives a signal conforming to the standard, and the like. In addition, for example, the connectivity 1321 may include a module having a communication function conforming to a wired communication standard such as Universal Serial Bus (USB) or High-Definition Multimedia Interface (HDMI) (registered trademark), or a terminal conforming to the standard. Further, for example, the connectivity 1321 may have other data (signal) transmission functions in an analog input and output terminal or the like.

In addition, the connectivity 1321 may include a device of a transmission destination of data (signal). For example, the connectivity 1321 may include a drive (including not only a removable medium drive but also a hard disk, a solid, state drive (SSD), and a network attached storage (NSA)) which performs reading or writing of data from or to a recording medium, such as a magnetic disk, an optical disc, a magnet, optical disc, or a semiconductor memory. Further, the connectivity 1321 may include an image or sound output, device (a monitor, a speaker, or the like).

The camera 1322 is a module having a function of capturing an image of a subject, and acquiring image data of the subject. The image data, acquired by the camera 1322 capturing an image of the subject is supplied to, for example, the video processor 1332, and is coded.

The sensor 1323 is a module having any sensor function, such as an audio sensor, an ultrasonic sensor, an optical sensor, an illuminance sensor, an infrared sensor, an image sensor, a rotation sensor, an angle sensor, an angular velocity sensor, a speed sensor, an acceleration sensor, a tilt sensor, a magnetic identification sensor, an impact, sensor, or a temperature sensor. Data detected by the sensor 1323 is supplied to, for example, the application processor 1331, and is used by an application or the like.

In the above description, a configuration described as a module maybe realized, as a processor, and, conversely, a configuration described as a processor may be realized as a module.

In the video set 1300 having the above-described configuration, the present disclosure is applicable to the video processor 1332 as described later. Therefore, the video set 1300 may be implemented as a set to which the present technology is applied.

(Configuration Example of Video Processor)

Figure 92:
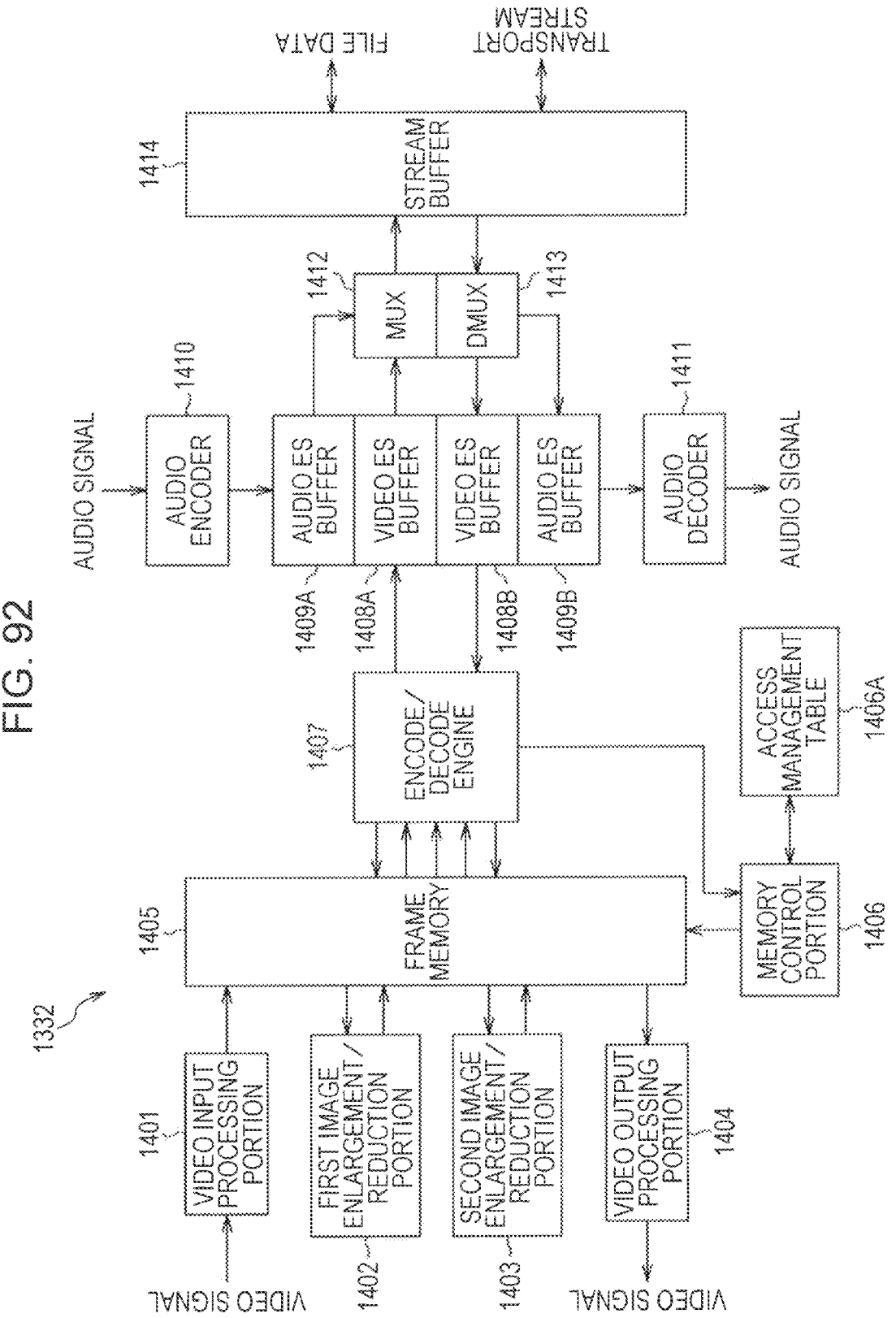
FIG. 92 is a diagram illustrating a schematic configuration example of a video processor to which the present disclosure is applied.

FIG. 92 illustrates an example of a schematic, configuration of the video processor 1332 (FIG. 91) to which the present technology is applied.

In a case of the example of FIG. 92, the video processor 1332 has a function of receiving a video signal and an audio signal and coding the signals in a predetermined method, and a function of decoding coded video data and audio data, so as to reproduce a video signal and an audio signal.

As illustrated in FIG. 92, the video processor 1332 includes a video input processing portion 1401, a first image enlargement/reduction portion 1402, a second image enlargement/reduction portion 1403, a video output processing portion 1404, a frame memory 1405, and a memory control portion 1406. In addition, the video processor 1332 includes an encode/decode engine 1407, video elementary stream (ES) buffers 1403A and 1408E, and audio ES buffers 1409A and 1409B. Further, the video processor 1332 includes an audio encoder 1410, an audio decoder 1411, a multiplexer (MUX) 1412, a demultiplexer (DMUX) 1413, and a stream buffer 1414.

The video input processing portion 1401 acquires a video signal which is input from, for example, the connectivity 1321 (FIG. 91) or the like, and converts the video signal into digital image data. The first image enlargement/reduction portion 1402 performs format conversion or an image enlargement, or reduction process on the image data. The second image enlargement/reduction portion 1403 performs an image enlargement or reduction process in accordance with a format at a destination of a video which is output, via the video output processing portion 1404 on the image data, or performs the same format conversion or image enlargement or reduction process as in the first image enlargement./reduction portion 1402 on the image data. The video output processing portion 1404 performs format conversion, conversion into an analog signal, or the like on the image data, and outputs a converted signal to, for example, the connectivity 1321 (FIG. 91) or the like as a reproduced video signal.

The frame memory 1405 is a memory for image data, shared by the video input processing portion 1401, the first image enlargement/reduction portion 1402, the second image enlargement/reduction portion 1403, the video output processing portion 1404, and the encode/decode engine 1407. The frame memory 1405 is implemented by a semiconductor memory such as a DRAM.

The memory control portion 1406 receives a synchronization signal from the encode/decode engine 1407, and controls writing/reading access to the frame memory 1405 according to a schedule for access to the frame memory 1405, written in an access management table 1406A. The access management table 1406A is updated by the memory control portion 1406 in accordance with processes performed by the encode/decode engine 1407, the first image enlargement/reduction portion 1402, the second image enlargement/reduction portion 1403, and the like.

The encode/decode engine 1407 performs an encode process on image data, and a decode process on a video stream which is coded data of image data. For example, the encode/decode engine 1407 codes image data read from, the frame memory 1405, and sequentially writes the coded image data to the video ES buffer 1408A as a video stream. In addition, for example, video streams are sequentially read from the video ES buffer 1408B so as to be decoded, and are sequentially written to the frame memory 1405 as image data. The encode/decode engine 1407 uses the frame memory 1405 as a work area in the coding or decoding. Further, the encode/decode engine 1407 outputs an synchronization signal to the memory control portion 1406, for example, at a timing of starting a process on each macroblock.

The video ES buffer 1408A buffers a video stream generated by the encode/decode engine 1407, and supplies the buffered video stream to the multiplexer (MUX) 1412. The video ES buffer 1408B buffers a video stream supplied from, the demultiplexer (DMUX) 1413, and supplies the buffered video stream to the encode/decode engine 1407.

The audio ES buffer 1409A buffers an audio stream generated by the audio encoder 1410, and supplies the buffered audio stream to the multiplexer (MUX) 1412. The audio ES buffer 1409B buffers an audio stream supplied from the demultiplexer (DMUX) 1413, and supplies the buffered audio stream to the audio decoder 1411.

The audio encoder 1410, for example, digitally converts an audio signal which is input from, for example, the connectivity 1321 (FIG. 91) or the like, and codes the converted, audio signal in a predetermined method such as an MPEG audio method or AudioCode number 3 (AC3).

The audio encoder 1410 sequentially writes an audio stream which is coded data, of the audio signal to the audio ES buffer 1409A. The audio decoder 1411 decodes an audio stream, supplied, from, the audio ES buffer 1409R so as to perform conversion into an analog signal, or the like, and supplies the analog signal to, for example, the connectivity 1321 (FIG. 91) or the like as a reproduced audio signal.

The multiplexer (MUX) 1412 multiplexes the video stream and the audio stream. A method of the multiplexing (that is, a format of a bit stream generated through the multiplexing) is arbitrary. In addition, during the multiplexing, the multiplexer (MUX) 1412 may add predetermined header information to a bit stream. In other words, the multiplexer (MUX) 1412 can convert a format of the stream through the multiplexing. For example, the multiplexer (MUX) 1412 multiplexes the video stream and the audio stream so as to perform conversion into a transport stream which is a bit stream with a transmission format. Further, for example, the multiplexer (MUX) 1412 multiplexes the video stream and the audio stream so as to perform conversion into data (file data) with a recording file format.

The demultiplexer (DMUX) 1413 demultiplexes a bit stream into which a video stream and an audio stream are multiplexed, in a method corresponding to the multiplexing by the multiplexer (MUX) 1412. In other words, the demultiplexer (DMUX) 1413 extracts a video stream and an audio stream from a bit stream which is read from the stream buffer 1414 (separates the video stream and the audio stream therefrom). That is, the demultiplexer (DMUX) 1413 can convert a format, of the stream through the demultiplexing (inverse conversion of the conversion in the multiplexer (MUX) 1412). For example, the demultiplexer (DMUX) 1413 may acquire a transport stream which is supplied from, for example, the connectivity 1321 or the broadband modem 1333 (FIG. 91), via the stream buffer 1414, and demultiplexes the transport stream so as to perform conversion into a video stream and an audio stream. In addition, for example, the demultiplexer (DMUX) 1413 may acquire file data which is read from, various recording media by, for example, the connectivity 1321 (FIG. 91), via the stream buffer 1414, and demultiplexes the transport stream so as to perform conversion into a video stream and an audio stream.

The stream buffer 1414 buffers a bit stream. For example, the stream buffer 1414 buffers a transport stream supplied from the multiplexer (MUX) 1412, and supplies the buffered transport stream to, for example, the connectivity 1321 or the broadband modem 1333 (FIG. 91) at a predetermined timing, or on the basis of a request or the like from an external device.

In addition, for example, the stream, buffer 1414 buffers file data supplied from the multiplexer (MUX) 1412, and supplies the buffered file data to, for example, the connectivity 1321 (FIG. 91) so as to record the file data on various recording media at a predetermined timing, or on the basis of a request or the like from an external device.

Further, the stream buffer 1414 buffers a transport stream which is acquired via, for example, the connectivity 1321 or the broadband, modem 1333 (FIG. 91), and supplies the buffered transport stream to the demultiplexer (DMUX) 1413 at a predetermined timing, or on the basis of a request, or the like from an external device.

Furthermore, the stream buffer 1414 buffers file data which is read from various recording media in the connectivity 1321 (FIG. 91) or the like, and supplies the buffered transport stream to the demultiplexer (DMUX) 1413 at a predetermined timing, or on the basis of a request or the like from an external device.

Next, an example of an operation of the video processor 1332 having the configuration will be described. For example, a video signal which is input to the video processor 1332 from the connectivity 1321 (FIG. 91) or the like is converted into digital image data in a predetermined scheme such as a 4:2:2 Y/Cb/Cr scheme by the video input processing portion 1401, and is sequentially written to the frame memory 1405. The digital image data is read to the first image enlargement/reduction portion 1402 or the second image enlargement/reduction portion 1403, and undergoes format conversion and an enlargement or reduction process in a predetermined scheme such as a 4:2:0 Y/Cb/Cr scheme so as to be written to the frame memory 1405 again. The image data is coded by the encode/decode engine 1407 and is then written to the video ES buffer 1408A as a video stream, In addition, an audio signal which is input to the video processor 1332 from the connectivity 1321 (FIG. 91) or the like is coded by the audio encoder 1410, and is written to the audio ES buffer 1409A an audio stream.

The video stream of the video ES buffer 1408A and the audio stream of the audio ES buffer 1409A are read to the multiplexer (MUX) 1412 so as to be multiplexed and be converted, into a transport stream, file data, or the like. The transport stream generated by the multiplexer (MUX) 1412 is buffered in the stream buffer 1414, and is then output, to an external network via, for example, the connectivity 1321 or the broadband modem 1333 (FIG. 91). In addition, the file data generated by the multiplexer (MUX) 1412 is buffered in the stream buffer 1414, and is then output to, for example, the connectivity 1321 (FIG. 91) so as to be recorded on various recording media.

Further, a transport stream which is input to the video processor 1332 from an external network via, for example, the connectivity 1321 or the broadband modem 1333 (FIG. 31) is buffered in the stream buffer 1414, and is then demultiplexed by the demultiplexer (DMUX) 1413. Furthermore, for example, file data which is read from various recording media, for example, in the connectivity 1321 (FIG. 91) and is input to the video processor 1332 is buffered in the stream buffer 1414, and is then demultiplexed by the demultiplexer (DMUX) 1413. In other words, the transport stream or the file data which is input, to the video processor 1332 is separated into a video stream and an audio stream by the demultiplexer (DMUX) 1413.

The audio stream is supplied to the audio decoder 1411 via the audio ES buffer 1409B so as to be decoded, and to be reproduced as an audio signal. In addition, the video stream which is written to the video ES buffer 1408B is then sequentially read by the encode/decode engine 1407 so as to be decoded and to be written to the frame memory 1405. The decoded image data undergoes an enlargement or reduction process in the second image enlargement/reduction portion 1403 so as to be written to the frame memory 1405. Further, the decoded image data is read to the video output processing portion 1404 so as to undergo format conversion in a predetermined scheme such as a 4:2:2 Y/Cb/Cr scheme and further to undergo conversion into an analog signal, and thus a video signal is reproduced and output.

In a case where the present technology is applied to the video processor 1332 having the configuration, the present, disclosure related to each embodiment described above may be applied to the encode/decode engine 1407. In other words, for example, the encode/decode engine 1407 may have the function of the coding device or the decoding device related to the first embodiment. Accordingly, the video processor 1332 can achieve the same effects as the effects described with reference to FIGS. 6 to 13.

In addition, in the encode/decode engine 1407, the present technology (that is, the function of the image coding device or the image decoding device related to each embodiment described above) may be realized by hardware such as a logic circuit, may be realized by software such as an embedded program, and may be realized by both thereof.

(Another Configuration Example of Video Processor)

Figure 93:
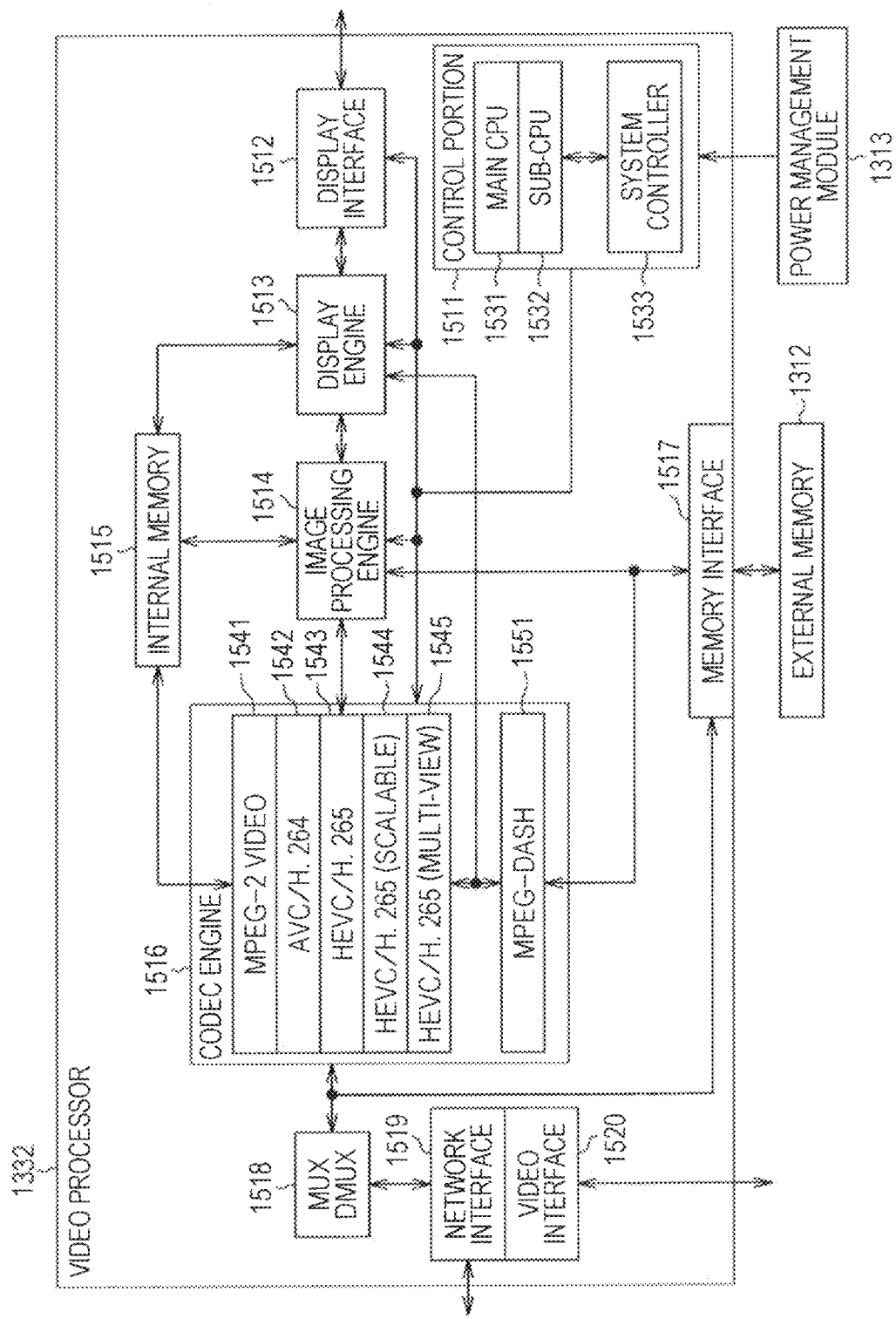
FIG. 93 is a diagram illustrating another schematic configuration example of a video processor to which the present disclosure is applied.

FIG. 93 illustrates another schematic configuration example of the video processor 1332 (FIG. 91) to which the present technology is applied. In a case of the example of FIG. 93, the video processor 1332 has a function of coding and decoding video data in a predetermined method.

More specifically, as illustrated in FIG. 93, the video processor 1332 includes a control portion 1511, a display interface 1512, a display engine 1513, an image processing engine 1514, and an internal memory 1515. In addition, the video processor 1332 includes a codec engine 1516, a memory interface 1517, a multiplexer/demultiplexer (MUX DEMUX) 1518, a network interface 1519, and a video interface 1520.

The control portion 1511 controls an operation of each processing portion of the video processor 1332, such as the display interface 1512, the display engine 1513, the image processing engine 1514, and the codec engine 1516.

As illustrated in FIG. 93, the control portion 1511 includes, for example, a main CPU 1531, a sub-CPU 1532, and a system controller 1533. The main CPU 1531 executes a program, or the like for controlling an operation of each processing portion of the video processor 1332. The main CPU 1531 generates a control signal according to the program, or the like, and supplies the control signal to each processing portion (that is, controls an operation of each processing portion). The sub-CPU 1532 assists the main CPU 1531. For example, the sub-CPU 1532 executes a child process, a sub-routine, or the like of a program executed by the main CPU 1531. The system controller 1533 controls operations of the main CPU 1531 and the sub-CPU 1532 by designating a program which is to be executed by the main CPU 1531 and the sub-CPU 1532.

The display interface 1512 outputs image data to, for example, the connectivity 1321 (FIG. 31) under the control of the control portion 1511. For example, the display interface 1512 converts digital image data into an analog signal and outputs the analog signal to a monitor device or the like of the connectivity 1321 (FIG. 31), or outputs the digital image data to the monitor device as it is.

The display engine 1513 performs various conversion processes such as format conversion, size conversion, and color gamut conversion on image data, so as to be suitable for a hardware specification of a monitor device or the like which displays an image, under the control of the control portion 1511.

The image processing engine 1514 performs a predetermined image process such as a filter process for improving image quality, on the image data, under the control of the control portion 1511.

The internal memory 1515 is a memory which is shared by the display engine 1513, the image processing engine 1514, and the codec engine 1516, and is provided in the video processor 1332. The internal memory 1515 is used to transmit and receive data among, for example, the display engine 1513, the image processing engine 1514, and the codec, engine 1516. For example, the internal memory 1515 stores data supplied from the display engine 1513, the image processing engine 1514, or the codec engine 1516, and supplies the data to the display engine 1513, the image processing engine 1514, or the codec engine 1516 as necessary (for example, in response to a request). The internal memory 1515 may be realized by any storage device, but is generally often used to store a small volume of data such as image data of the block unit or a parameter, and is thus preferably implemented by a semiconductor memory which has a relatively (for example, compared to the external memory 1312) small capacity but has a high response speed, such as a static random access memory (SRAM).

The codec engine 1516 performs a process regarding coding or decoding of image data. A coding or decoding method supported by the codec engine 1516 is arbitrary, and the number thereof may be one, and may be plural. For example, the codec engine 1516 may have codec functions of a plurality of coding/decoding methods, and may perform coding of image data or decoding of coded data in a method selected from among the methods.

In the example illustrated in FIG. 93, the codec engine 1516 includes, for example, MPEG-2 Video 1541, AVC/H.264 1542, HEVC/H.265 1543, HEVC/H.265 (Scalable) 1544, HEVC/H.265 (Multi-view) 1545, and MPEG-DASH 1551, as functional blocks of processes regarding codec.

The MPEG-2 Video 1541 is a functional block which codes or decodes image data in the MPEG-2 method. The AVC/H.264 1542 is a functional block which codes or decodes image data in the AVC method. The HEVC/H.265 1543 is a functional block which codes or decodes image data in the HEVC method. The HEVC/H.265 (Scalable) 1544 is a functional block which scalably codes or decodes image data in the HEVC method. HEVC/H.265 (Multi-view) 1545 is a functional block which multi-view-codes or multi-view-decodes image data in the HEVC method.

The MPEG-DASH 1551 is a functional block which transmits and receives image data in the MPEG-Dynamic Adaptive Streaming over HTTP (MPEG-DASH) method. The MPEG-DASH is a technique of performing streaming of a video by using Hyper Text Transfer Protocol (HTTP), has one of features in which appropriate data is selected in the segment unit from among a plurality of coded data items which are prepared in advance and have resolutions or the like different, from each other, and is transmitted. The MPEG-DASH 1551 performs generation of a stream conforming to a standard, transmission control of the stream, or the like, and uses the above-described MPEG-2 Video 1541, or HEVC/H.265 (Multi-view) 1545 for coding/decoding of image data.

The memory interface 1517 is an interface for use in the external memory 1312. Data supplied from the image processing engine 1514 or the codec engine 1516 is supplied to the external memory 1312 via the memory interface 1517. In addition, data read from the external memory 1312 is supplied to the video processor 1332 (the image processing engine 1514 or the codec engine 1516) via the memory interface 1517.

The multiplexer/demultiplexer (MUX DEMUX) 1518 multiplexes or demultiplexes various data items regarding an image, such as a bit stream of coded data, image data, and a video signal. A method of multiplexing and demultiplexing is arbitrary. For example, during multiplexing, the multiplexer/demultiplexer (MUX DEMUX) 1518 may not only collect a plurality of data items into a single data item, but may also add predetermined header information or the like to the data. In addition, during demultiplexing, the multiplexer/demultiplexer (MUX DEMUX) 1518 may not only divide a single data item into a plurality of a plurality of data items, but may also add predetermined header information or the like to each divided data item. In other words, the multiplexer/demultiplexer (MUX DEMUX) 1518 can convert: a format of data through the multiplexing and demultiplexing. For example, the multiplexer/demultiplexer (MUX DEMUX) 1518 multiplexes a bit string so as to perform conversion into a transport stream which is a bit string with a transmission format or data (file data) with a recording file format. Of course, inverse conversion thereof can be performed through demultiplexing.

The network interface 1519 is an interface dedicated to, for example, the broadband modem 1333 or the connectivity 1321 (FIG. 91). The video interface 1520 is an interface dedicated to, for example, the connectivity 1321 or the camera 1322 (FIG. 91).

Next, an example of an operation of the video processor 1332 will be described. For example, when a transport stream is received from an external network via, for example, the connectivity 1321 or the broadband modem 1333 (FIG. 91), the transport stream is supplied to the multiplexer/demultiplexer (MUX DEMUX) 1518 via the network interface 1519 so as to be demultiplexed, and is then decoded by the codec engine 1516. Image data which is obtained through the coding in the codec engine 1516 undergoes a predetermined image process by, for example, the image processing engine 1514 so as to undergo predetermined conversion, and is then, is supplied to, for example, the connectivity 1321 (FIG. 91) via the display interface 1512, and an image thereof is displayed on a monitor. In addition, for example, the image data obtained through the coding in the codec engine 1516 is decoded again by the codec engine 1516 so as to be multiplexed by the multiplexer/demultiplexer (MUX DEMUX) 1518 and to be converted into file data, and is then output, to, for example, the connectivity 1321 (FIG. 91) via the video interface 1520 so as to be recorded on various recording media.

Further, for example, file data of coded data which is coded image data and is read from a recording medium (not illustrated) by the connectivity 1321 (FIG. 91) is supplied to the multiplexer/demultiplexer (MUX DEMUX) 1518 via the video interface 1520, and is then decoded by the codec engine 1516. The image data obtained through the decoding in the codec engine 1516 undergoes a predetermined image process by the image processing engine 1514 so as to undergo predetermined conversion by the display engine 1513, and is then supplied to, for example, the connectivity 1321 (FIG. 91) via the display interface 1512, and an image thereof is displayed on the monitor. In addition, for example, the image data obtained through the decoding in the codec engine 1516 is coded again by the codec engine 1516 so as to be multiplexed by the multiplexer/demultiplexer (MUX DEMUX) 1518 and to be converted into a transport stream, and is then output to, for example, the connectivity 1321 or the broadband modem 1333 (FIG. 91) via the network interface 1519 so as to be supplied to other apparatuses (not illustrated).

Further, transmission and reception, of image data or other data between the respective processing portions of the video processor 1332 are performed by using, for example, the internal memory 1515 or the external memory 1312. In addition, the power management module 1313 controls the supply of power to, for example, the control portion 1511.

If the present technology is applied to the video processor 1332 having the configuration, the present technology related to each embodiment described above may be applied to the codec engine 1516. In other words, for example, the codec engine 1516 may include a functional block for realizing the coding device or the decoding device related to the first embodiment. In addition, for example, if the codec engine 1516 includes the above-described functional block, the video processor 1332 can achieve the same effects as the effects described with reference to FIGS. 6 to 13.

In addition, in the codec engine 1516, the present, technology (that is, the function of the image coding device or the image decoding device related to each embodiment described above) may be realized by hardware such as a logic circuit, may be realized by software such as an embedded program, and may be realized by both thereof.

As mentioned above, the two exemplary configurations of the video processor 1332 have been described, but the video processor 1332 may have any configuration, and may have configurations other than the two exemplary configurations. In addition, the video processor 1332 may be configured by a single semiconductor chip, and may be configured, by a plurality of semiconductor chips. For example, a three-dimensional stacked LSI in which a plurality of semiconductors are stacked may be used. Further, the video processor 1332 may be implemented by a plurality of LSIs.

(Application Examples to Apparatus)

The video set 1300 may be incorporated into various apparatuses which process image data. For example, the video set 1300 may be incorporated into the television apparatus 900 (FIG. 84), the mobile phone 920 (FIG. 85), the recording/reproducing apparatus 940 (FIG. 86), the imaging apparatus 960 (FIG. 87), and the like. The video set 1300 is incorporated into the apparatus, and thus the apparatus can achieve the same effects as the effects described with reference to FIGS. 6 to 13.

In addition, the video set 1300 may be incorporated into, for example, the terminal apparatuses such as the personal computer 1004, the AV apparatus 1005, the tablet device 1006, and the mobile phone 1007 of the data transmission system 1000 of FIG. 88, the broadcasting station 1101 and the terminal apparatus 1102 of the data transmission system 1100 of FIG. 89, the imaging apparatus 1201 and the scalable coded data storage device 1202 of the imaging system 1200 of FIG. 90, and the like. The video set 1300 is incorporated into the apparatus, and thus the apparatus can achieve the same effects as the effects described with reference to FIGS. 6 to 13.

In addition, even if only some of the above-described configurations of the video set 1300 include the video processor 1332, the configurations can be implemented as configurations to which the present technology is applied. For example, only the video processor 1332 may be implemented as a video processor to which the present technology is applied. In addition, for example, as described above, the processor, the video module 1311, or the like indicated by the dotted line 1341 may be implemented as a processor, a module, or the like to which the present technology is applied. Further, a combination of the video module 1311, the external memory 1312, the power management module 1313, and the front end module 1314 may be implemented as the video unit 1361 to which the present technology is applied. Any configuration can achieve the same effects as the effects described with reference to FIGS. 6 to 13.

In other words, any configuration including the video processor 1332 can be incorporated into various apparatuses which process image data in the same manner as in the video set 1300. For example, the video processor 1332, the processor indicated by the dotted line 1341, the video module 1311, or the video unit 1361 can be incorporated into the television apparatus 900 (FIG. 84), the mobile phone 920 (FIG. 85), the recording/reproducing apparatus 940 (FIG. 86), the imaging apparatus 960 (FIG. 87), the terminal apparatuses such, as the personal computer 1004, the AV apparatus 1005, the tablet device 1006, and the mobile phone 1007 of the data transmission system 1000 of FIG. 88, the broadcasting station 1101 and the terminal apparatus 1102 of the data transmission system 1100 of FIG. 89, the imaging apparatus 1201 and the scalable coded, data storage device 1202 of the imaging system 1200 of FIG. 90, and the like. Any one of configurations to which the present technology is applied is incorporated into the apparatus, and thus the apparatus can achieve the same effects as the effects described with reference to FIGS. 6 to 13 in the same manner as in the video set 1300.

In addition, in the present specification, description has been made of an example in which various information pieces such as conversion information, DR conversion information, and an approximate knee point index are multiplexed into coded data, and are transmitted from a coding side to a decoding side. However, a method of transmitting the information is not limited to this example. For example, the information may be transmitted or recorded as separate data associated with coded data without being multiplexed, into the coded data. Here, the term "associated" indicates that an image (which may be a part of the image, such as a slice or a block) included in a bit stream is made to be linked to information corresponding to the image during decoding. In other words, the information may be transmitted on a transmission path different from that of the coded data. In addition, the information may be recorded on a recording medium (or a different recording area of the same recording medium) different from that of the coded data. Further, the information and the coded data may be associated with each other in any unit such as a plurality of frames, a single frame, or a part of a frame.

In addition, in the present specification, the system indicates a set of a plurality of constituent elements (devices, modules (components), or the like), and it does not matter whether or not all constituent elements are located in the same casing. Therefore, a plurality of devices which are stored in separate casings and are connected to each other via a network, a single device in which a plurality of modules are stored in a single casing, are all a system.

The effects disclosed in the present specification are only an example and are not limited, and there may be other effects.

In addition, embodiments of the present disclosure are not limited to the above-described embodiments, and may have various modifications within the scope without departing from the spirit of the present disclosure.

For example, the present disclosure may have a cloud computing configuration in which a single function is distributed to a plurality of devices via a network and is processed in cooperation with each other.

Further, each step described in the above flowchart may be performed a single device, and may also be performed by a plurality of devices in a distribution manner.

Furthermore, in a case where a plurality of processes are included in a single step, the plurality of processes included in the single step may be performed by a single device, and may also be performed by a plurality of devices in a distribution manner.

The present disclosure may have the following configurations.

(1) A decoding device including; circuitry configured to receive coded data and conversion information, the coded data pertaining to an Image having luminance in a first dynamic range and the conversion information pertaining to a conversion of dynamic range of the luminance of the image from the first dynamic range into a second dynamic range; and decode the received coded data so as to generate the image, wherein the conversion uses a knee function.

(2) The decoding device according to the above (1), wherein the conversion uses a knee point.

(3) The decoding device according to the above (1) or (2), wherein the conversion uses the knee function to map the dynamic range of the luminance of the image from, the first dynamic range into the second dynamic range, and the knee function is defined by the knee point.

(4) The decoding device according to any of the above (1) to (3), wherein the conversion information includes pre-conversion information indicating a range of luminance which is a knee function target in the first dynamic range and post-conversion information indicating a range of luminance in the second dynamic range that corresponds to the range of luminance which is the knee function target in the first dynamic range.

(5) The decoding device according to any of the above (1) to (4), wherein the pre-conversion information indicates the range of luminance which is converted by knee function at a same conversion ratio as a conversion range of the first dynamic range.

(6) The decoding device according to any of the above (1) to (5), wherein the conversion uses the knee function which is defined by a plurality of knee points.

(7) The decoding device according to any of the above (1) to (6), wherein the conversion information includes a plurality of pairs of the pre-conversion information and the post-conversion information.

(8) The decoding device according to any of the above (1) to (7), wherein the conversion uses the knee function by mapping the dynamic range of the luminance of the image from the first, dynamic range into the second dynamic range, and a plurality of adjacent segments of the first dynamic range of the luminance are mapped to a corresponding plurality of adjacent segments of the second dynamic range of the luminance based on boundaries between adjacent segments defined by a plurality of knee points.

(9) The decoding device according to any of the above (1) to (8), wherein the conversion uses the knee function by mapping the dynamic range of the luminance of the image from the first dynamic range into the second dynamic range at a first conversion ratio to a point defined by the knee point and at a second conversion ratio from the point defined by the knee point.

(10) The decoding device according to any of the above (1) to (9), wherein the knee function is specified by an SEI message.

(11) The decoding device according to any of the above (1) to (10), wherein the SEI message includes a setting of a knee_functioned_id.

(12) A decoding method of causing a decoding device to perform: receiving coded data and conversion information, the coded data pertaining to an image having luminance in a first dynamic range and the conversion information pertaining to a conversion of dynamic range of the luminance of the image from the first dynamic range into a second dynamic range; and decoding the received coded, data so as to generate the image, wherein the conversion uses a knee function.

(13) The decoding method according to the above (12), wherein the conversion information includes pre-conversion information indicating a range of luminance which is a knee function target in the first dynamic range and post-conversion information indicating a range of luminance in the second dynamic range that corresponds to the range of luminance which is the knee function target in the first dynamic range.

(14) The decoding method according to the above (12) or (13), wherein the pre-conversion information indicates the range of luminance which is converted by knee function at a same conversion ratio as a conversion range of the first, dynamic range.

(15) The decoding method according to any of the above (12) to (14), wherein the conversion information includes a plurality of pairs of the pre-conversion information and the post-conversion information.

(16) The decoding method according to any of the above (12) to (15), wherein the conversion uses the knee function by mapping the dynamic range of the luminance of the image from the first dynamic range into the second dynamic range at a first conversion ratio to a point defined by the knee point and at a second conversion ratio from the point defined by the knee point.

(17) A coding device including: circuitry configured to set conversion information pertaining to a conversion of dynamic range of a luminance of an image from a first dynamic, range into a second dynamic range; and code the image having luminance in the first dynamic range so as to generate coded data, wherein the conversion uses a knee function.

(18) The coding device according to the above (17), wherein the conversion information includes pre-conversion information indicating a range of luminance which is a knee function target in the first dynamic range and post-conversion information indicating a range of luminance in the second dynamic range that corresponds to the range of luminance which is the knee function target in the first, dynamic range.

(19) The coding device according to the above (17) or (18), wherein the pre-conversion information indicates the range of luminance which is converted by knee function at a same conversion ratio as a conversion range of the first dynamic range.

(20) The coding device according to any of the above (17) to (19), wherein the conversion information includes a plurality of pairs of the pre-conversion information and the post-conversion information.

(21) The coding device according to any of the above (17) to (20), wherein the conversion uses the knee function by mapping the dynamic range of the luminance of the image from the first dynamic range into the second dynamic range at a first conversion ratio to a point defined by the knee point and at a second conversion ratio from the point defined by the knee point.

(22) A non-transitory computer-readable medium having stored thereon coded data and conversion information, the coded data pertaining to an image having luminance in a first dynamic range and the conversion information pertaining to a conversion of dynamic range of the luminance of the image from the first dynamic range into a second dynamic range, wherein a decoding device decodes coded data, generates the image based on the decoded data, and converts the dynamic range based, on the conversion information including a knee point.

(23) The non-transitory computer-readable medium according to the above (22), wherein the conversion information includes pre-conversion information indicating a range of luminance which is a knee function target in the first dynamic range and post-conversion information indicating a range of luminance in the second dynamic range that corresponds to the range of luminance which is the knee function target in the first dynamic range.

(24) The non-transitory computer-readable medium according to the above (22) or (23), wherein the pre-conversion information indicates the range of luminance which is converted by knee function at a same conversion ratio as a conversion range of the first dynamic range.

(25) The non-transitory computer-readable medium according to any of the above (22) to (24), wherein the conversion information includes a plurality of pairs of the pre-conversion information and the post-conversion information.

(26) The non-transitory computer-readable medium according to any of the above (22) to (25), wherein the conversion uses the knee function by mapping the dynamic range of the luminance of the image from the first dynamic range into the second dynamic range at a first conversion ratio to a point defined by the knee point and at a second conversion ratio from the point defined by the knee point.

(27) A decoding device including an extraction unit that extracts coded data, and conversion information from a coded stream including the coded data of a first image which is an image having luminance in a first dynamic range and the conversion information regarding conversion of a dynamic range of the luminance of the image from the first dynamic range into a second dynamic range; and a decoding unit that decodes the coded data extracted by the extraction unit so as to generate the first image.

(28) The decoding device according to the above (27), further including a conversion unit that converts the first image which is generated by the decoding unit into a second image which is the image having luminance in the second dynamic range on the basis of the conversion information extracted by the extraction unit.

(29) The decoding device according to the above (27) or (28), in which the conversion is performed by knee-converting the luminance of the first image.

(30) The decoding device according to the any one of the above (27) to (29), in which the conversion information includes pre-conversion information indicating a range of luminance which is a knee conversion target in the first dynamic range and post-conversion information indicating a range of luminance in the second dynamic range, corresponding to the range. (31) The decoding device according to the any one of the above (27) to (30), in which the pre-conversion information indicates a range of luminance which is knee-converted at the same conversion ratio as a conversion range of the first dynamic range, and in which the conversion information includes a plurality of pairs of the pre-conversion information and the post-conversion information.

(32) The decoding device according to the any one of the above (27) to (31), further including a selection unit that selects a predetermined number pairs from, among the plurality of pairs included in the conversion information which is extracted by the extraction unit, in an order in which the pairs are included in the conversion information.

(33) The decoding device according to the any one of the above (27) to (31), further including a selection unit that selects a predetermined number pairs from among the plurality of pairs included in the conversion information on the basis of priority information indicating an order in which a priority of the pair is higher, in which the extraction unit extracts the priority information included in the coded stream.

(34) The decoding device according to the any one of the above (27) to (33), further including a transmission unit that transmits the predetermined number of pairs selected by the selection unit.

(35) The decoding device according to any one of the above (27) to (34), in which the conversion information includes at least one of a maximum value of the luminance of the first image and a maximum value of the luminance of the second image.

(36) The decoding device according to any one of the above (27) to (35), in which the conversion information includes at least one of an expected value of brightness of a display unit which displays the first image and an expected value of brightness of a display unit which displays the second image.

(37) A decoding method of causing a decoding device to perform extracting coded data and conversion information from a coded stream including the coded data of a first image which is an image having luminance in a first dynamic range and the conversion information which is information regarding conversion of a dynamic range of the luminance of the image from the first dynamic range into a second dynamic range; and decoding the extracted coded data so as to generate the first image.

(38) A coding device including a setting unit that sets conversion information which is information regarding conversion of a dynamic range of luminance of an image from a first dynamic range into a second dynamic range; a coding unit that codes a first image which is the image having luminance in the first dynamic range so as to generate coded data; and a transmission unit that transmits a coded stream including the conversion information set by the setting unit and the coded data of the first image generated by the coding unit.

(39) The coding device according to the above (38), in which the conversion is performed by knee-converting the luminance of the first image.

(40) The coding device according to the above (38) or (39), in which the conversion information includes pre-conversion information indicating a range of luminance which is a knee conversion target in the first dynamic range and post-conversion information indicating a range of luminance in the second dynamic range, corresponding to the range.

(41) The coding device according to any one of the above (38) to (40), in which the pre-conversion information indicates a range of luminance which is knee-converted at the same conversion ratio as a conversion range of the first dynamic range, and in which the conversion information includes a plurality of pairs of the pre-conversion information and the post-conversion information.

(42) The coding device according to any one of the above (38) to (41), in which the conversion information includes the plurality of pairs of pre-conversion information and post-conversion information in an order in which a priority is higher.

(43) The coding device according to any one of the above (38) to (42), in which the transmission unit transmits priority information indicating an order in which a priority of the pair is higher.

(44) The coding device according to any one of the above (38) to (43), in which the conversion information includes at least one of a maximum value of the luminance of the first image and a maximum value of the luminance of the second image.

(45) The coding device according to any one of the above (38) to (44), in which the conversion information includes at least one of an expected value of brightness of a display unit which displays the first image and an expected value of brightness of a display unit which displays the second image.

(46) A coding method of causing a coding device to perform setting conversion information which is information regarding conversion of a dynamic range of luminance of an image from a first dynamic range into a second dynamic range; coding a first image which is the image having luminance in the first dynamic range so as to generate coded data; and transmitting a coded stream including the set conversion information and the generated coded data of the first image.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10 Coding device
11 Setting unit
12 Coding unit
13 Transmission unit
14 Conversion unit
50 Decoding device
52 Extraction unit
53 Decoding unit
54 Conversion unit
70 Coding device
71 Setting unit
72 Coding unit
90 Decoding device
91 Extraction unit
92 Decoding unit
93 Conversion unit
110 Decoding system
111 Decoding device
112 Display device
121 Selection unit
122 Transmission unit

The invention claimed is:
1. A decoding device comprising:
circuitry configured to
receive coded data and conversion information, the coded data pertaining to an image having luminance in a first dynamic range and the conversion information pertaining to a conversion of dynamic range of the luminance of the image from the first dynamic range into a second dynamic range; and
decode the received coded data so as to generate the image,
wherein the conversion uses a knee function that is defined by at least one knee point, and
wherein the conversion information includes
unconverted luminance range information indicating a permillage of peak luminance level for the image prior to the conversion, relative to a normalized luminance level,
unconverted display luminance information indicating an expected display brightness of peak luminance level for the image prior to the conversion,
converted luminance range information indicating a permillage of peak luminance level for the image after the conversion relative to the normalized luminance level, and converted display luminance information indicating an expected display brightness of peak luminance level for the image after the conversion.

2. The decoding device according to claim 1, wherein the conversion uses the knee function to map the dynamic range of the luminance of the image from the first dynamic range into the second dynamic range.

3. The decoding device according to claim 2, wherein the conversion information includes pre-conversion information and post-conversion information,
   wherein the pre-conversion information indicates a range of luminance which is a knee function target in the first dynamic range, and
   wherein the post-conversion information indicates a range of luminance in the second dynamic range that corresponds to the range of luminance indicated, by the pre-conversion information.

4. The decoding device according to claim 3, wherein the pre-conversion information indicates the range of luminance which is converted by knee function at a same conversion ratio as a conversion range of the first dynamic range.

5. The decoding device according to claim 1, wherein the conversion uses the knee function which is defined by a plurality of knee points.

6. The decoding device according to claim 5, wherein the conversion information includes a plurality of pairs of the pre-conversion information and the post-conversion information.

7. The decoding device according to claim 1, wherein the conversion uses the knee function by mapping the dynamic range of the luminance of the image from the first dynamic range into the second dynamic range, and a plurality of adjacent segments of the first dynamic range of the luminance are mapped to a corresponding plurality of adjacent segments of the second dynamic range of the luminance based on boundaries between adjacent segments defined by a plurality of knee points.

8. The decoding device according to claim 2, wherein the conversion uses the knee function by mapping the dynamic range of the luminance of the image from the first dynamic range into the second dynamic range at a first conversion ratio to a point defined by a first knee point of the at least one knee point and at a second, conversion ratio from the point defined by the first knee point.

9. The decoding device according to claim 1, wherein the knee function is specified by a Supplemental Enhancement Information (SEI) message.

10. The decoding device according to claim 9, wherein the SEI message includes a setting of a knee_function_id.

11. A decoding method of causing a decoding device to perform:
    receiving coded data and conversion information, the coded data pertaining to an image having luminance in a first dynamic range and the conversion information pertaining to a conversion of dynamic range of the luminance of the image from the first dynamic range into a second dynamic range; and
    decoding the received coded data so as to generate the image,
    wherein the conversion uses a knee function that is defined by at least one knee point, and
    wherein the conversion information includes
       unconverted luminance range information indicating a permillage of peak luminance level for the image prior to the conversion relative to a normalized luminance level,
       unconverted display luminance information indicating an expected display brightness of peak luminance level for the image prior to the conversion,
       converted luminance range information indicating a permillage of peak luminance level for the image after the conversion relative to the normalized luminance level, and
       converted display luminance information indicating an expected display brightness of peak luminance level for the image after the conversion.

12. A non-transitory computer-readable medium having stored thereon coded data and conversion information, the coded data pertaining to an image having luminance in a first dynamic range and the conversion information pertaining to a conversion of dynamic range of the luminance of the image from the first dynamic range into a second dynamic range, wherein
    when a decoding device decodes the coded data, the decoding device is caused to generate the image based on the decoded data, and also caused to convert, using a knee function that is defined by at least one knee point and based on the conversion information, the dynamic range of the luminance of the image from the first dynamic range into a second dynamic range, and
    wherein the conversion information includes
       unconverted luminance range information indicating a permillage of peak luminance level for the image prior to the conversion relative to a normalized luminance level,
       unconverted display luminance information indicating an expected display brightness of peak luminance level for the image prior to the conversion,
       converted luminance range information indicating a permillage of peak luminance level for the image after the conversion relative to the normalized luminance level, and
       converted display luminance information indicating an expected display brightness of peak luminance level for the image after the conversion.

* * * * *